(12) United States Patent
Sasaki et al.

(10) Patent No.: US 7,046,480 B2
(45) Date of Patent: May 16, 2006

(54) THIN FILM MAGNETIC HEAD AND MANUFACTURING METHOD THEREOF

(75) Inventors: Yoshitaka Sasaki, Milpitas, CA (US); Takehiro Kamigama, Hong Kong (HK)

(73) Assignees: Headway Technologies, Inc., Milpitas, CA (US); SAE Magnetics (H.K.) Ltd., Shatin (HK)

( * ) Notice: Subject to any disclaimer, the term of this patent is extended or adjusted under 35 U.S.C. 154(b) by 219 days.

(21) Appl. No.: 10/687,634

(22) Filed: Oct. 20, 2003

(65) Prior Publication Data

US 2005/0083607 A1    Apr. 21, 2005

(51) Int. Cl.
G11B 5/147    (2006.01)

(52) U.S. Cl. .................................... 360/126

(58) Field of Classification Search ............... 360/126, 360/123
See application file for complete search history.

(56) References Cited

U.S. PATENT DOCUMENTS

| | | | |
|---|---|---|---|
| 6,043,959 A | 3/2000 | Crue et al. | |
| 6,259,583 B1 | 7/2001 | Fontana, Jr. et al. | |
| 6,445,551 B1 * | 9/2002 | Asatani et al. | 360/317 |
| 6,456,459 B1 * | 9/2002 | Sasaki | 360/126 |
| 6,631,054 B1 * | 10/2003 | Miyazaki et al. | 360/317 |
| 6,754,052 B1 * | 6/2004 | Asida et al. | 360/322 |
| 6,812,543 B1 * | 11/2004 | Kamijima | 257/531 |
| 2001/0017751 A1 * | 8/2001 | Miyazaki et al. | 360/317 |

OTHER PUBLICATIONS

U.S. Appl. No. 10/687,634, filed Oct. 20, 2003, Sasaki et al.
U.S. Appl. No. 10/759,005, filed Jan. 20, 2004, Sasaki et al.

* cited by examiner

*Primary Examiner*—Allen Cao
(74) *Attorney, Agent, or Firm*—Oblon, Spivak, McClelland, Maier & Neustadt, P.C.

(57) ABSTRACT

The invention is directed to improvement of a write element of a thin film magnetic head. The first pole portion projects from a flat surface of a first yoke portion at a medium-facing surface side and having a reduced width at its upper end. The second pole portion faces the upper end of the first pole portion, having the same width as the upper end of the first pole portion, with the gap film interposed between the second pole portion and the upper end of the first pole portion. The first pole portion includes a magnetic film adjacent to the gap film, the magnetic film etched at both sides in width direction to have a narrowed portion having substantially the same width as the second pole portion, and a base portion connected to the narrowed portion, increasing in thickness toward the narrowed portion.

9 Claims, 63 Drawing Sheets

THIN FILM MAGNETIC HEAD AND MANUFACTURING METHOD THEREOF

BACKGROUND OF THE INVENTION

1. Field of the Invention

The present invention relates to a thin film magnetic head, a magnetic recording device using the same and a method for manufacturing the same, and particularly to improvement of a write element provided in a thin film magnetic head.

2. Discussion of Background

In recent years, the improvement in performance of a thin film magnetic head is demanded with the improvement in areal recording density of a hard disk device. The improvement in performance of a thin film magnetic head must be achieved in two aspects. One aspect is the improvement in performance of a read element, and the other is the improvement in performance of a write element.

The performance of a read element has been remarkably improved by development and practical use of a GMR (giant magnetoresistive) head provided with a spin valve film (SV film) or a ferromagnetic tunnel junction. Recently, this trend is so vigorous as to exceed a areal recording density of 100 Gb/p.

On the other hand, the improvement in performance of a write element has various problems to be solved as described below.

First, since a thin film magnetic head is used as a component of a magnetic recording device in a computer, it is demanded to be excellent in high-frequency characteristic and suitable for a high-speed data transfer rate. The high-frequency characteristic of a thin film magnetic head is determined by the structure of yokes and coils to form a write element. From such a view point, various prior arts have been proposed up to now.

For example, U.S. Pat. No. 6,043,959 discloses a technique in which a second yoke (upper yoke) is made flat to reduce the mutual inductance of coils and thus improve a high-frequency characteristic. U.S. Pat. No. 6,259,583B1 discloses a structure in which high-permeability and low-anisotropy layers, and non-magnetic layers are alternately stacked to form a second flat yoke.

A flat pole structure as disclosed in the above-mentioned prior arts is defined by photolithography, and a submicron process through a semiconductor process technique on the pole portion is necessary to achieve a narrow-track structure with an enhanced recording density. However, this submicron process is accompanied by the problems as described below.

First, the narrower the structure of a pole portion is made in a track structure, the more the pole portion is liable to cause a magnetic saturation, with degradation in a write ability. Thus a magnetic material with a high saturation magnetic flux density (hereinafter, referred to as an HiBs material) is needed to make the pole portion.

As HiBs materials, there are known FeN, CoFeN, NiFe, CoNiFe and the like. Among them, FeN, CoFeN and the like show a high saturation magnetic flux density of 2.4 T, for example, but they are difficult to form a pattern by plating, and consequently it becomes necessary to form a film of the material by sputtering and subsequently to pattern the film by ion milling. In case of a sputtering film as thick as 0.2 μm or more, accurate control over a track width of 0.2 μm or less, however, is very difficult, concerned with a mask made of photoresist or a mask formed of a magnetic film to form an upper pole.

On the other hand, NiFe, CoNiFe and the like can be easily patterned by plating. And NiFe provides a saturation magnetic flux density of 1.5 T to 1.6 T by increasing Fe in a composition ratio of Fe to Ni. Additionally NiFe is easy to control the composition ratio.

For a areal recording density of 80 to 100 Gb/p, the track width gets as small as 0.1 to 0.2 μm, demanding a saturation magnetic flux density as high as 2.3 to 2.4 T, and NiFe cannot satisfy the demand. For a plating method, CoNiFe is suitable but CoNiFe is as low as 1.8 T or so in saturation magnetic flux density and cannot satisfy the high saturation magnetic flux density of 2.3 to 2.4 T required for a small track width of 0.1 to 0.2 μm.

Thus it has been usual that a seed film to be a plating ground is made of CoFe which is 2.4 T in saturation magnetic flux density, and thereon is deposited a plating film of CoNiFe which is 2.3 T in saturation magnetic flux density, for example.

In case of forming, for example, the upper pole by the above-mentioned technique, it is necessary to use the upper pole as a mask and thus trim the seed film below the upper pole by ion beam or the like in order to achieve a required narrow track width in the upper pole. However, the seed film is, for example, a sputtering film of CoFe, and thus is very difficult to trimmed by ion beam. Due to this, in case of trimming a lower pole using the upper pole as a mask, the upper pole greatly reduces in film thickness. For example, the upper pole that has been formed as a plating film of 3 to 3.5 μm thick reduces as thin as 1.0 μm. The upper pole having such a thin film thickness causes a magnetic saturation in a write operation, with considerable degradation in an over-write characteristic.

And since it is necessary to trim the upper pole to a very small width of 0.1 to 0.2 μm by means of ion milling, ion beams need to be applied at a large angle. Due to this, a part closer to the tip of the upper pole is more trimmed and therefore the upper pole is formed into the shape of a triangle or a trapezoid. Thus the upper pole reduces in volume and the reduction in volume increases a risk of a magnetic saturation.

Next, in case of trimming a pole, a trimming mask is deposited so as to surround an upper yoke portion and cover a coil portion, not to cover the upper yoke portion and the upper pole. The reason is that it has been thought that covering the whole of the upper yoke portion and the upper pole connected thereto causes a side wall at the edge of the mask pattern and the side wall deposited to the pole causes a side write phenomenon, side erase phenomenon or the like.

As the upper yoke portion is not covered with a mask as described above, a flare portion, which increases gradually in width from the upper pole to a wide portion of the upper yoke portion, is trimmed by ion beam, so that the flare point, at which the upper yoke portion begins to increase in width, backs away from the air bearing surface (hereinafter, referred to as ABS). This also reduces the magnetic volume, with degradation in the over-write characteristic.

Generally, the closer the flare point, at which the flare portion begins to increase in width, is to the ABS, the more excellent over-write characteristic is obtained. The flare point must be made close to the ABS, especially in the case of the small track width of 0.2 μm or less. In the conventional trimming method, the flare point recedes not only for the above-mentioned reason, but also for the following reason.

That is to say, as a trimming mask is deposited so as to surround the upper pole portion and cover the coil portion, not to cover the upper yoke portion and the upper pole, metal particles scattered by trimming the lower pole by ion beams deposit on the side wall faces of the upper pole. To obtain a prescribed track width, the deposit film must be removed. To remove the deposit film, ion beams must be applied at a large angle of 50 to 75 degrees. This ion beam irradiation at a large angle narrows the upper pole. Furthermore, the pole is narrowed to have a taper angle making the width gradually smaller from the flare point toward the ABS, causing a problem that the track width varies according to individual thin film magnetic heads.

And while a narrow-track structure might be achieved by applying a semiconductor process technique on a flat pole structure to perform a submicron process on the pole portion, the surface of the flare portion expanding in width from the pole portion toward the yoke portion forms the same plane as the surfaces of the pole portion and yoke portion, causing problems that, in a write operation, the magnetic flux leaked from a side of the flare portion might erase a magnetic record on an adjacent track in a magnetic recording medium (side erase phenomenon), give a magnetic record to an adjacent track in a magnetic recording medium (side write phenomenon), or the like. Due to these problems, it is difficult to perform an accurate track control of 0.2 µm or less, and consequently it is impossible to achieve a high areal recording density of 100 Gb/p or more.

Next, it is known that in a thin film magnetic head of this type, the shorter the yoke length YL from the back gap to the pole portion is, the more excellent high-frequency characteristic is obtained. In order to shorten the yoke length, it is necessary to reduce the number of turns of a coil positioned between the back gap and the pole portion or to reduce the width of the coil without reducing the number of turns.

As the number of turns of a coil is determined by a magneto motive force required, however, reducing the number of coil turns to shorten the yoke length YL has a limit.

On the other hand, in case of reducing the width of a coil without reducing the number of coil turns, the electric resistance of the coil increases, so a temperature rise due to heat generation in a write operation increases. When the temperature rise increases, the upper pole portion and the lower pole portion thermally expand to cause a thermal protrusion that the pole portion swells on the ABS side. When a thermal protrusion occurs, the part where the thermal protrusion has occurred comes into contact with a magnetic recording medium in write and read operations, causing head crash, damage or destruction of a magnetic record on the magnetic recording medium. Consequently, a thermal protrusion must be strictly avoided. If it is impossible to avoid a thermal protrusion, the floating height of a thin film magnetic head must be increased after all, which makes it impossible to meet a demand for a low floating height for a high recording density.

SUMMARY OF THE INVENTION

An object of the present invention is to provide a thin film magnetic head and a magnetic recording device suitable for a high areal recording density of 100 Gb/p or more.

Another object of the present invention is to provide a thin film magnetic head and a magnetic recording device of a high areal recording density type in which a sufficient over-write characteristic can be achieved in a narrow track width.

A further object of the present invention is to provide a thin film magnetic head and a magnetic recording device of a high areal recording density type in which a pole comprises a material with a high saturation magnetic flux density of 2.2 to 2.4 T (referred to as an HiBs material) and has a track width of 0.1 to 0.2 µm.

A still further object of the present invention is to provide a thin film magnetic head and a magnetic recording device of a high areal recording density type having a high-frequency characteristic improved by shortening the yoke length.

A still further object of the present invention is to provide a thin film magnetic head and a magnetic recording device of a high areal recording density type having a yoke length of 5.5 µm or less.

A still further object of the present invention is to provide a thin film magnetic head and a magnetic recording device of a high areal recording density type in which the amount of generated heat is reduced by lowering the resistance of coils as keeping the number of coil turns.

A still further object of the present invention is to provide a manufacturing method suitable for manufacturing a thin film magnetic head described above.

In order to achieve the above-mentioned objects, in a thin film magnetic head according to the present invention, a first pole portion (lower pole portion) of a write element includes a magnetic film adjacent to the gap film. The magnetic film is etched at both sides in width direction so as to have a narrowed portion having substantially the same width as a second pole portion (upper pole portion). A base portion, which is left on bottoms of indentations formed on both sides of the narrowed portion by etching and is connected to the narrowed portion, increases in thickness toward the narrowed portion.

This structure makes it possible to avoid magnetic saturation in the pole piece adjacent to the gap film, and consequently improve the over-write characteristic.

The magnetic film adjacent to the gap film is made of a magnetic material containing Co and Fe and, more specifically, is made of CoFe or CoFeN. CoFe or CoFeN is an HiBs material of 2 to 2.4 T in saturation magnetic flux density. The magnetic film adjacent to the gap film may be formed as a sputtering film of FeN, CoFe or CoFeN. Also, in the second pole portion, a magnetic film adjacent to the gap film is preferably made of the above-mentioned magnetic material.

Consequently, it is possible to achieve a thin film magnetic head having a track width of 0.1 to 0.2 µm and suitable for a high areal recording density of 100 Gb/p or more.

Preferably, the coil comprises a first coil and a second coil. The first and second coils surround in a spiral form the back gap portion on a first insulating film formed on the flat surface of the first yoke portion, and one of the first and second coils is fitted into the space between coil turns of the other, insulated from the coil turns of the other by a second insulating film, and the first and second coils are connected to each other so as to generate magnetic flux in the same direction.

The second insulating film between the first coil and the second coil can be formed as a very thin $Al_2O_3$ film of about 0.1 µm in thickness by applying chemical vapor deposition (hereinafter, referred to as CVD) or the like. Therefore, it is possible to maximize sectional areas of the first and second coils between the back gap portion and the first pole portion, and consequently decrease the resistance of the coils and the quantity of generated heat as keeping the number of coil turns. This makes it possible to suppress occurrence of a thermal protrusion in the pole portions, and consequently avoid a head crash and the damage or destruction of a magnetic record on a magnetic recording medium and meet a demand for a low floating height for a high recording density.

As one of the first coil and the second coil is fitted into the space between coil turns of the other, insulated from the coil turns of the other by the second insulating film, a high wiring density of coil conductors is achieved. This makes it possible to shorten the yoke length YL as keeping the same number of coil turns.

The first coil and the second coil are connected to each other so as to generate magnetic flux in the same direction. As the first coil and the second coil are the same in winding direction, it is possible to generate magnetic flux in the same direction by making a series-connection structure in which the inner end of the first coil is connected to the outer end of the second coil. Alternatively, magnetic flux may be generated in the same direction by connecting the first coil to the second coil in parallel. The parallel connection offers a reduction in coil resistance though a decrease in the number of coil turns.

The upper surfaces of the first coil and the second coil form the same plane. This structure makes it possible to form a common third insulating film on the upper surfaces of the first and second coils, which offers simplification of an insulating structure on the upper surfaces of the first and second coils. And this structure provides a stable base for forming another coil above the first and second coils, so said another coil can be formed as a high-accuracy pattern.

In case of providing another coil on the first and second coils, upper surfaces of a pole piece and a back gap piece are also made to form the same plane as the upper surfaces of the first and second coils in addition to flattening the upper surfaces of the first and second coils. By doing so, another pole piece and another back gap piece required for providing another coil can be formed as a high-accuracy pattern on the flattened upper surfaces of the pole piece and the back gap piece.

In general, a thin film magnetic head according to the present invention forms a composite thin-magnetic head comprising a read element and a write element. The read element comprises a giant magnetoresistance effect element (hereinafter, referred to as a GMR element). The GMR element comprises a spin valve film or a ferromagnetic tunnel junction.

In a method for manufacturing the above-mentioned thin film magnetic head, a film to be the second yoke portion is formed in an uniform thickness. After that, the second yoke portion is covered with a resist mask, wherein the resist mask has an opening where the second pole portion is to be formed.

Next, an etch-backing process is applied onto the resist mask so as to expose a part of the second yoke portion. After that, an etching process is applied through the opening to a part of the magnetic film and/or a part of the gap film that are in the opening.

In the above-mentioned manufacturing method of the present invention, the second yoke portion is covered with the resist mask and then, an etch-backing process is applied onto the resist mask so as to expose a part of the second yoke portion. Thus, the resist mask is self-aligned in intimate contact with an outer edge of the second yoke portion without misalignment of the resist mask or a gap between the resist mask and the outer edge of the second yoke portion. In the subsequent etching process, consequently, there is no possibility that the outer edge of the second yoke portion might be attacked by an etching means such as ion beams and so, a high-accuracy pattern of the second yoke portion is formed.

The second yoke portion comprises a wide portion and a flare portion gradually decreasing in width toward a narrow portion, which forms the second pole portion. In the present invention, the etch-backing process on the resist mask also provides the resist mask self-aligned in intimate contact with the aforesaid flare portion without misalignment of the resist mask or a gap between the resist mask and the flare portion and so, in the subsequent etching process, there is no possibility that the outer edge of the flare portion might be attacked by an etching means such as ion beams. Thus, it is possible to prevent variations in a flare point, which is between the flare portion and the narrow portion. This assures a constant minimal value of the distance from the ABS to the flare point in a thin film magnetic head and consequently assures the over-write characteristic.

The resist mask has an opening on the narrow portion, which forms the second pole portion, and an etching process is applied through the opening to a part of the magnetic film and/or a part of the gap film that are in the opening. The etching process on the narrow portion provides a thin film magnetic head of a high areal recording density type having a narrow track width of 0.1 to 0.2 µm.

The above etching process or a subsequent additional etching process produces etching indentations on both sides of the narrow portion. In this etching process, a magnetic film that is one of magnetic films forming the first pole portion and is adjacent to the gap film, is etched so that not all portions of the magnetic film are etched and on the bottoms of the etching indentations, a base portion of the magnetic film is left. In case of using Ion Beam Etching as an etching means, by selected irradiation angles of ion beams and the geometric structure of the narrow portion, said magnetic film is etched so as to have a narrowed portion and a base portion left on the bottoms, the base portion increasing in thickness toward the narrowed portion. This structure make it possible to both keep a narrowed track width and allow a sufficient sectional area of the magnetic film adjacent to the gap film. Consequently, magnetic saturation in the magnetic film is prevented and so, over-write characteristic is improved.

Specifically, the second yoke portion may comprise a second magnetic film and a third magnetic film. In case of this structure, the manufacturing method includes the steps of: before forming the resist mask, forming the second magnetic film in an uniform thickness adjacent to the gap film; and thereafter forming the third magnetic film on the second magnetic film.

Moreover, the manufacturing method may include the steps of: after forming the third magnetic film, forming the resist mask on the third magnetic film; and thereafter performing the above-mentioned etch-backing process. The manufacturing method may include the step of: after forming the third magnetic film and before forming the resist mask, etching the second magnetic film by using the third magnetic film as a mask.

Moreover, the manufacturing method may include the steps of: after etching through the opening a part of the magnetic film and/or a part of the gap film that are in the opening, removing the resist mask; and thereafter etching a magnetic film that is to form the first pole portion by using as a mask a magnetic film that is to form the second pole portion.

The above-mentioned etch-backing process to etch-back the resist mask may comprise one of a dry-etching process with an $O_2$-mixed plasma, a dry-etching process with one of halogen-based plasma and chlorofluorocarbon-based plasma, an isotropic dry-etching process and an anisotropic dry-etching process.

A magnetic film that is one of magnetic films forming the first pole portion and is adjacent to the gap film, is preferably made of a magnetic material containing Co and Fe and more specifically, is made of CoFe or CoFeN. CoFe or CoFeN is an HiBs material of 2 to 2.4 T in saturation magnetic flux density, which is suitable for a track width of 0.1 to 0.2 μm and a high areal recording density of 100 Gb/p or more. The magnetic film adjacent to the gap film may be formed as a sputtering film of FeN, CoFe or CoFeN. Also, in the second pole portion, a magnetic film adjacent to the gap film is preferably made of the above-mentioned magnetic material.

It is preferable that the resist mask has a wall of the above-mentioned opening perpendicular to the surface of the magnetic film. Such a pattern of the resist mask makes it possible to completely cover a flare point in the second yoke portion with the resist mask and position an edge of the resist mask far away from the ABS. Consequently, in an ion milling process, deposit of a metal constituent on the pole is prevented.

The present invention further discloses a magnetic head device comprising a thin film magnetic head and a head supporting device combined with each other, and a magnetic recording/reproducing apparatus comprising this magnetic head device and a magnetic recording medium (hard disk) combined with each other.

Other objects, structures and advantages of the present invention are described in more detail with reference to the attached drawings. The drawings are only exemplifications.

DETAILED DESCRIPTION OF THE PREFERRED EMBODIMENTS

1. Thin Film Magnetic Head

Figure 1:
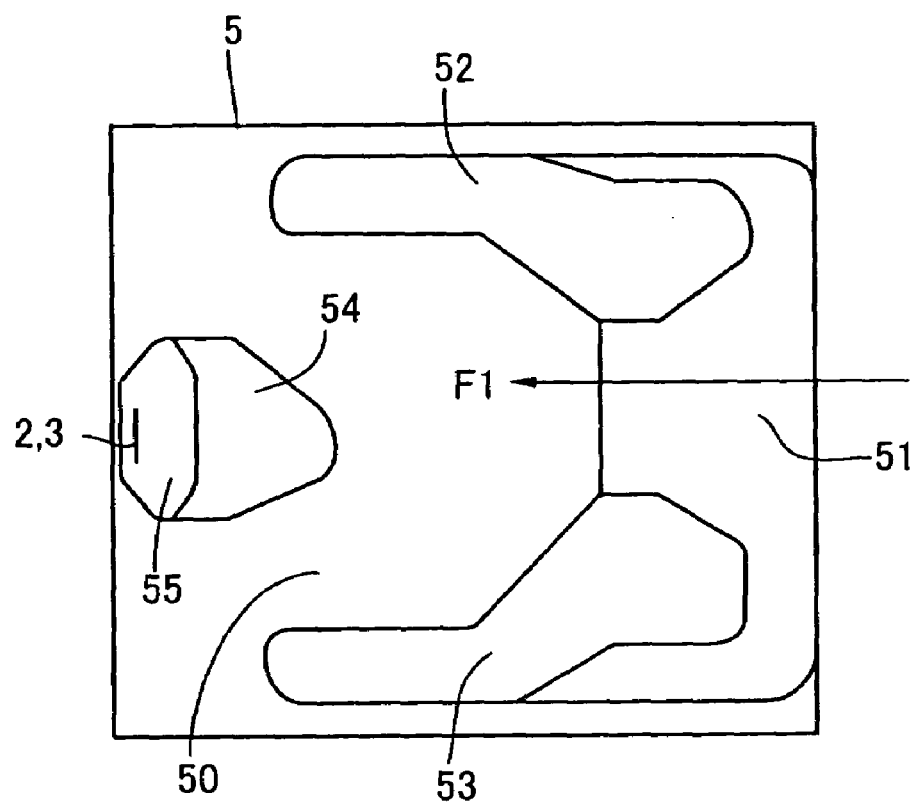
FIG. 1 is a plan view of a thin film magnetic head according to the present invention, seen from the ABS side.
Figure 2:
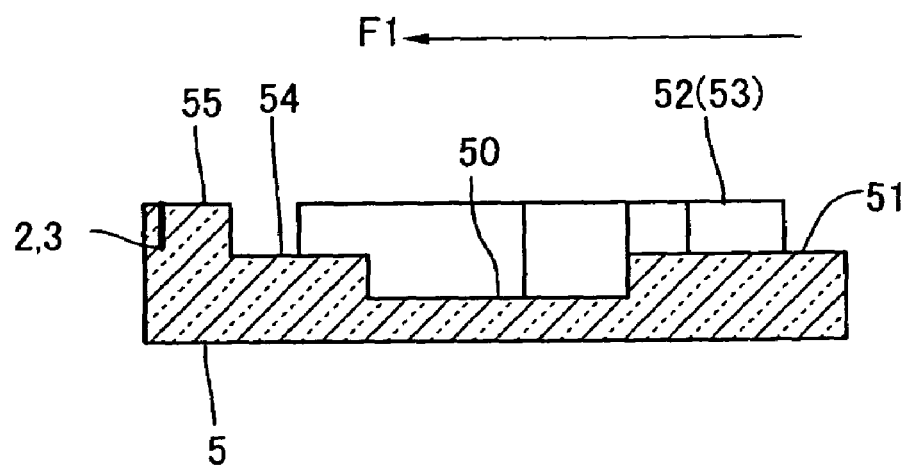
FIG. 2 is a sectional view of the thin film magnetic head shown in FIG. 1.

Referring to FIGS. 1 to 4, a thin film magnetic head according to the present invention comprises a slider 5, a write element 2 and a read element 3. The slider 5 is, for example, a ceramic structure having a base body 15 made of $Al_2O_3$—TiC or the like with an insulating film 16 of $Al_2O_3$, $SiO_2$ or the like provided on the surface thereof (see FIG. 3). The slider 5 has a geometrical shape for controlling a floating characteristic in the surface facing a medium. As a representative example of such a geometrical shape, there is shown an example being provided with a first step part 51, a second step part 52, a third step part 53, a fourth step part 54 and a fifth step part 55 on a base face 50 at the ABS side. The base face 50 becomes a negative pressure generating portion to the air flowing direction shown by the arrow F1, the second step part 52 and the third step part 53 form a step-shaped air bearing rising from the first step part 51. The surfaces of the second step part 52 and the third step part 53 form an ABS. The fourth step part 54 stands up in the shape of a step from the base face 50 and the fifth step part 55 stands up in the shape of a step from the fourth step part 54. Electromagnetic converter elements 2 and 3 are provided in the fifth step part 55.

The electromagnetic converter elements 2 and 3 comprise a write element 2 and a read element 3. The write element 2 and the read element 3 are provided at the air flowing-out end (trailing edge) side when seeing in the air flowing direction F1.

Figure 3:
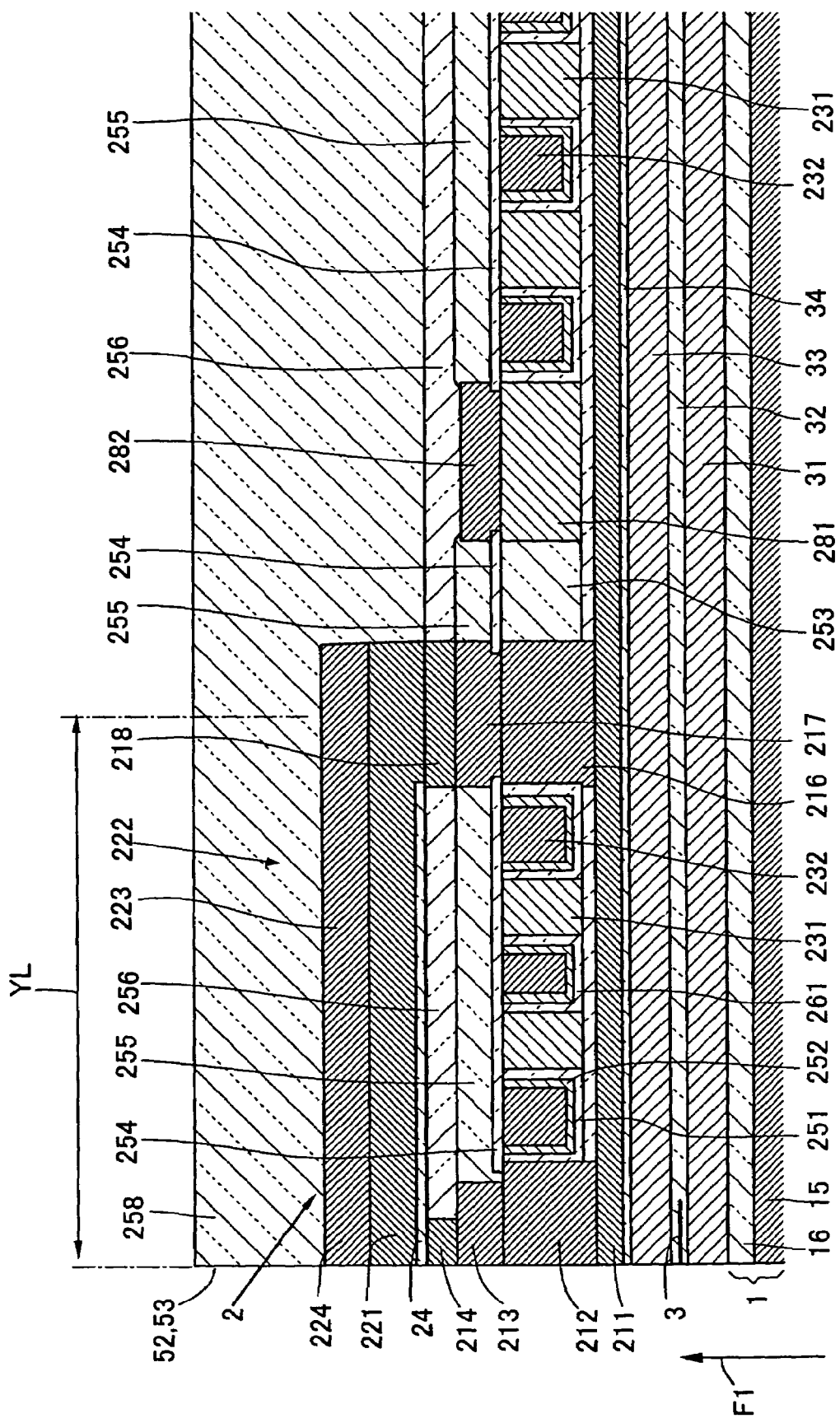
FIG. 3 is a magnified sectional view of an electromagnetic converter portion of the thin film magnetic head shown in FIGS. 1 and 2.
Figure 4:
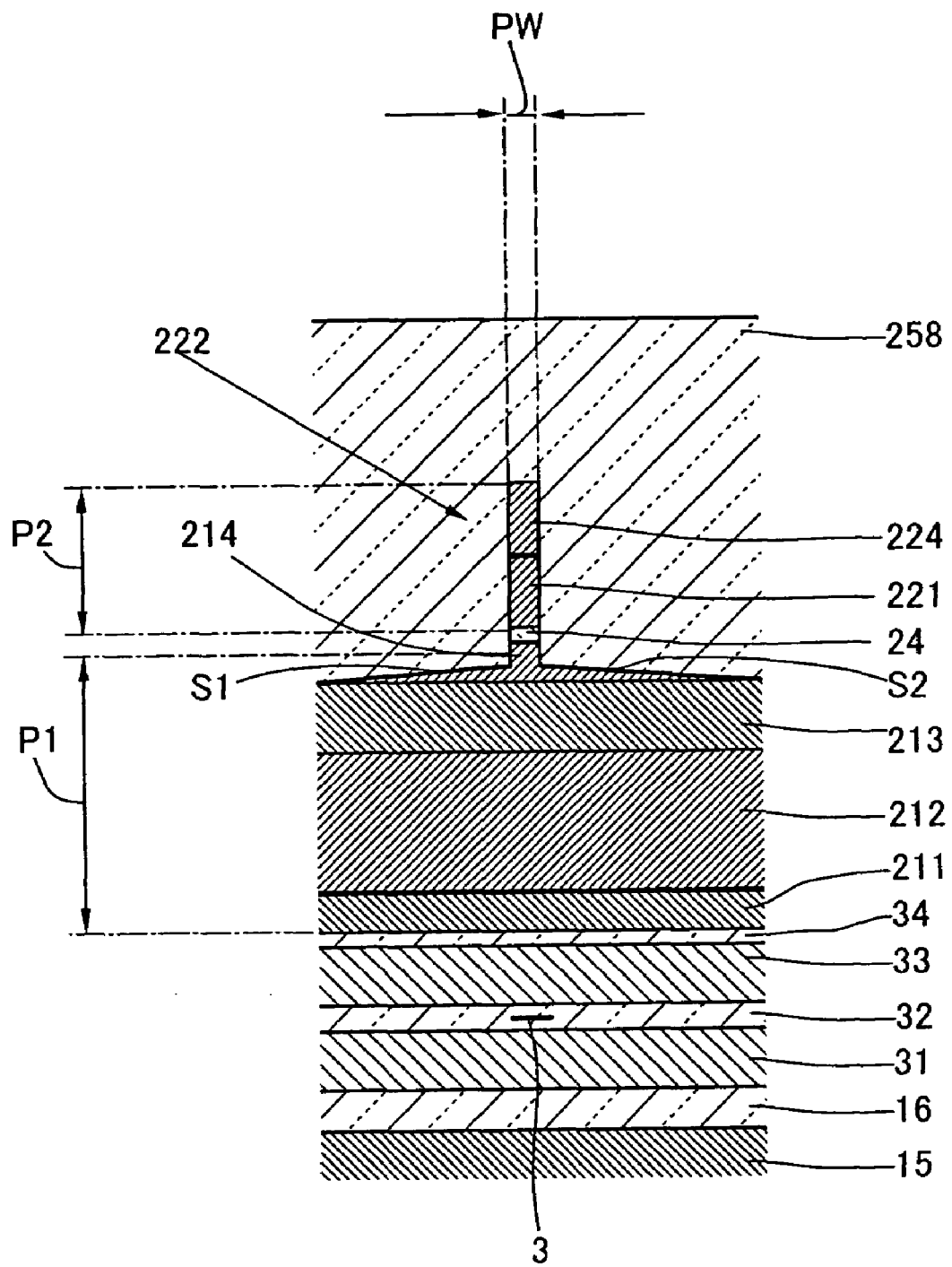
FIG. 4 is a diagram of the electromagnetic converter portion shown in FIG. 3, seen from the ABS side.
Figure 5:
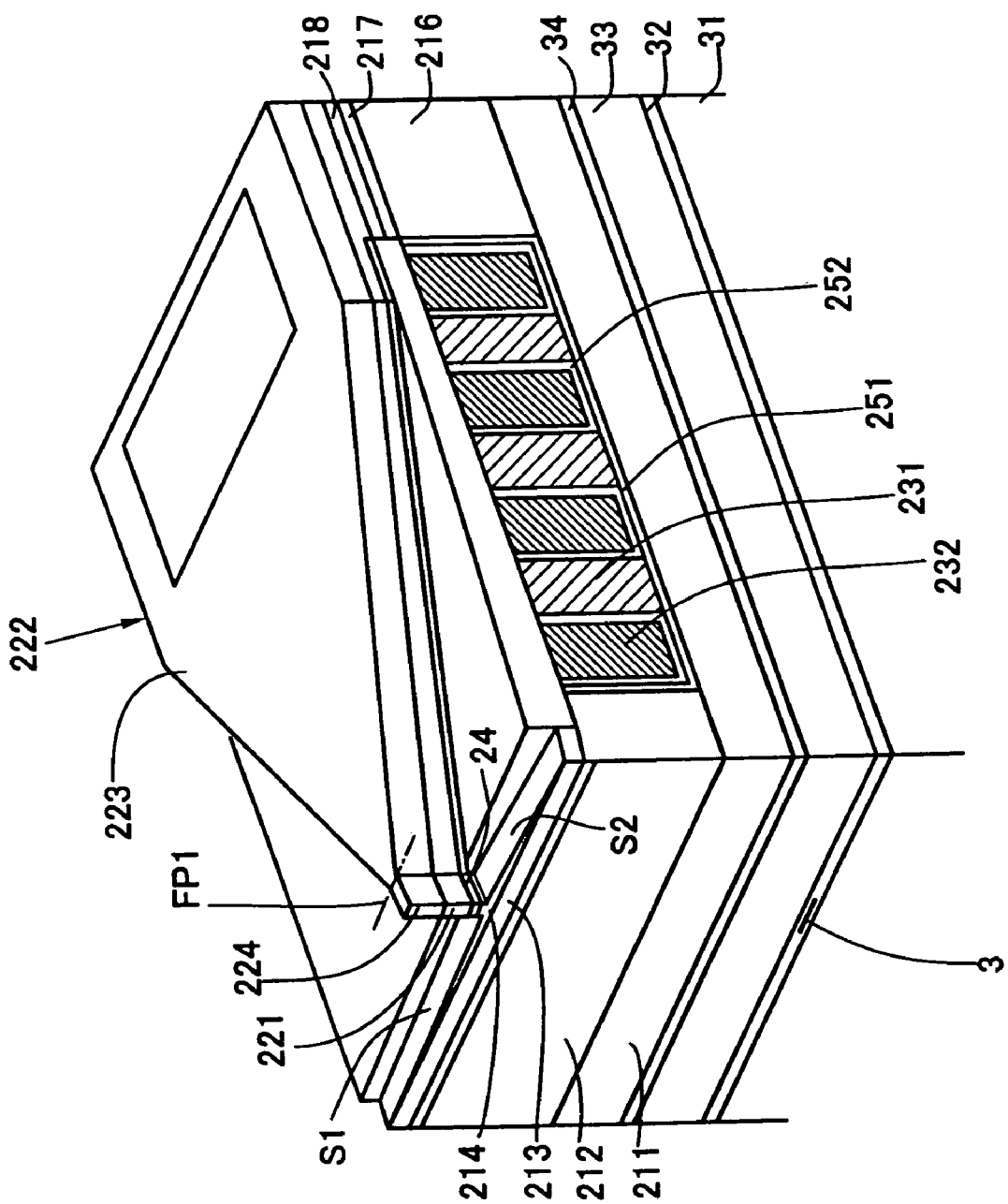
FIG. 5 is a perspective view showing a write element part cut out from the electromagnetic converter portion shown in FIGS. 3 and 4.

Referring to FIGS. 3 and 4, the write element 2 comprises a first yoke portion 211, a second yoke portion (221, 222), a gap film 24 made of alumina or the like, a first pole portion P1, a second pole portion P2, a first coil 231 and a second coil 232. The first yoke portion 211 is formed of a first magnetic film. In the illustrated embodiment, as the first yoke portion 211 is formed of a first magnetic film of one layer, the first yoke portion 211 has the same meaning as the first magnetic film. For simplification, the following description may sometimes represent the first yoke portion 211 as the first magnetic film 211.

The first magnetic film 211 is supported by an insulating film 34 and its surface is made substantially flat. The insulating film 34 is made of an inorganic insulating material such as $Al_2O_3$, $SiO_2$, AlN or DLC.

The second yoke portion (221, 222) faces the first yoke portion 211 with an inner gap between the second yoke portions and the inner gap. In the illustrated embodiment, the second yoke portion (221, 222) has a structure in which a second magnetic film 221 and a third magnetic film 222 are stacked. For simplification of the description, the second yoke portion (221, 222) may be sometimes represented as the second magnetic film 221 and the third magnetic film 222.

The first magnetic film 211, the second magnetic film 221 and the third magnetic film 222 can be made of one or more magnetic materials selected from NiFe, CoFe, CoFeN, CoNiFe, FeN, FeZrN and the like. Each of the first magnetic film 211, the second magnetic film 221 and the third magnetic film 222 is determined within a range of 0.25 to 3 µm in thickness, for example. Such first magnetic film 211, second magnetic film 221 and third magnetic film 222 can be formed by a frame-plating method.

In the illustrated embodiment, it is assumed that the first magnetic film 211 is made of CoFeN or CoNiFe. The third magnetic film 222 can be made of CoNiFe, and the second magnetic film 221 can be made of CoFeN being high in saturation magnetic flux density.

The front end portions of the first magnetic film 211, the third magnetic film 222 and the second magnetic film 221 form parts of the first pole portion P1 and the second pole portion P2 opposite each other with a very thin gap film 24, and a write operation is performed in the first pole portion P1 and the second pole portion P2. The gap film 24 is made of a non-magnetic metal film or an inorganic insulating film such as alumina.

In the illustrated embodiment, the first pole portion P1 has a structure in which a second pole piece 212, a third pole piece 213 and a fourth pole piece 214 are deposited in this order on a first pole piece formed of an end portion of the first magnetic film 211. The second pole piece 212, the third pole piece 213 and the fourth pole piece 214 are made of an HiBs material such as CoFeN or CoNiFe.

The second pole portion P2 has a structure in which a fifth pole piece formed of an end portion of the second magnetic film 221 and a sixth pole piece 224 formed of an end portion of the third magnetic film 222 are deposited in this order on the gap film 24.

Referring to FIG. 4, the end portion of the first magnetic film 211, the second pole piece 212 and the third pole piece 213 spread in the track width direction of the ABS. However, the fourth pole piece 214 has the upper end portion narrowed at both sides in the track width direction to produce a narrow track width PW (see FIG. 4), and the gap film 24 deposited thereon, the fifth pole piece formed of the end portion of the second magnetic film 221 and a sixth pole piece 224 formed of the end portion of the third magnetic film 222 have also nearly the same narrow track width PW as the fourth pole piece 214. Consequently, the narrow track width PW for high-density recording is obtained.

The third magnetic film 222 and the second magnetic film 221 extend to the rear side of the ABS 52, 53 as keeping an inner gap between the first magnetic film 211 and them, and are connected to the first magnetic film 211 by back gap pieces 216, 217 and 218.

In the illustrated embodiment, the inner gap is filled up with insulating films 254 to 256 and the gap film 24, and the second yoke portion comprised of the second magnetic film 221 and the third magnetic film 222 is formed on the gap film 24.

The second yoke portion comprised of the second magnetic film 221 and the third magnetic film 222 comprises a wide portion 223 and a narrow portion 224. The wide portion 223 has a flat surface and is connected to the first magnetic film 211 by the back gap portion (216 to 218) that is recessed in the thin film magnetic head from the ABS 52, 53. Consequently, a write magnetic circuit going through the first magnetic film 211, the back gap portion (216 to 218), the second magnetic film 221, the third magnetic film 222 and a write gap film 24 is formed. The narrow portion 224 forms the second pole portion P2.

In the first pole portion P1, a magnetic film adjacent to the gap film 24, i.e. the fourth pole piece 214 is etched at both sides in width direction so as to have a narrowed portion having substantially the same width as the second pole portion P2. A base portion (S1, S2), which is left on bottoms of indentations formed on both sides of the narrowed portion by etching and is connected to the narrowed portion, increases in thickness toward the narrowed portion. This structure makes it possible to avoid magnetic saturation in the fourth pole piece 214 adjacent to the gap film 24, and consequently improve the over-write characteristic. In the illustrated embodiment, the base portion (S1, S2) has gently sloping surfaces. The base portion may, however, be formed not to have gently sloping surfaces.

The fourth pole piece 214 adjacent to the gap film 24 is made of a magnetic material containing Co and Fe and, more specifically, is made of CoFe or CoFeN. CoFe or CoFeN is an HiBs material of 2 to 2.4 T in saturation magnetic flux density. The fourth pole piece 214 may be formed as a sputtering film of FeN, CoFe or CoFeN. Also, in the second pole portion P2, the second magnetic film 221 adjacent to the gap film 24 is preferably made of the above-mentioned magnetic material.

Consequently, it is possible to achieve a thin film magnetic head having a track width PW of 0.1 to 0.2 μm and suitable for a high areal recording density of 100 Gb/p or more.

In the illustrated embodiment, the coil comprises a first coil 231 and a second coil 232. The first and second coils 231 and 232 surround in a spiral form the back gap portion (216 to 218) on a first insulating film 251 formed on the flat surface of the first magnetic film 211, which forms the first yoke portion. One of the first and second coils 231 and 232 is fitted into the space between coil turns of the other, insulated from the coil turns of the other by a second insulating film 252, and the first and second coils 231 and 232 are connected to each other so as to generate magnetic flux in the same direction.

The second insulating film 252 between the first coil 231 and the second coil 232 can be formed as a very thin $Al_2O_3$ film of about 0.1 μm in thickness by applying chemical vapor deposition (hereinafter, referred to as CVD) or the like. Therefore, it is possible to maximize sectional areas of the first and second coils 231 and 232 between the back gap portion (216 to 218) and the first pole portion P1, and consequently decrease the resistance of the coils and the quantity of generated heat as keeping the number of coil turns. This makes it possible to suppress occurrence of a thermal protrusion in the pole portions P1 and P2, and consequently avoid a head crash and the damage or destruction of a magnetic record on a magnetic recording medium and meet a demand for a low floating height for a high recording density.

As one of the first and second coils 231 and 232 is fitted into the space between coil turns of the other, insulated from the coil turns of the other by the second insulating film 252, a high wiring density of coil conductors is achieved. This makes it possible to shorten the yoke length YL as keeping the same number of coil turns.

The first coil 231 and the second coil 232 are connected to each other so as to generate magnetic flux in the same direction. As the first and second coils 231 and 232 are the same in winding direction, it is possible to generate magnetic flux in the same direction by making a series-connection structure in which the inner end of the first coil 231 is connected to the outer end of the second coil 232. Alternatively, magnetic flux may be generated in the same direction by connecting the first coil 231 to the second coil 232 in parallel. The parallel connection offers a reduction in coil resistance though a decrease in the number of coil turns.

In the illustrated embodiment, the upper surfaces of the first coil 231 and the second coil 232 form the same plane. This structure makes it possible to form the common insulating film 254 on the upper surfaces of the first and second coils 231 and 232, which offers simplification of an insulating structure on the upper surfaces of the first and second coils 231 and 232. And this structure provides a stable base for forming another coil above the first and second coils 231 and 232, so said another coil can be formed as a high-accuracy pattern.

In case of providing another coil on the first and second coils 231 and 232, the upper surfaces of the second pole piece 212 and the back gap piece 216 are also made to form the same plane as the upper surfaces of the first and second coils 231 and 232 in addition to flattening the upper surfaces of the first and second coils 231 and 232. By doing so, a pole piece and a back gap piece required for providing another coil can be formed as a high-accuracy pattern on the flattened upper surfaces of the second pole piece 212 and the back gap piece 216.

Next, referring to FIGS. 3 to 6, the first and second coils 231 and 232 surround the back gap portion (216 to 218). The first coil 231 is in a spiral shape and is formed on the surface of the insulating film 251 formed on the flat surface of the first magnetic film 211, and the pattern of the first coil 231 is wound in a flat form around an axis perpendicular to the surface of the insulating film 251. The first coil 231 is made of a conductive metal material such as Cu (copper). The insulating film 251 is made of an inorganic insulating material such as $Al_2O_3$, $SiO_2$, AlN or DLC.

The second coil 232 is also in a spiral shape and is fitted into the space between coil turns of the first coil 231, insulated from the coil turns by the insulating film 252, and the pattern of the second coil 232 is wound in a flat form around the axis. The second coil 232 is also made of a conductive metal material such as Cu (copper). The insulating film 252 is made of an inorganic insulating material such as $Al_2O_3$, $SiO_2$, AlN or DLC.

The periphery of the first coil 231 and the second coil 232 is filled up with an insulating film 253 (see FIG. 3). The insulating film 253 is also made of an inorganic insulating material such as $Al_2O_3$, $SiO_2$, AlN or DLC.

The insulating film 252 between the first coil 231 and the second coil 232 can be formed as a very thin $Al_2O_3$ film of about 0.1 μm in thickness by applying a CVD process or the like. Therefore, it is possible to maximize the first coil 231 and the second coil 232 in sectional area, and consequently decrease the coil resistance and the quantity of generated heat as keeping the number of coil turns. This makes it possible to suppress occurrence of a thermal protrusion in the pole portions P1, P2 during a write operation, and consequently avoid a head crash, damage and destruction of a magnetic record on a magnetic recording medium and meet a demand for a low floating height for a high recording density.

As the second coil 232 is fitted into the space between coil turns of the first coil 231, insulated from the coil turns by the insulating film 252, high wiring density of coil conductors is achieved. This makes it possible to shorten the yoke length YL (see FIG. 3) as keeping the same number of coil turns and so, the high-frequency characteristic is improved.

The first coil 231 and the second coil 232 are connected to each other so as to generate magnetic flux in the same direction. As the first coil 231 and the second coil 232 have the same winding direction, it is possible to generate the magnetic flux in the same direction by making a series-connection structure in which the inner end 281 of the first coil 231 and the outer end 283 of the second coil 232 are connected to each other by a connecting conductor 282. The outer end 286 of the first coil 231 is connected to a terminal 284 by a connecting conductor 285, led outside by a lead conductor 291 and connected to a takeout electrode. The inner end 287 of the second coil 232 is connected to a terminal 289 by a connecting conductor 288, led outside by a lead conductor 292 and connected to a takeout electrode.

Figure 6:
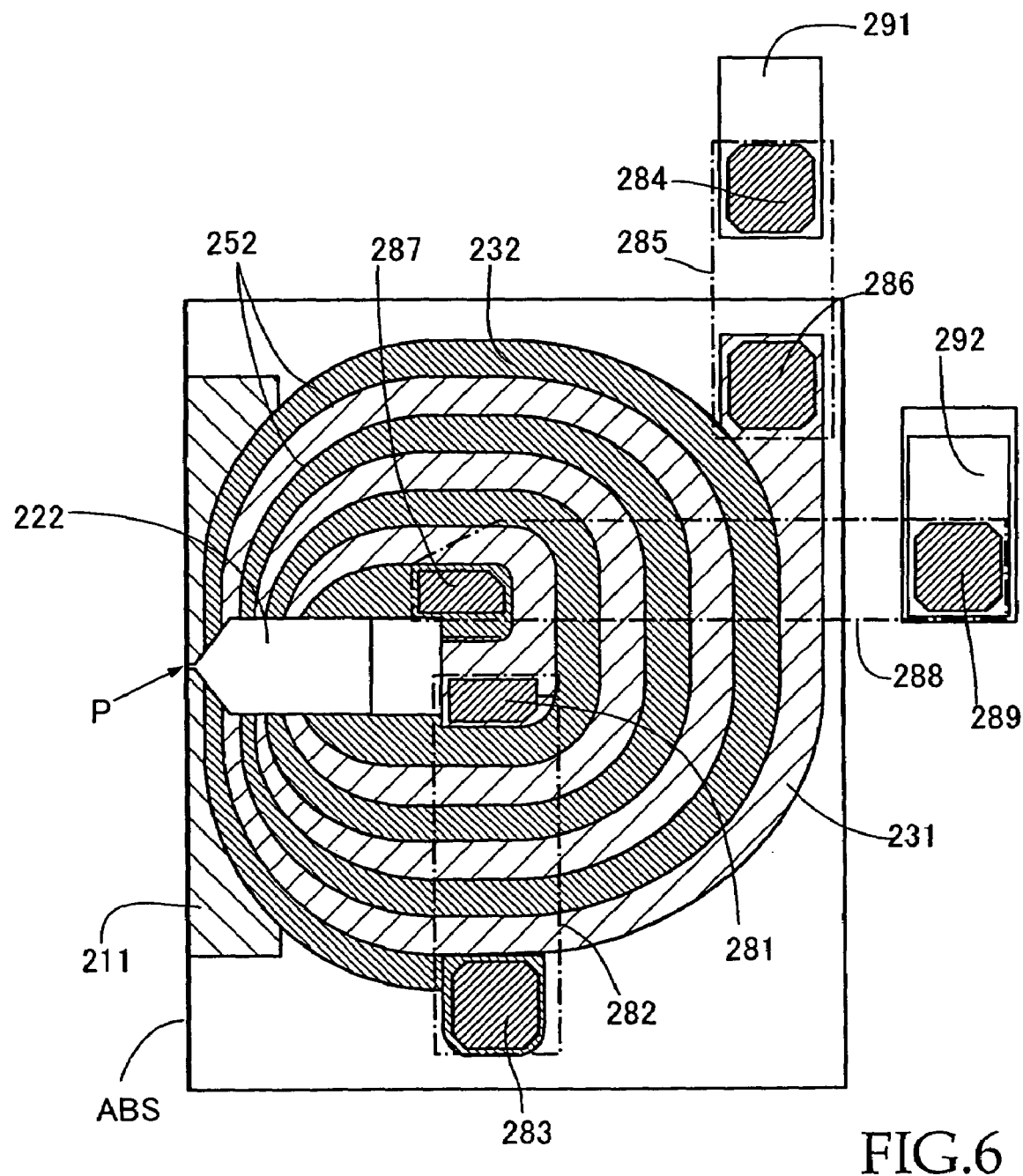
FIG. 6 is a plan view showing a coil structure of the write element part in the electromagnetic converter portion shown in FIGS. 3 to 5.

Unlike the structure shown in FIG. 6, magnetic flux may be generated in the same direction by connecting the first coil 231 and the second coil 232 in parallel with each other. The parallel connection offers a reduction in coil resistance though a decrease in the number of coil turns.

Moreover, the second coil 232 is separated from the second pole piece 212 and the back gap piece 216 by the insulating film 252 which can be formed as a very thin film of about 0.1 μm in thickness by applying CVD or the like. This makes it possible to promote shortening of the yoke length YL.

The upper surfaces of the first coil 231 and the second coil 232 form the same plane. This structure makes it possible to form a common insulating film 254 on the upper surfaces of the first coil 231 and the second coil 232 and so, an insulating structure on the upper surfaces of the first coil 231 and the second coil 232 is simplified. And this structure makes it possible to form a flat and stable base face on the first coil 231 and the second coil 232 and thereafter form a high-accuracy pattern.

In this case, the first coil 231 is a plating film and is formed on an insulating film 251 deposited on one surface of the first magnetic film 211. The second coil 232 is also a plating film and is formed on an insulating film 252 in the space between coil turns of the first coil 231. The insulating film 252 is formed on the bottom face and both side faces of the aforesaid space.

A protective film 258 covers the whole write element 2. The protective film 258 is made of an inorganic material such as $Al_2O_3$ or $SiO_2$.

In the vicinity of the read element 3, there are provided a first shield film 31, an insulating film 32 and a second shield film 33. The first shield film 31 and the second shield film 33 are made of NiFe or the like. The first shield film 31 is formed on an insulating film 16 made of $Al_2O_3$, $SiO_2$ or the like. The insulating film 16 is formed on the surface of a base body 15 made of $Al_2O_3$—TiC or the like.

The read element 3 is provided inside the insulating film 32 between the first shield film 31 and the second shield film 33. The end face of the read element 3 comes out at the ABS 52, 53. The read element 3 comprises a giant magneto-resistance effect element (GMR element). The GMR element can be formed of a spin valve film or a ferromagnetic tunnel junction element.

Figure 7:
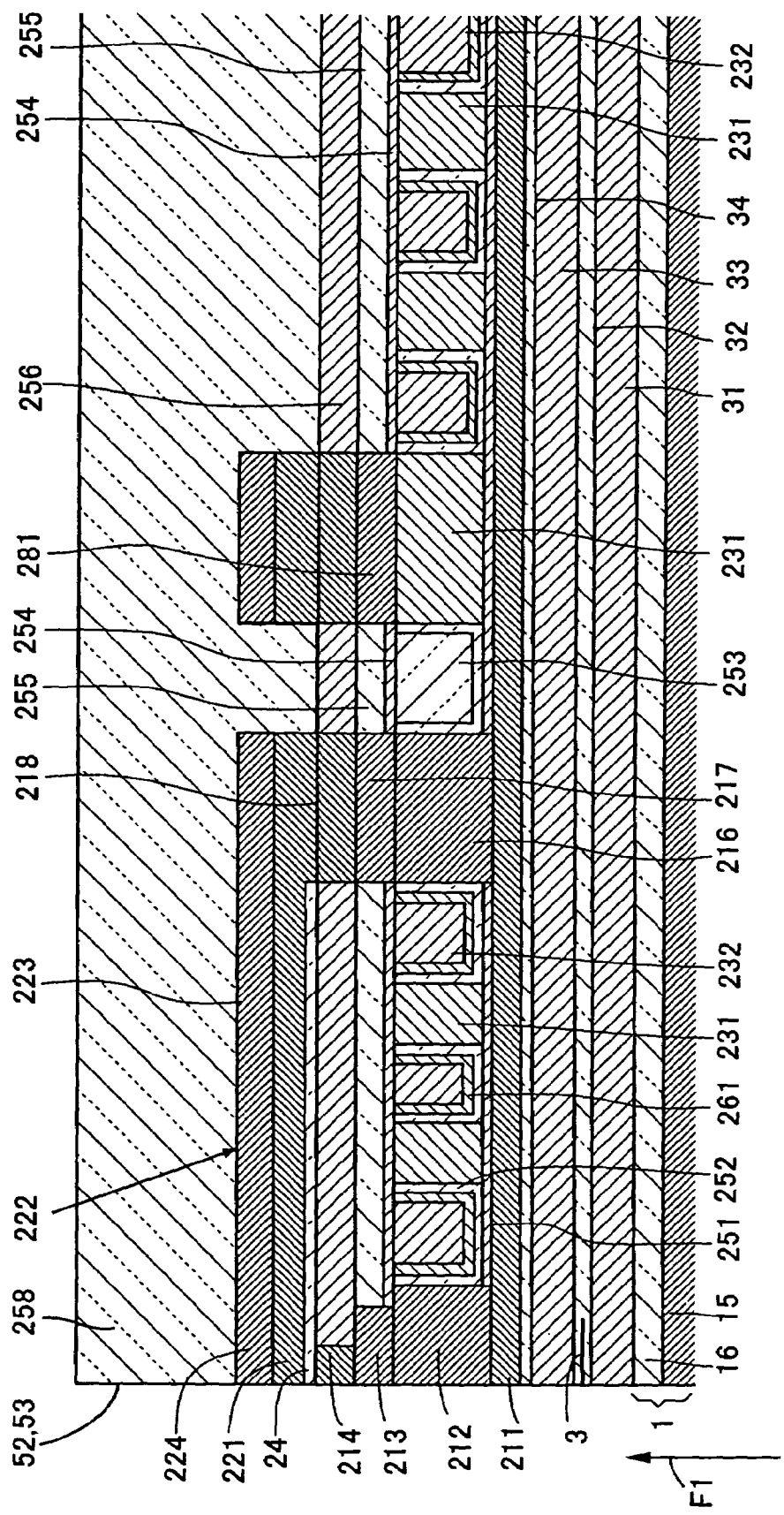
FIG. 7 is a magnified sectional view of another embodiment of an electromagnetic converter portion of a thin film magnetic head according to the present invention.
Figure 8:
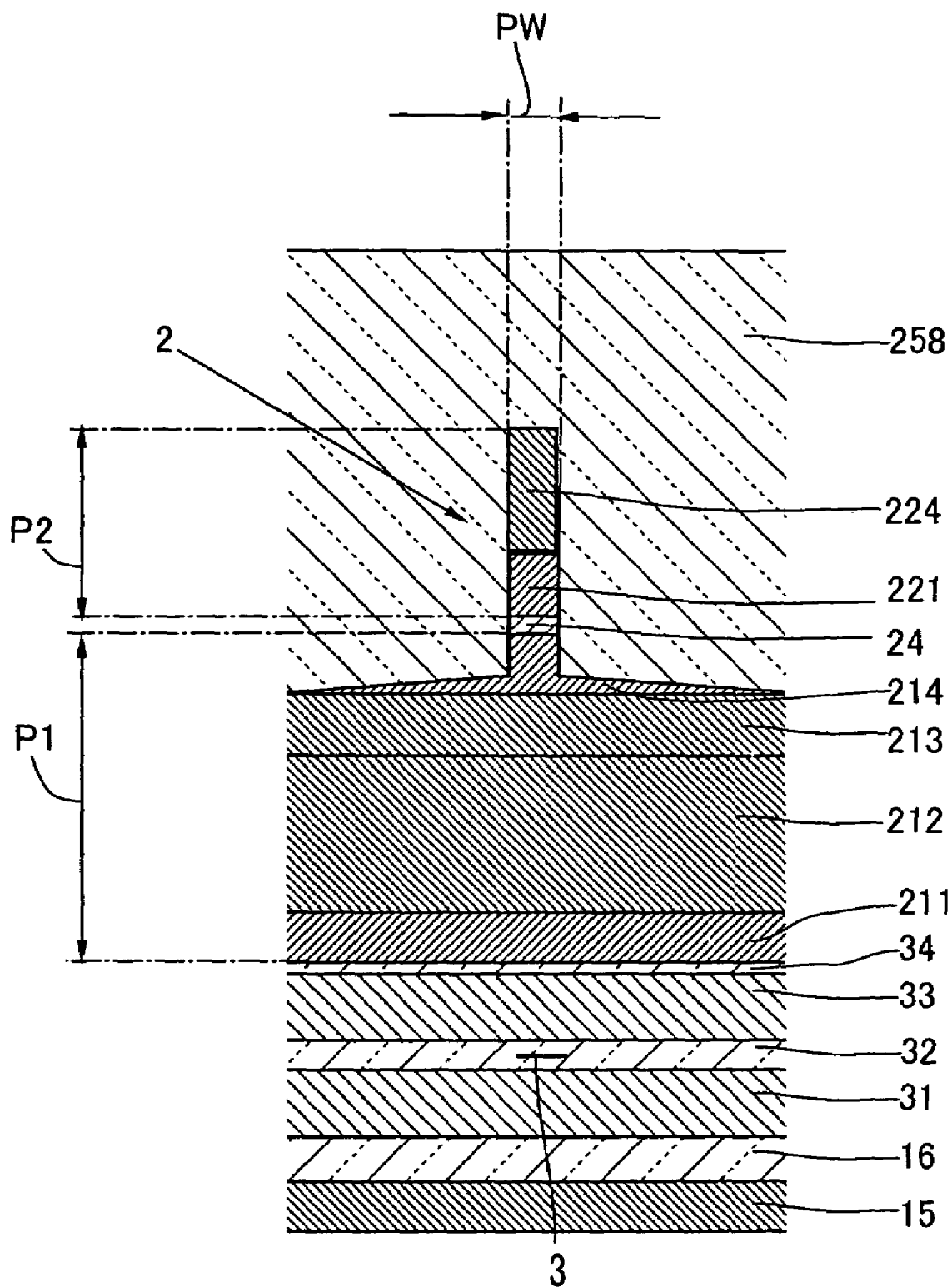
FIG. 8 is a diagram of the electromagnetic converter portion shown in FIG. 7, seen from the ABS side.

Next, another embodiment of a thin film magnetic head according to the present invention is described with reference to FIGS. 7 and 8. In FIGS. 7 and 8, the same components as those shown in FIGS. 1 to 6 are given the same reference symbols. A thin film magnetic head of the illustrated embodiment has the same basic structure as the thin film magnetic head shown in FIGS. 1 to 6.

One of differences between a thin film magnetic head shown in FIGS. 7 and 8 and the thin film magnetic head illustrated and described in FIGS. 1 to 6 is that in the thin film magnetic film shown in FIGS. 7 and 8, conductive layers 282 to 285 are deposited on the inner end 281 of the first coil 231 and a connecting conductor for connecting the first coil 231 to the second coil 232 is formed. The conductive layers 282 to 285 are respectively formed and patterned by the same processes as those of the third pole piece 213, the fourth pole piece 214, the second magnetic film 221 and the third magnetic film 222.

Consequently, the thin film magnetic head shown in FIGS. 7 and 8 has the advantage of simplifying a process of forming a connecting conductor for connecting the first coil 231 to the second coil 232, in addition to the advantages in the thin film magnetic head shown in FIGS. 1 to 6.

Figure 9:
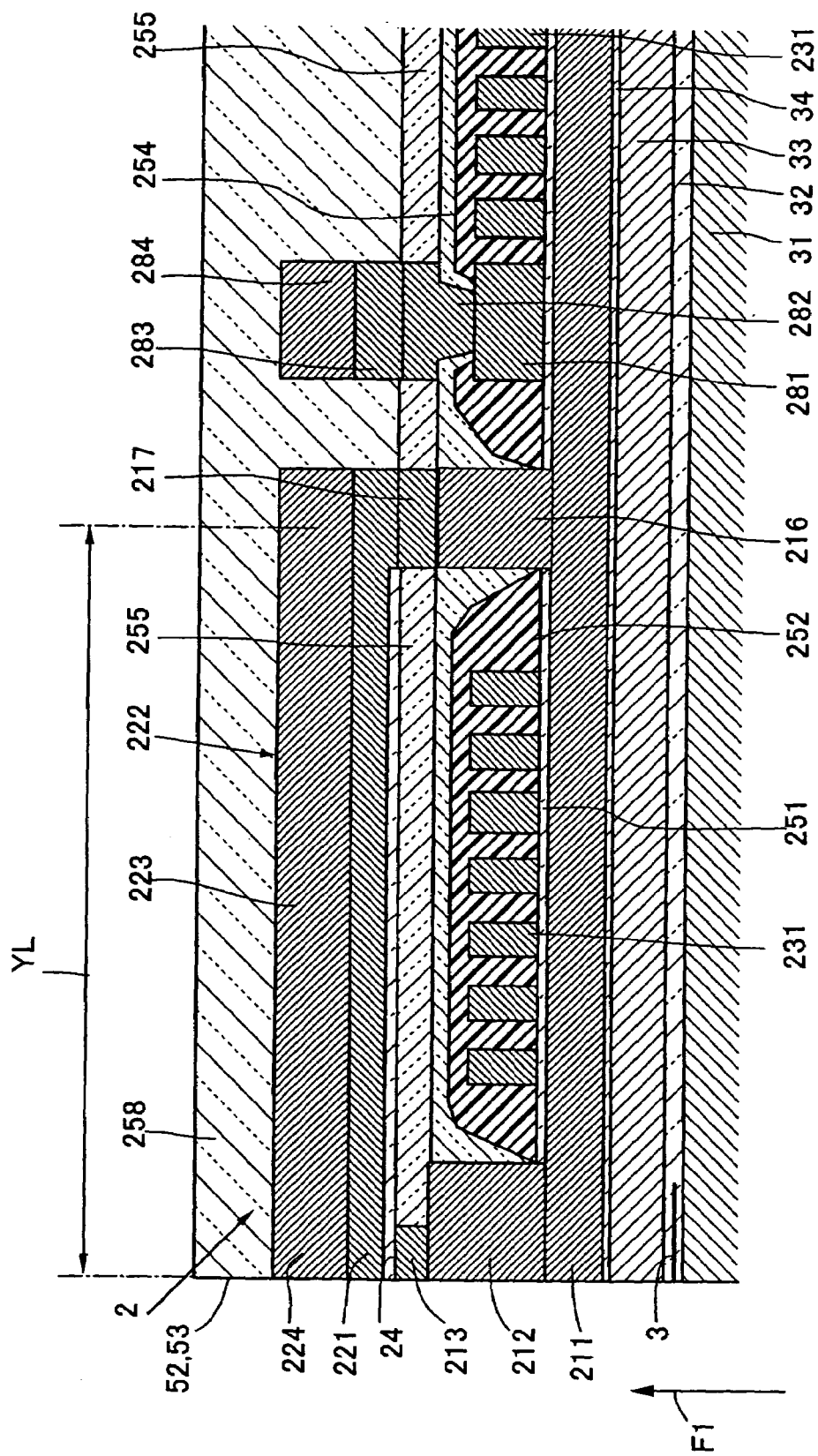
FIG. 9 is a magnified sectional view of still another embodiment of an electromagnetic converter portion of a thin film magnetic head according to the present invention.

Still another embodiment of a thin film magnetic head according to the present invention is described with reference to FIG. 9. In FIG. 9, the same components as those shown in FIGS. 1 to 6 are given the same reference symbols. A thin film magnetic head of the illustrated embodiment has the same basic structure as the thin film magnetic head shown in FIGS. 1 to 6.

Figure 10:
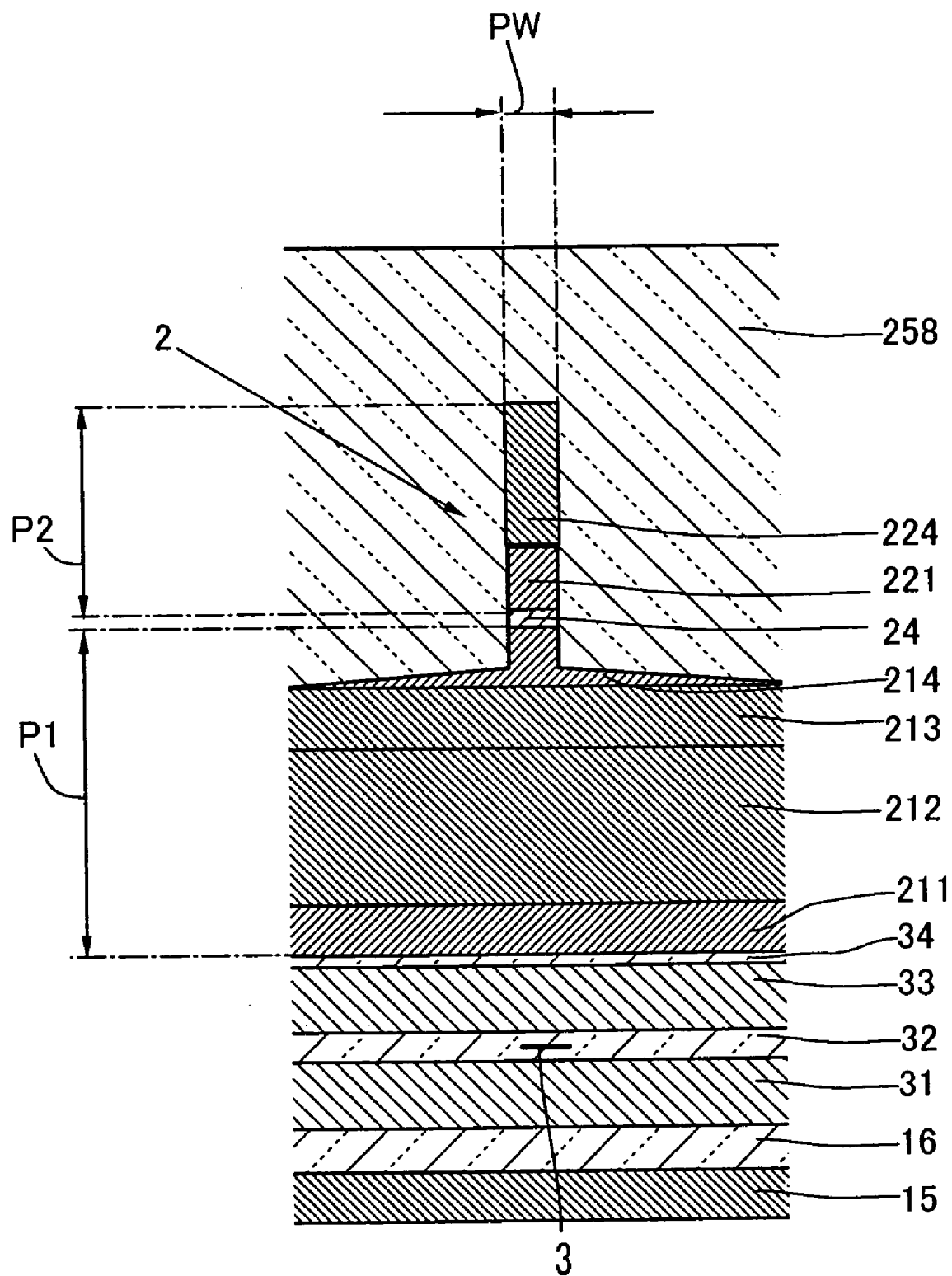
FIG. 10 is a diagram of the electromagnetic converter portion shown in FIG. 9, seen from the ABS side.

One of differences between a thin film magnetic film shown in FIG. 9 and the thin film magnetic head illustrated and described in FIGS. 1 to 6 is that in the thin film magnetic head shown in FIGS. 9 and 10, conductive layers 282 to 284 are deposited on the inner end 281 of the first coil 231 and a connecting conductor for connecting the first coil 231 to the second coil 232 is formed. The conductive layers 282 to 284 are respectively formed and patterned by the same processes as those of the third pole piece 213, the second magnetic film 221 and the third magnetic film 222. The thin film magnetic head shown in FIGS. 9 and 10 has the advantage of simplifying a process of forming a connecting conductor for connecting the first coil 231 to the second coil 232, in addition to the advantages of the thin film magnetic head shown in FIGS. 1 to 6.

Another difference is that the head of FIGS. 9 and 10 has only the first coil 231, the space between coil turns of the first coil 231 being filled with the insulating film 252, the insulating film 252 being covered with an insulating film 254.

2. Method for Manufacturing a Thin Film Magnetic Head (1) EMBODIMENT 1

Embodiment 1 relating to a manufacturing method is a method for manufacturing a thin film magnetic head of a first aspect having a first coil 231 and a second coil 232 (FIGS. 1 to 6). It is notified in advance that processes illustrated in FIGS. 11 to 35 are performed on a wafer.

Figure 11:
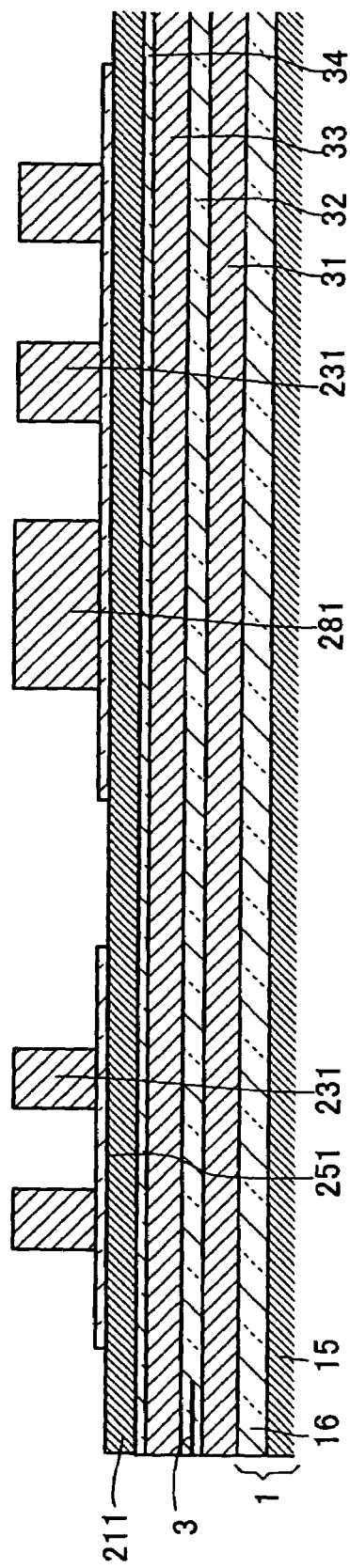
FIG. 11 is a diagram showing a process of manufacturing a thin film magnetic head having the electromagnetic converter portion shown in FIGS. 3 to 6.

<Process Leading to a State of FIG. 11>

Referring to FIG. 11, on an insulating film 16 deposited on a base body 15 there are formed a first shield film 31, a read element 3, an insulating film 32, a second shield film 33, an insulating film 34 and a first magnetic film 211 by means of publicly known processes.

In a specific example, the insulating film 16 is an alumina film, formed in a thickness of 3 μm or the like. The first shield film 31 is made of a magnetic material such as NiFe, formed 2 to 3 μm thick by a frame-plating method. The insulating film 32 is, in general, formed by two steps: in the first step, an alumina film of 3 to 4 μm in thickness is formed and after that, the surface of the alumina film is flattened by CMP and then an GMR element 3 to be a read element is formed; and in the second step, an alumina film covering the GMR element 3 is formed. The second shield film 33 is made of a magnetic material such as NiFe, formed 2 to 3 μm thick. The insulating film 34 is formed as an alumina film of 0.2 to 0.3 μm in thickness.

The first magnetic film 211 is made of CoNiFe (2.1T) or CoFeN (2.4T), formed 3.0 to 4.0 μm thick. On an end to be the first pole piece, of the first magnetic film 211, there may be formed a plating film of NiFe (80%:20%) or NiFe (45%:55%), or a sputtering film of FeAlN, FeN, FeCo, CoFeN or FeZrN, with a thickness of 0.5 to 0.6 μm.

After that, an insulating film 251 is formed, for example, 0.2 μm thick on the flat surface of the first magnetic film 211, the insulating film 251 having an area slightly larger than an area necessary for forming a coil, and then a seed film 260 is formed on the insulating film 251. The seed film 260 is formed so as to cover the surface of the insulating film 251 and the surface of the first magnetic film 211. The seed film 260 is made of a material suitable for a Cu-plating ground and formed 50 nm to 80 nm thick by a Cu-CVD process.

Next, a photoresist film is formed on the seed film 260 by applying a spin coating method or the like, and then is exposed through a mask having a coil pattern, and developed. Consequently, a resist frame having a specified pattern is formed. The photoresist film may be either positive photoresist or negative photoresist.

Next, a selective Cu-plating process is performed so that a first coil 231 is grown to be 3 to 3.5 μm thick on the seed film 260 inside the coil forming pattern. FIG. 11 shows a state in which the above-mentioned selective Cu-plating process has been performed.

Figure 12:
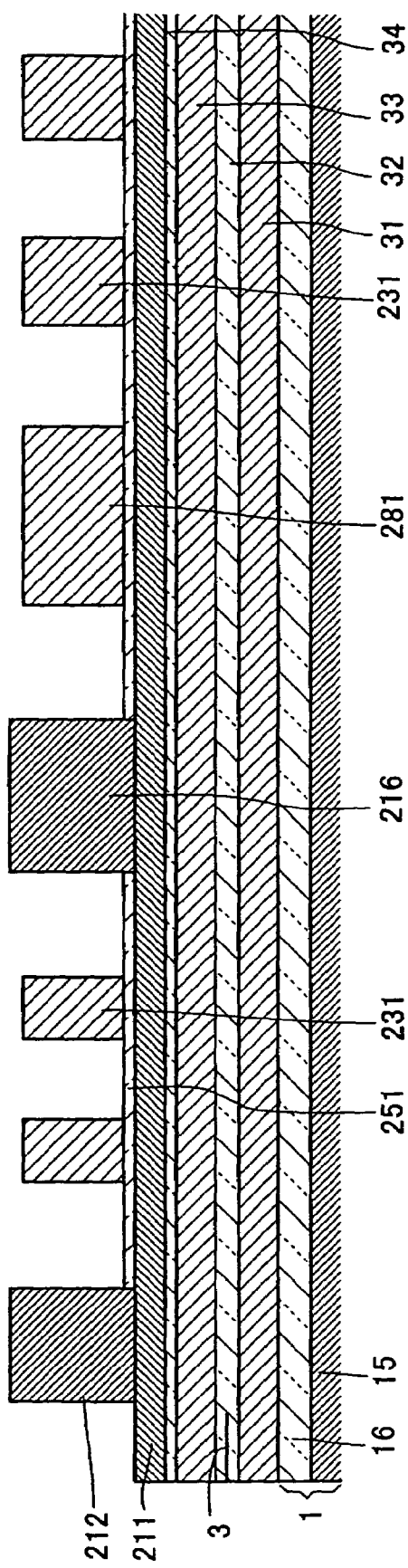
FIG. 12 is a diagram showing a process after the process shown in FIG. 11.

<Process Leading to a State of FIG. 12>

Next, a photolithography process for forming a second pole piece 212 and a back gap piece 216 is performed so that a resist frame for forming the second pole piece 212 and the back gap piece 216 is formed.

Next, a selective plating process is performed so that the second pole piece 212 and the back gap piece 216 are formed on the first magnetic film 211, and then the resist frame is removed by means of chemical etching or the like. Consequently, as shown in FIG. 12, the second pole piece 212 and the back gap piece 216 are formed with a space between them on one surface of the first magnetic film 211. The second pole piece 212 and the back gap piece 216 are, for example, made of CoNiFe (1.9 to 2.1T) and formed 3.5 to 4.0 μm thick.

Figure 13:
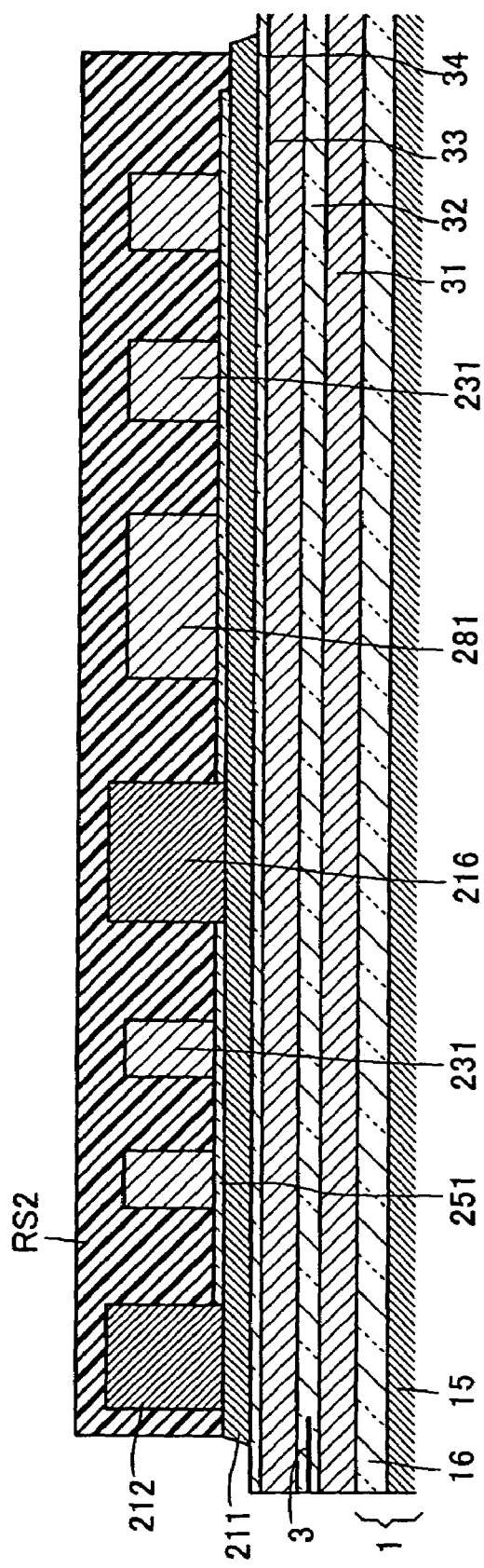
FIG. 13 is a diagram showing a process after the process shown in FIG. 12.

<Process Leading to a State of FIG. 13>

As shown in FIG. 13, a photoresist film RS2 covering the first coil 231, the pole piece 212 and the back gap piece 216 is formed. After that, a dry-etching such as reactive ion etching (hereinafter, referred to as RIE) or ion beam etching (hereinafter, referred to as IBE) is applied onto the first magnetic film 211, using the photoresist film RS2 as a mask, so as to pattern the first magnetic film 211.

Figure 14:
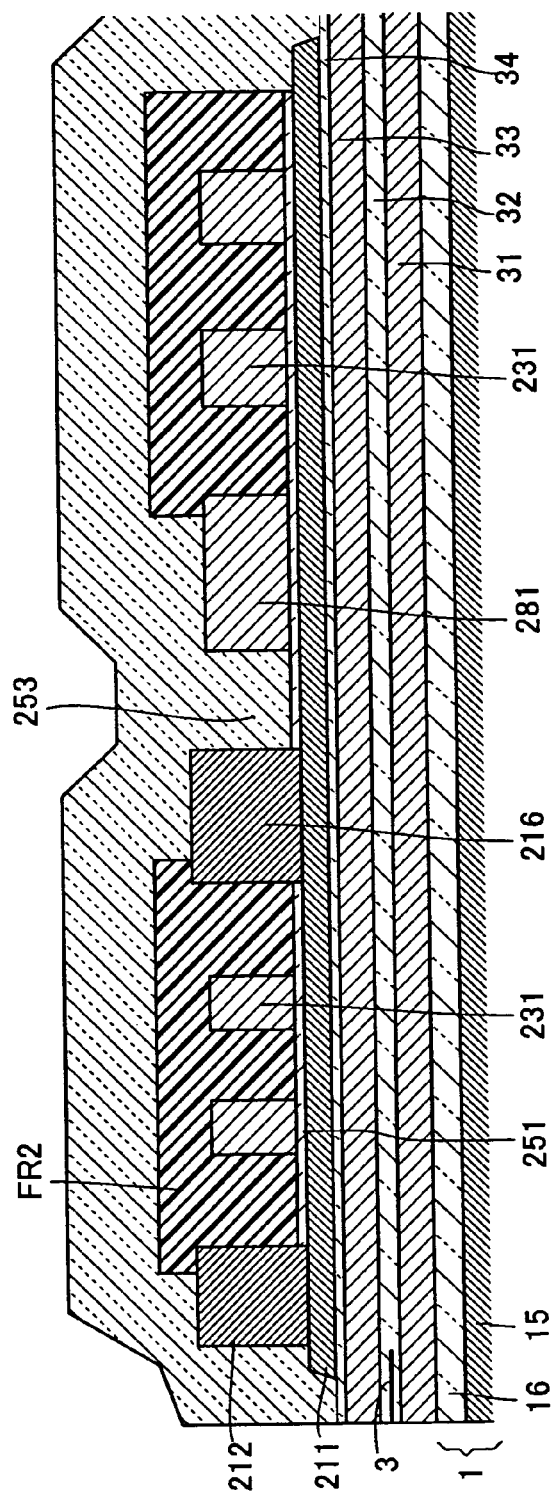
FIG. 14 is a diagram showing a process after the process shown in FIG. 13.

<Process Leading to a State of FIG. 14>

A photolithography process is applied onto the photoresist film RS2 in the state of FIG. 13, so that a resist cover FR2 covering the first coil 231 and periphery thereof is formed as shown in FIG. 14, and then an insulating film 253 covering the whole resist cover FR2 is deposited thereon. The insulating film 253 is formed 4 to 5 μm in thickness. FIG. 14 shows a state in which the insulating film 253 has been formed.

Figure 15:
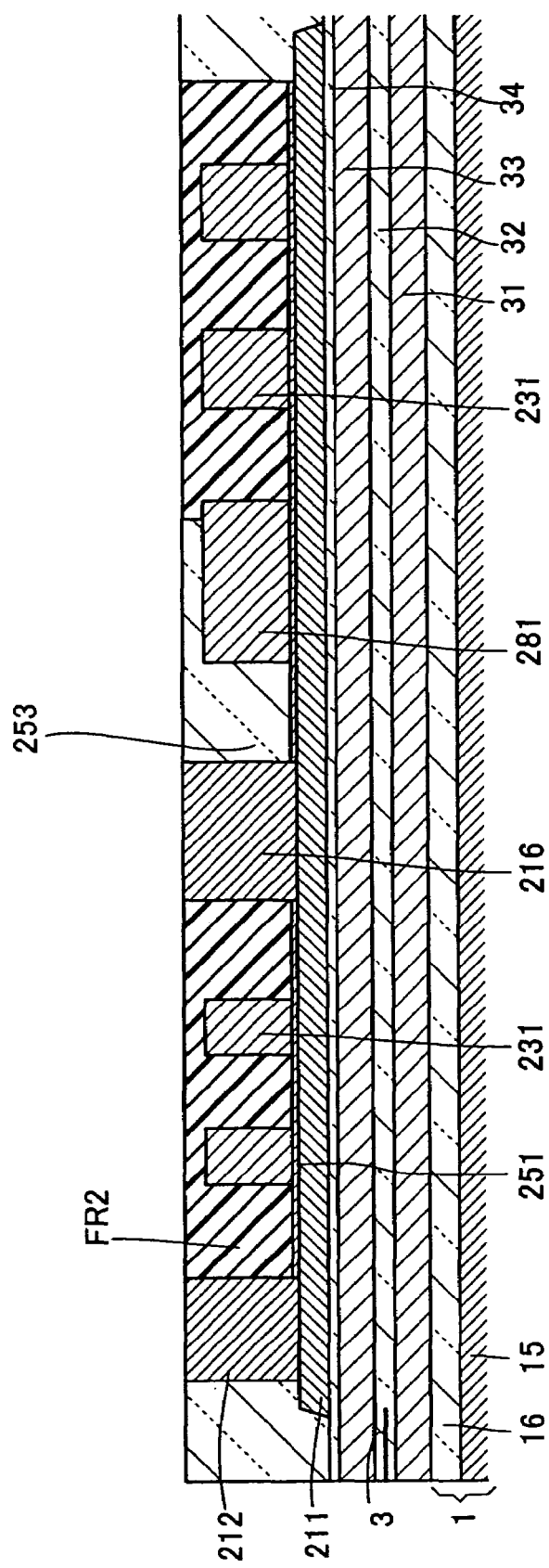
FIG. 15 is a diagram showing a process after the process shown in FIG. 14.

<Process Leading to a State of FIG. 15>

Next, the insulating film 253 and the resist cover FR2 are polished and flattened by chemical mechanical polishing (hereinafter, referred to as CMP). Alumina-based slurry is used in the CMP. FIG. 15 shows a state in which the CMP process has been performed.

Figure 16:
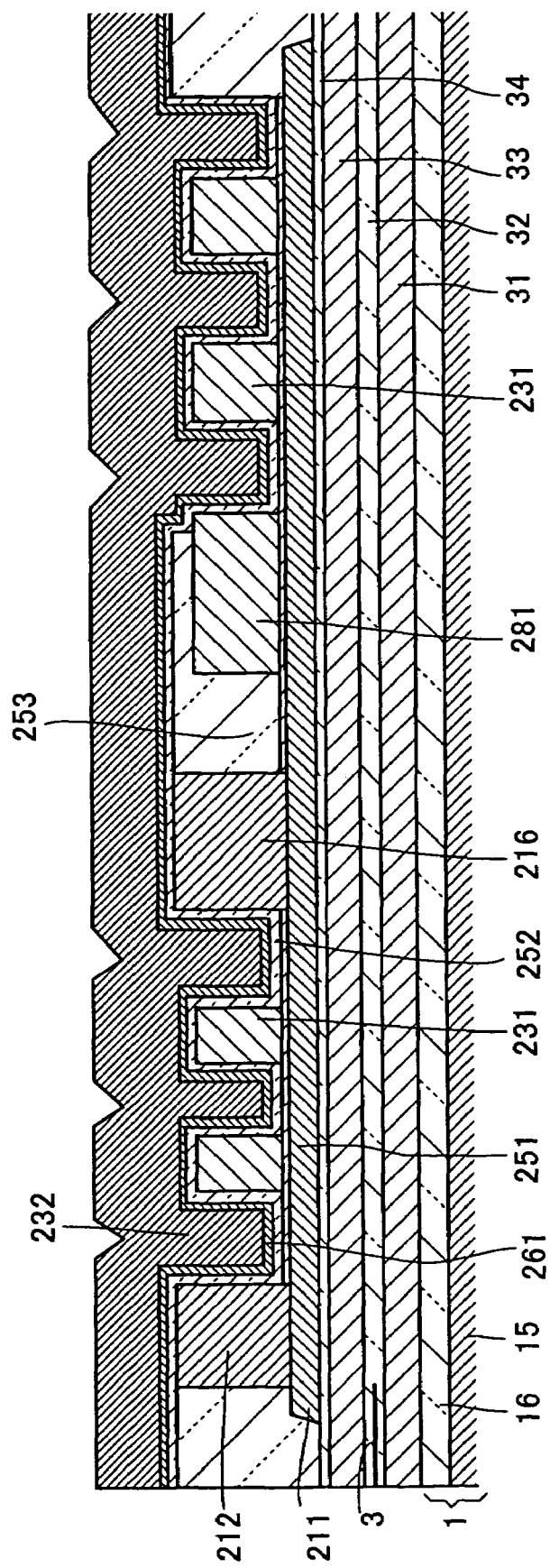
FIG. 16 is a diagram showing a process after the process shown in FIG. 15.

<Process Leading to a State of FIG. 16>

Next, the resist cover FR2 is removed and then, an insulating film 252 of 0.1 to 0.15 μm in thickness is deposited on the surfaces and side faces of the insulating films 251 and 253, the first coil 231, the second pole piece 212 and the back gap piece 216. When the insulating film 252 is formed as an $Al_2O_3$ film, it is possible to adopt an alumina-CVD film forming method of spraying $Al(CH_3)_3$ and $AlCl_3$ in an alternate and intermittent way under a low-pressure atmosphere of $H_2O$, $N_2$, $N_2O$ or $H_2O_2$.

Moreover, a seed film 261 is deposited on the surface of the insulating film 252 by Cu-CVD. For example, the seed film 261 is obtained by sputtering Cu to form a Cu film of 50 nm in thickness and applying CVD thereon to form a Cu film of 50 nm in thickness. This method provides film-forming with an excellent step coverage in a small area.

Next, a plating film 232 to be a second coil is formed, for example, 3 to 4 μm thick on the seed film 261. The plating film 232 comprises Cu as its main constituent. FIG. 16 shows a state in which the plating film 232 has been formed.

Figure 17:
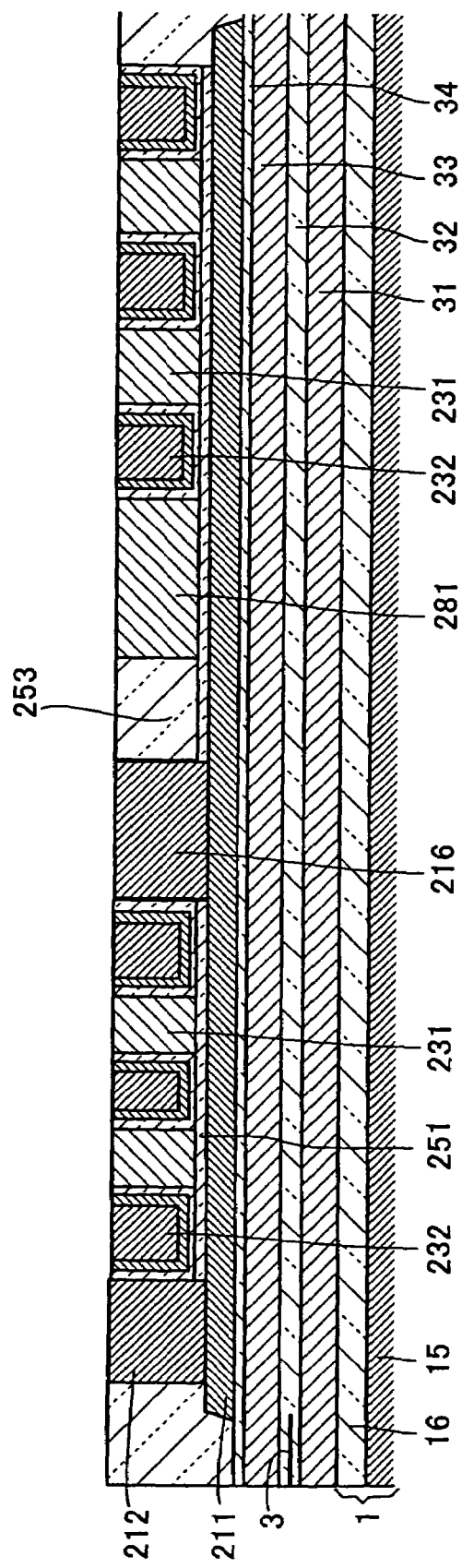
FIG. 17 is a diagram showing a process after the process shown in FIG. 16.

<Process Leading to a State of FIG. 17>

Next, as shown in FIG. 17, the plating film 232 is polished and flattened by CMP. Consequently, the second coil 232 of a spiral pattern is obtained, insulated from the first coil 231 by the insulating film 252. After the CMP, the second coil 232 becomes 2.5 to 3.0 μm thick, for example. In the CMP, the surfaces of the second pole piece 212, the back gap piece 216 and the insulating film 253 are also polished so as to form the same plane as the surfaces of the first coil 231 and the second coil 232.

Figure 18:
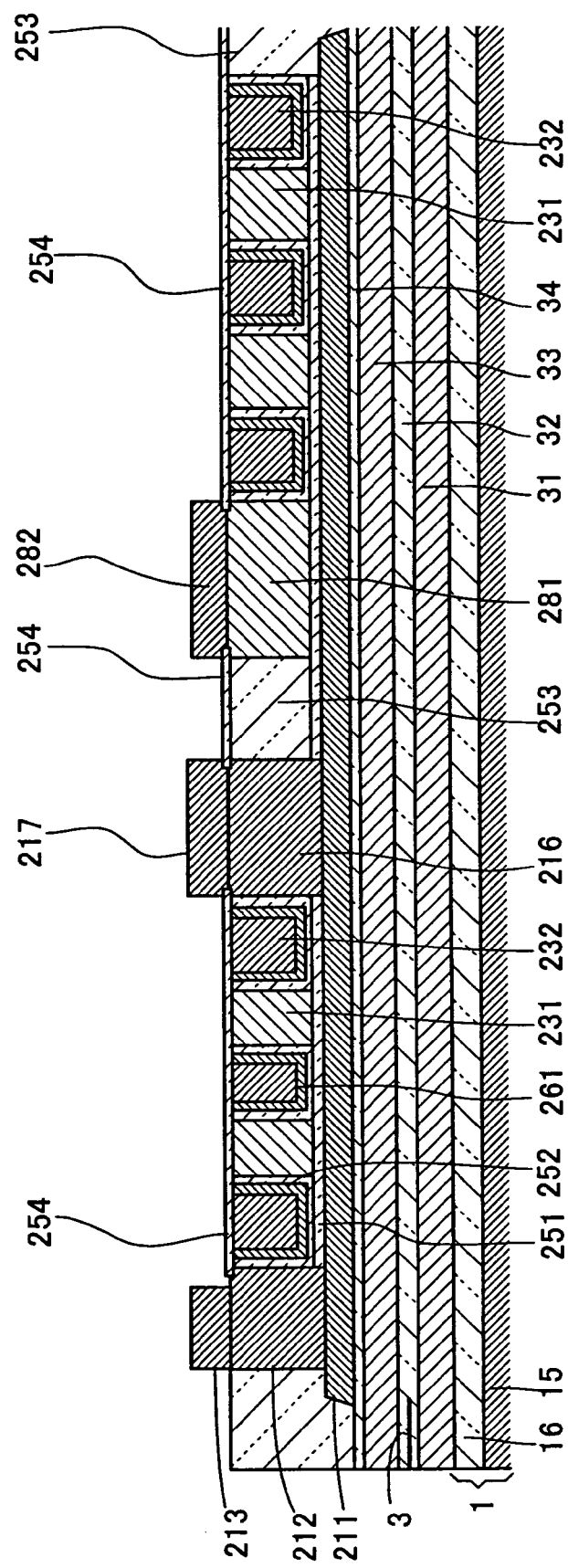
FIG. 18 is a diagram showing a process after the process shown in FIG. 17.

<Process Leading to a State of FIG. 18>

Next, an insulating film 254 covering the surfaces of the first coil 231 and the second coil 232 is deposited thereon. The insulating film 254 is made of $Al_2O_3$, formed 0.2 μm thick, for example.

Next, a photolithography process is performed on one surface where the insulating film 254 has been formed, so that a resist frame for forming a connecting conductor 282 for connecting the inner end 281 of the first coil 231 with the outer end 283 of the second coil 232 (see FIG. 6) and a resist frame for forming a third pole piece 213 and a back gap piece 217 (see FIG. 7) are formed. According to the patterns defined by the resist frames thus obtained, a frame-plating method is performed. Consequently, as shown in FIG. 18, the connecting conductor 282, the third pole piece 213 and the back gap piece 217 are formed. The connecting conductor 282, the third pole piece 213 and the back gap piece 217 each are plating films of CoFe or CoNiFe and are 1 to 2 μm thick, for example.

Figure 19:
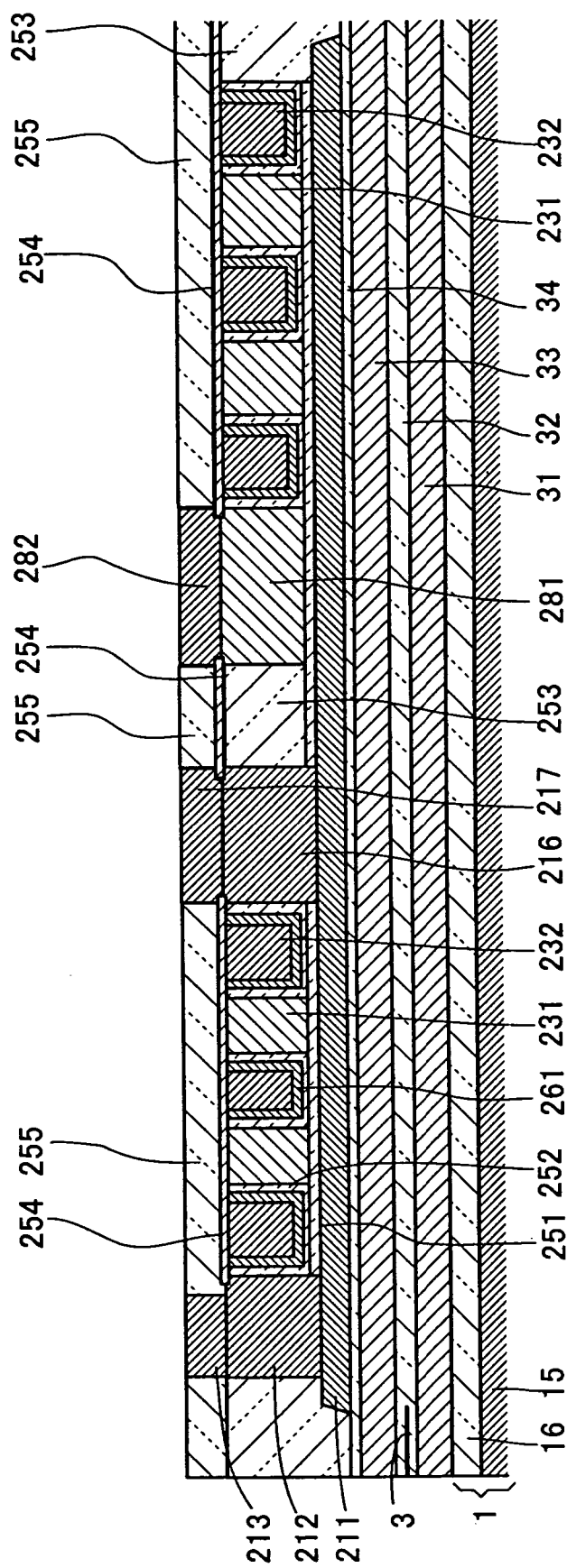
FIG. 19 is a diagram showing a process after the process shown in FIG. 18.

<Process Leading to a State of FIG. 19>

Next, an insulating film 255 of $Al_2O_3$ is deposited on the surface where the connecting conductor 282, the third pole piece 213 and the back gap piece 217 have been formed. The insulating film 255 is deposited 2 to 3 μm thick, for example. After that, the surfaces of the insulating film 255, the third pole piece 213, the back gap piece 217 and the connecting conductor 282 are polished by CMP. This CMP is performed so that the pole piece 213 and the back gap piece 217 become 0.2 to 0.6 μm thick. FIG. 19 shows a state in which the CMP has been performed.

Figure 20:
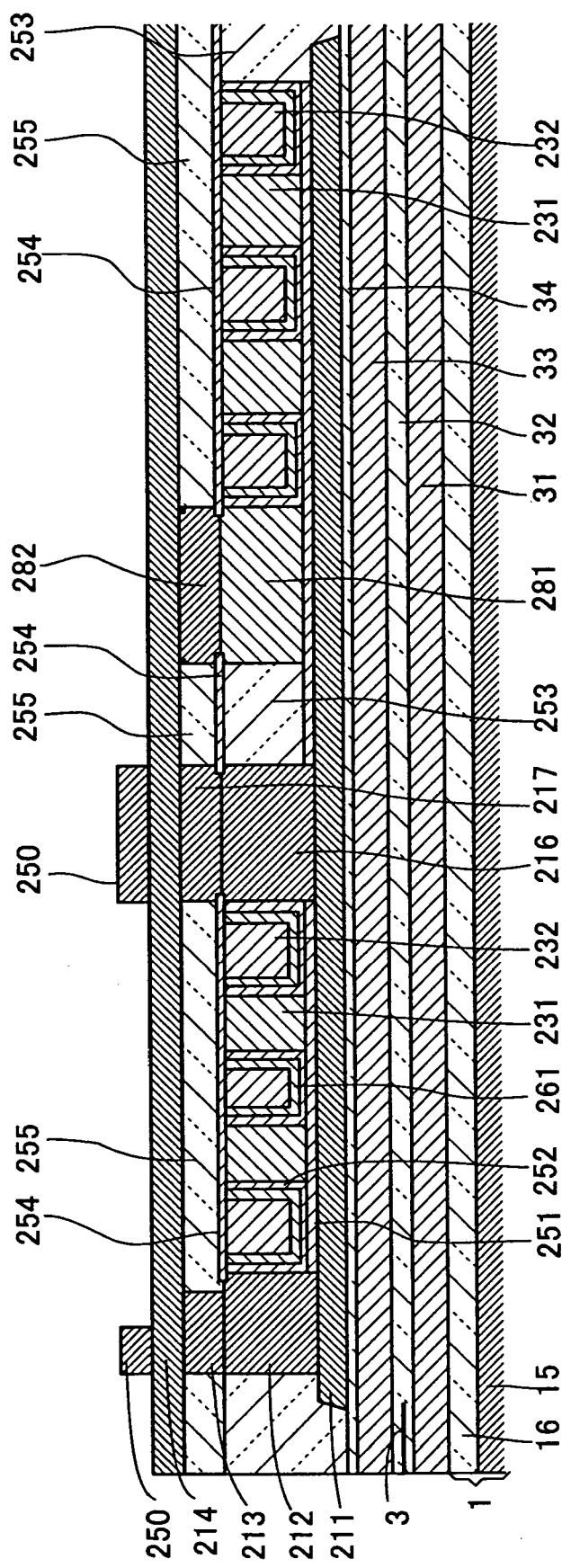
FIG. 20 is a diagram showing a process after the process shown in FIG. 19.

<Process Leading to a State of FIG. 20>

Next, as shown in FIG. 20, a magnetic film 214 to be a fourth pole piece 214 (see FIG. 3) is formed by sputtering on the polished surfaces of the insulating film 255, the third pole piece 213 and the back gap piece 217. The magnetic film 214 is formed 0.5 to 1 μm thick, for example. The magnetic film 214 can be made of CoFeN (2.4 T), FeAlN, FeN, FeCo or FeZrN. In this embodiment, the magnetic film 214 is made of CoFeN (2.4 T). Moreover, a pattern-plating film 250 of NiFe, CoNiFe or the like is formed by a frame-plating method on the surface of the magnetic film 214. The pattern-plating films 250 are formed right above the back gap pieces 216 and 217 and right above the third pole piece 213.

Figure 21:
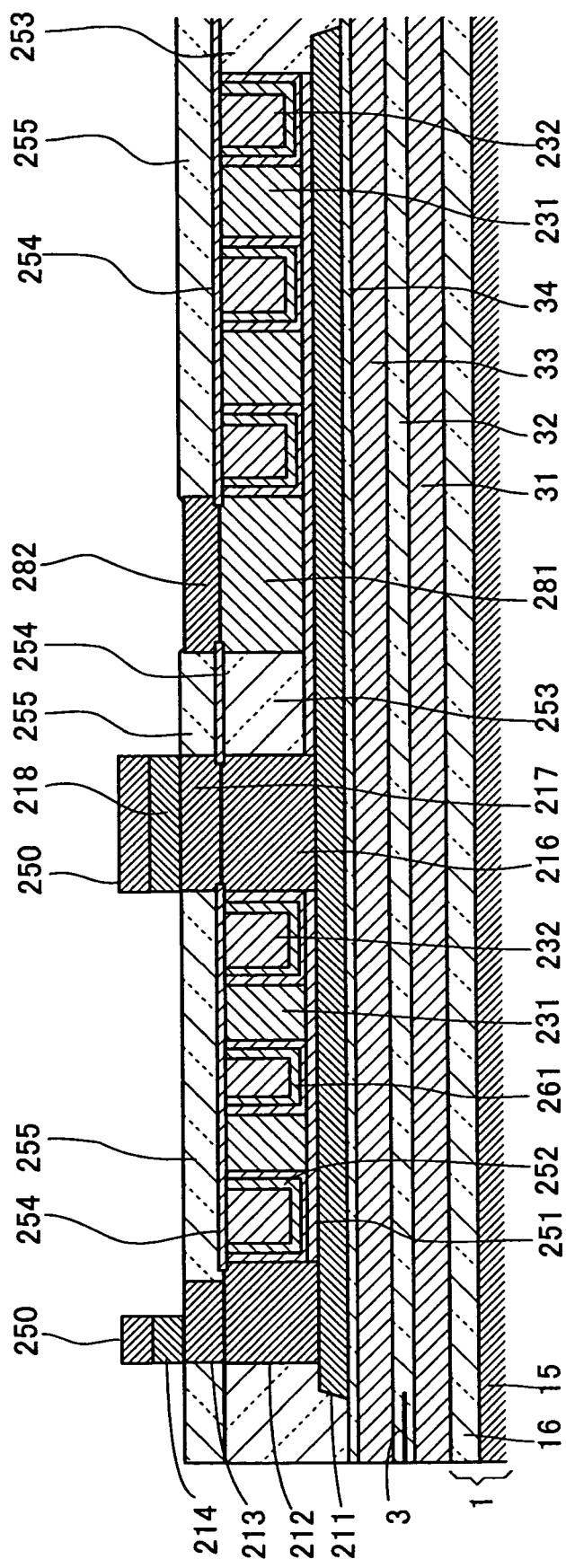
FIG. 21 is a diagram showing a process after the process shown in FIG. 20.

<Process Leading to a State of FIG. 21>

Next, as shown in FIG. 21, the magnetic film 214 is etched by ion beam using the pattern-plating film 250 as a mask.

Figure 22:
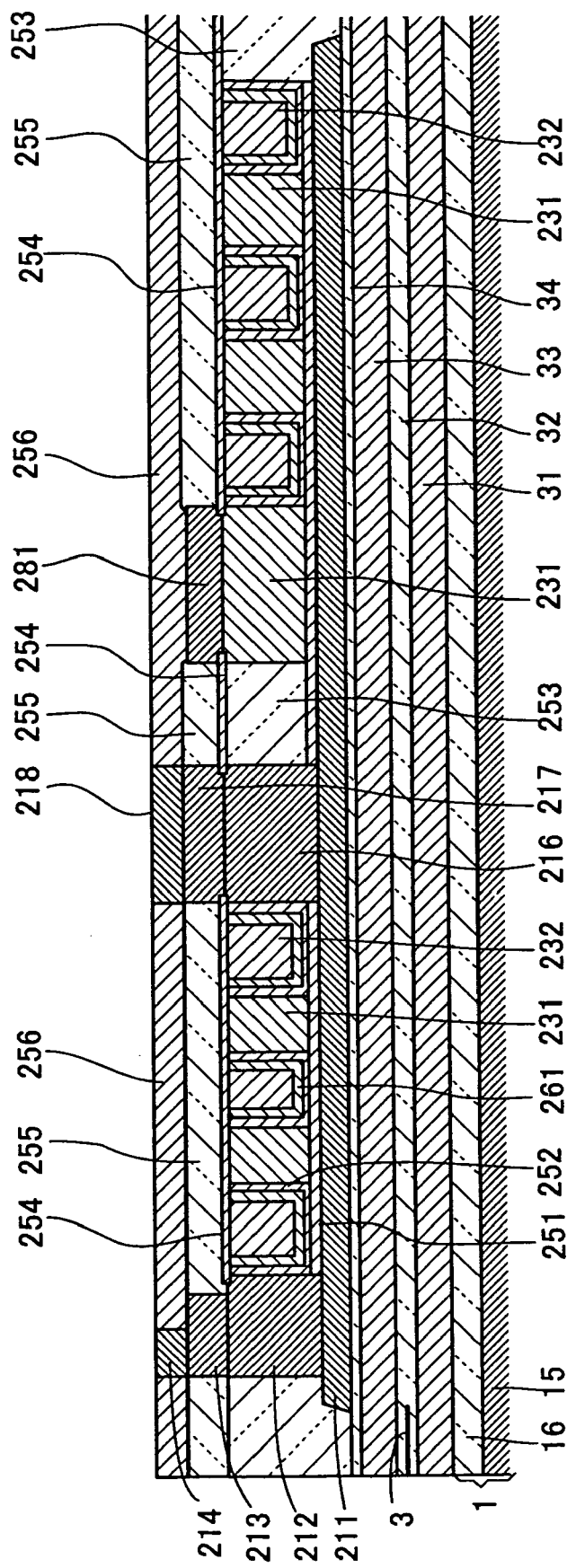
FIG. 22 is a diagram showing a process after the process shown in FIG. 21.

<Process Leading to a State of FIG. 22>

Next, an insulating film 256 of alumina or the like is deposited 2 to 3 μm thick by sputtering and then, the insulating film 256 is polished and flattened by CMP to such a position that the pattern-plating film 250 is removed. FIG. 22 shows a state in which this CMP process has been performed.

Figure 23:
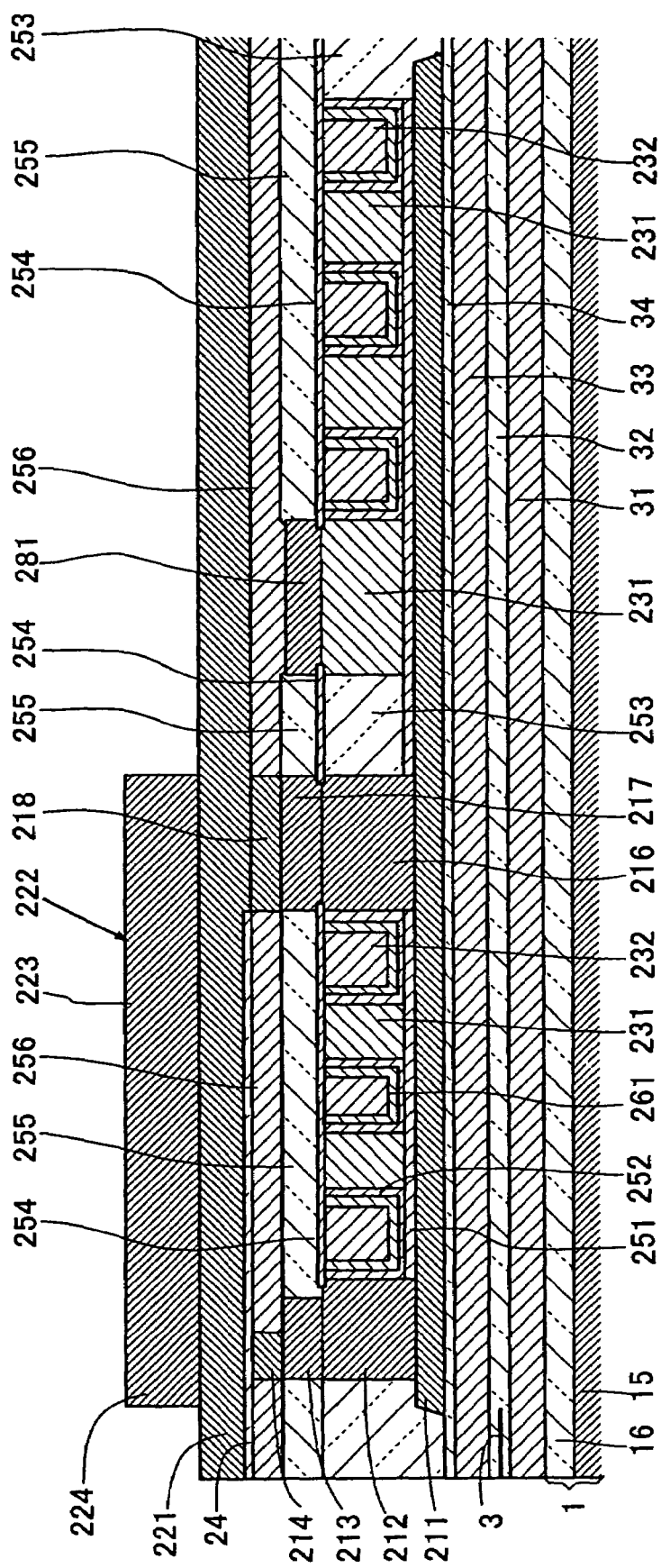
FIG. 23 is a diagram showing a process after the process shown in FIG. 22.
Figure 24:
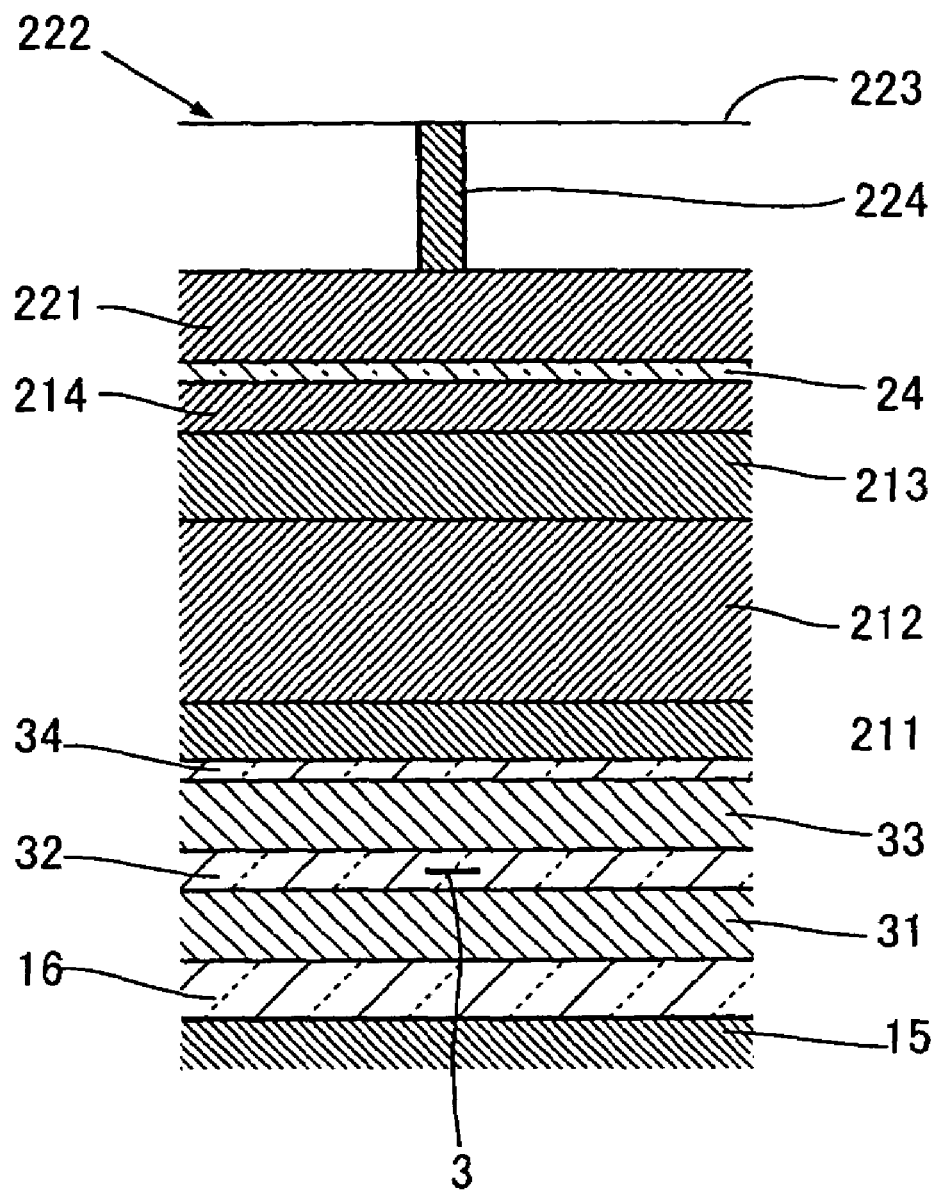
FIG. 24 is a view of the process shown in FIG. 23, seen from the ABS side.

<Process Leading to a State of FIGS. 23 and 24>

Next, a gap film 24 is formed 0.06 to 0.1 μm thick on the flattened surface obtained by CMP. The gap film 24 is made of a non-magnetic metal material such as Ru, for example, and can be formed by sputtering or the like.

After that, a second magnetic film 221 is formed on the surface of the gap film 24 and the flattened surface. The second magnetic film 221 is made of an HiBs material. Specifically, CoFe and CoFeN are particularly suitable among HiBs materials such as FeAlN, FeN, CoFe, CoFeN and FeZrN. The second magnetic film 221 is formed, for example, 0.3 to 0.6 μm thick and is to be used as a seed film in the subsequent plating process for forming a third magnetic film.

After that, the third magnetic film 222 is formed by a frame-plating method using the second magnetic film 221 as a seed film. The third magnetic film 222 is made of NiFe (composition ratio, 55:45), CoNiFe (composition ratio, approximately 67:15:18, 1.9 T to 2.1 T), CoFe (composition ratio, 40:60, 2.3 T) or the like. The third magnetic film 222 is 3.5 to 4.0 μm thick. The third magnetic film 222 is formed so as to have a wide portion 223 and a narrow portion 224. The wide portion 223 forms the second yoke portion and the narrow portion 224 forms the second pole portion. FIGS. 23 and 24 shows a state in which the third magnetic film 222 has been formed.

After that, the second magnetic film 221, which has been used as a seed film, is etched by ion milling, using the third magnetic film 222 as a mask. In this etching, irradiation angles of ion beams are within a range of 30 to 45 degrees.

Figure 25:
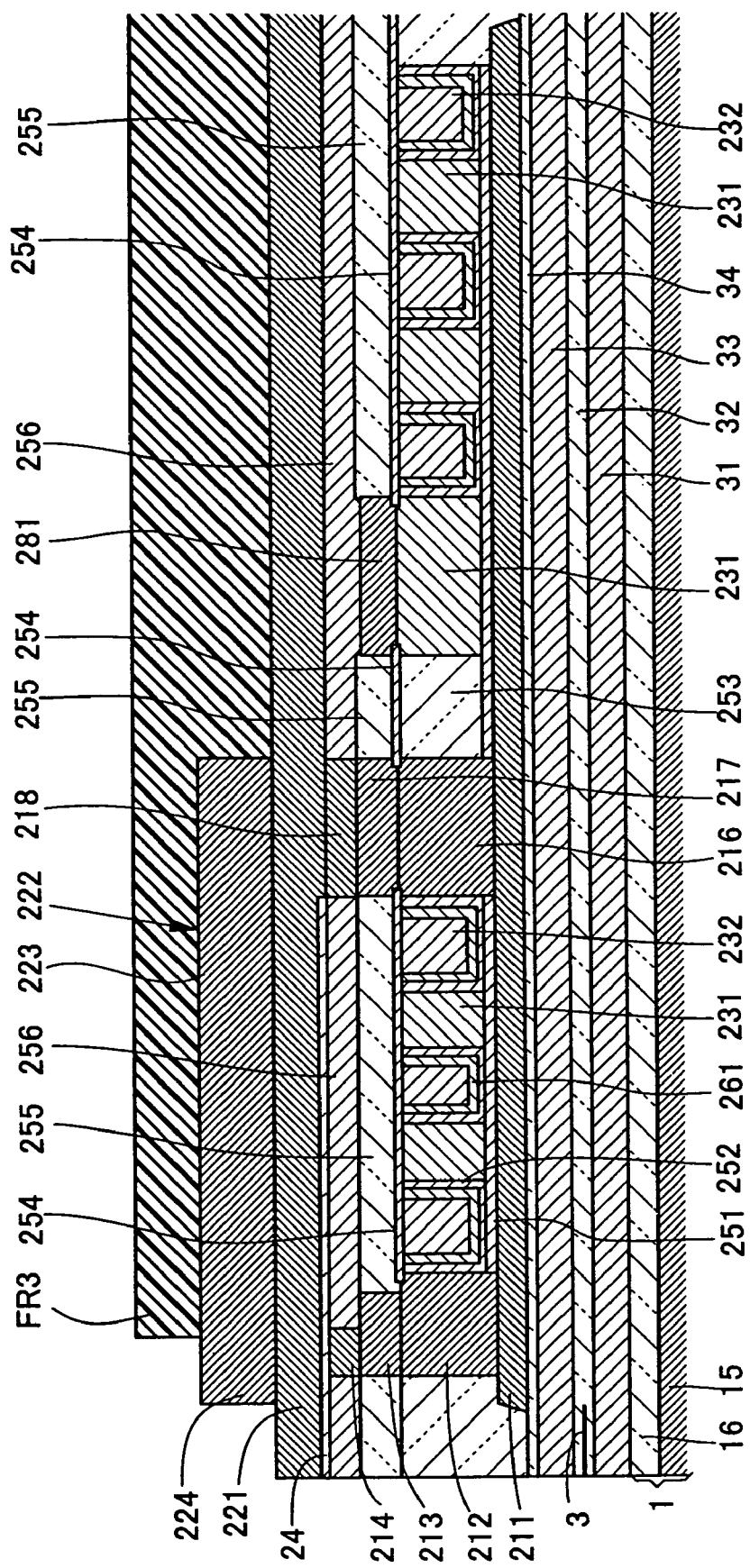
FIG. 25 is a diagram showing a process after the process shown in FIGS. 23 and 24.
Figure 26:
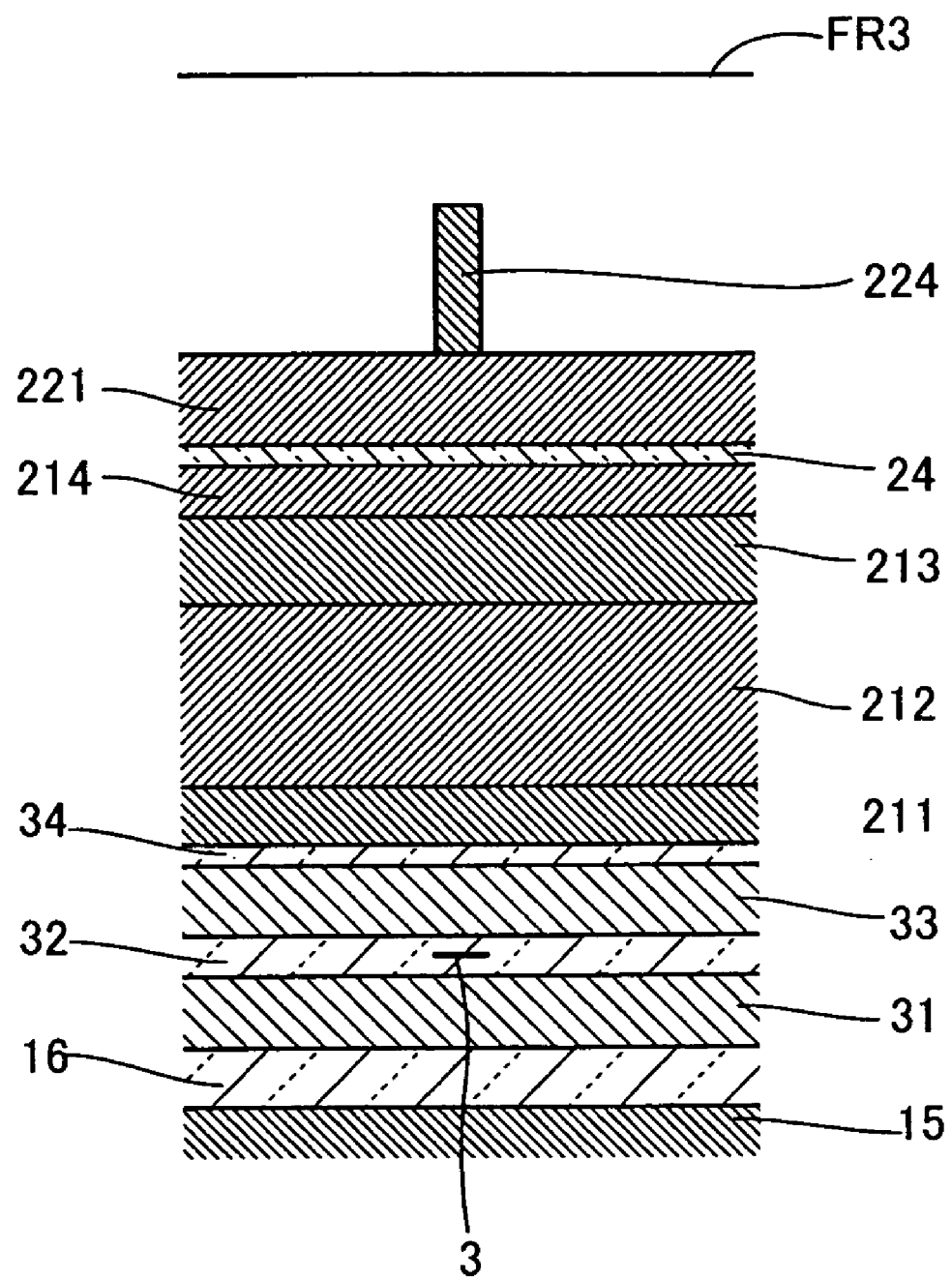
FIG. 26 is a view of the process shown in FIG. 25, seen from the ABS side.
Figure 27:
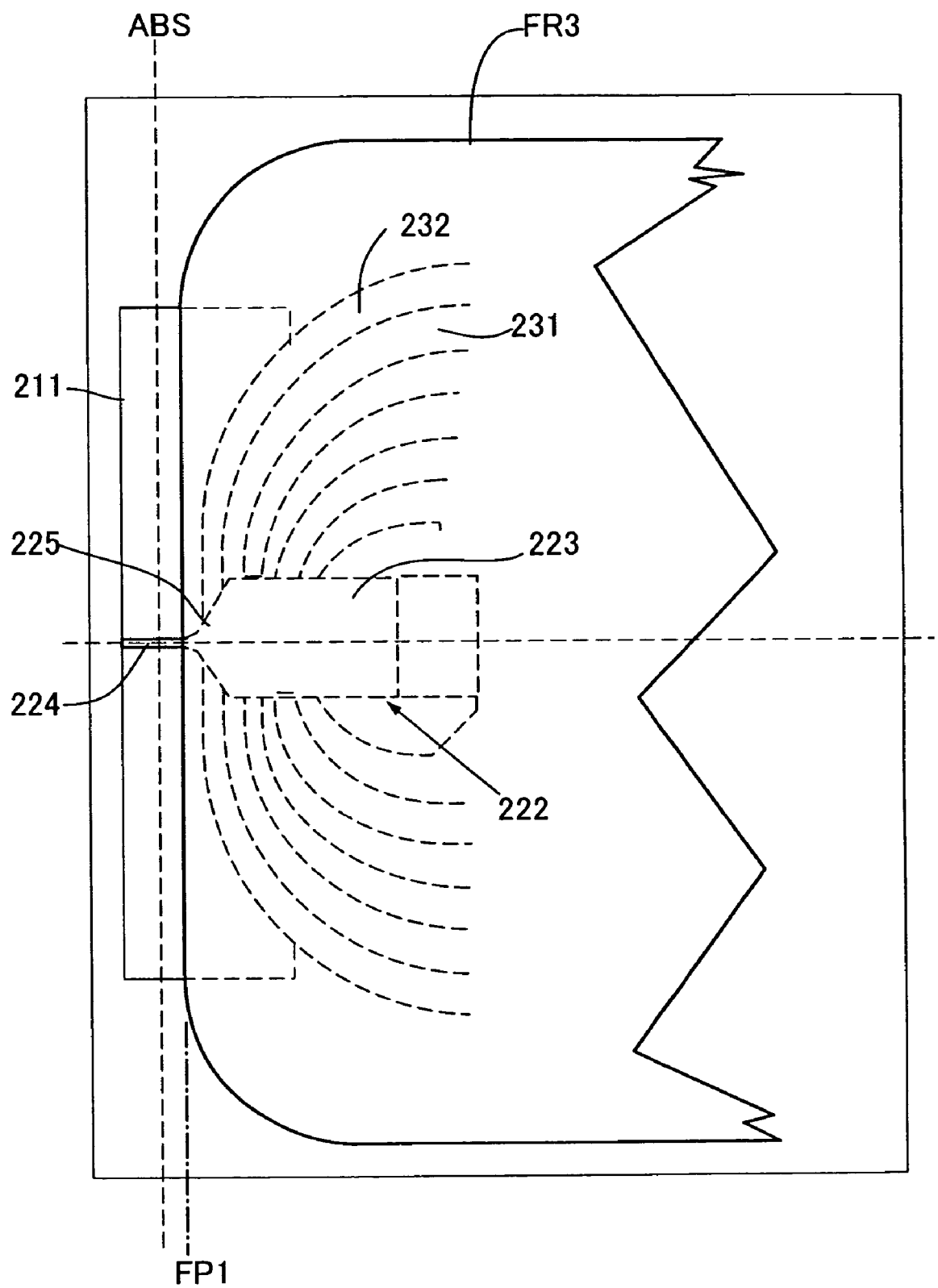
FIG. 27 is a plan view of the process shown in FIG. 25.
Figure 28:
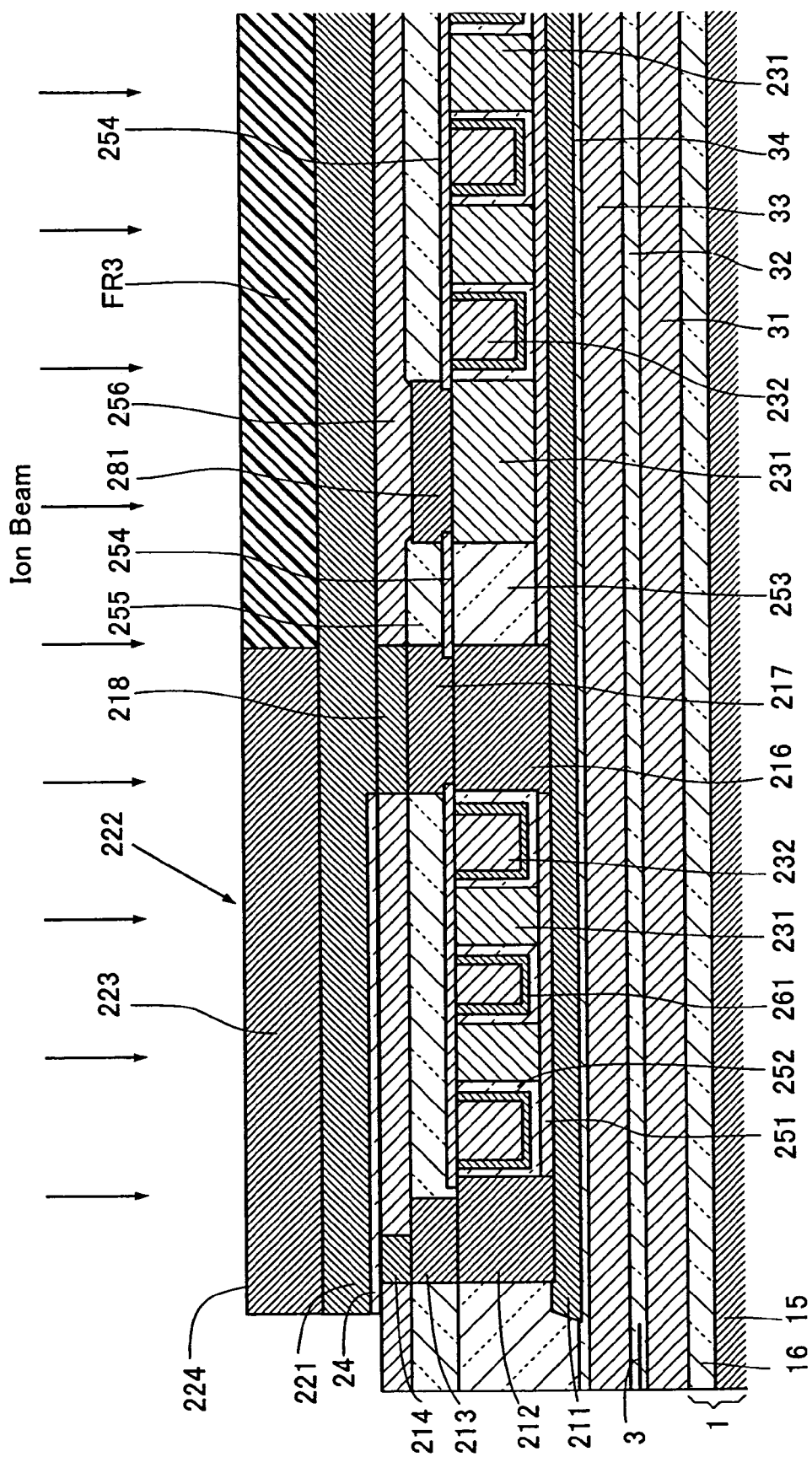
FIG. 28 is a diagram showing a process after the process shown in FIGS. 25 to 27.
Figure 29:
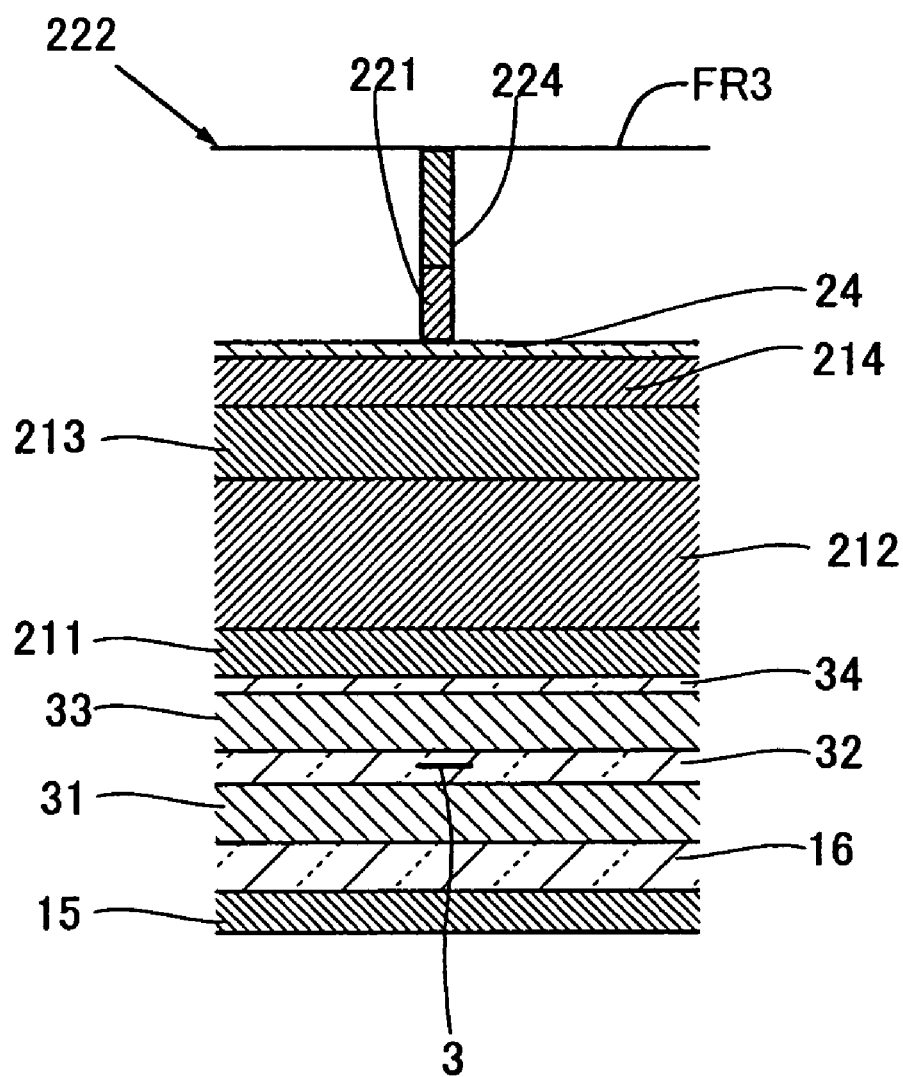
FIG. 29 is a view of the process shown in FIG. 28, seen from the ABS side.

<Process Leading to a State of FIGS. 25 to 27>

Next, as shown in FIGS. 25 to 27, the whole wide portion 223 except the narrow portion 224 of the third magnetic film 222 is covered with a resist mask FR3. The resist mask FR3 is deposited 5 to 7 μm thick. The resist mask FR3 is formed to be convex on the third magnetic film 222 and also spread above the first coil 231 and the second coil 232.

Referring to FIG. 27, the yoke portion comprises a wide portion 223 and a flare portion 225 gradually decreasing in width toward a narrow portion 224, which forms the second pole portion. The resist mask FR3 is formed so as to have an edge perpendicular to the surface of the narrow portion 224 in the vicinity of a flare point FP 1 or a throat height zero. In the illustrated embodiment, a rise point of the resist mask FR3 is at the flare point FP1, but the rise point may be at the vicinity of the flare point FP1 in the rear of the ABS.

<Process Leading to a State of FIGS. 28 to 31>

Next, as shown in FIGS. 28 to 31, the resist mask FR3 is etch-backed so as to expose the surface of the third magnetic film 222, which forms the second yoke portion. The etch-backing process to etch-back the resist mask FR3 may comprise a dry-etching process with an $O_2$-mixed plasma, or an isotropic or anisotropic dry-etching process with halogen-based or chlorofluorocarbon-based plasma ashing. These etching processes provide dry-etching with excellent flatness. Aforesaid anisotropic dry-etching process is performed by using $O_2$ gas, or halogen-based gas such as chlorofluorocarbon-based gas, e.g. $SF_4$ or $SF_6$.

By the etch-backing process, the resist mask FR3 is self-aligned in intimate contact with outer circumferential edges of the second and third magnetic films 221 and 222 without misalignment of the resist mask FR3 or a gap between the resist mask FR3 and the outer circumferential edges. In the subsequent etching process, consequently, there is no possibility that the outer circumferential edges of the second and third magnetic films 221 and 222 might be attacked by an etching means such as ion beams and so, a high-accuracy pattern of the second yoke portion, which is formed of the second and third magnetic films 221 and 222, is obtained.

Figure 30:
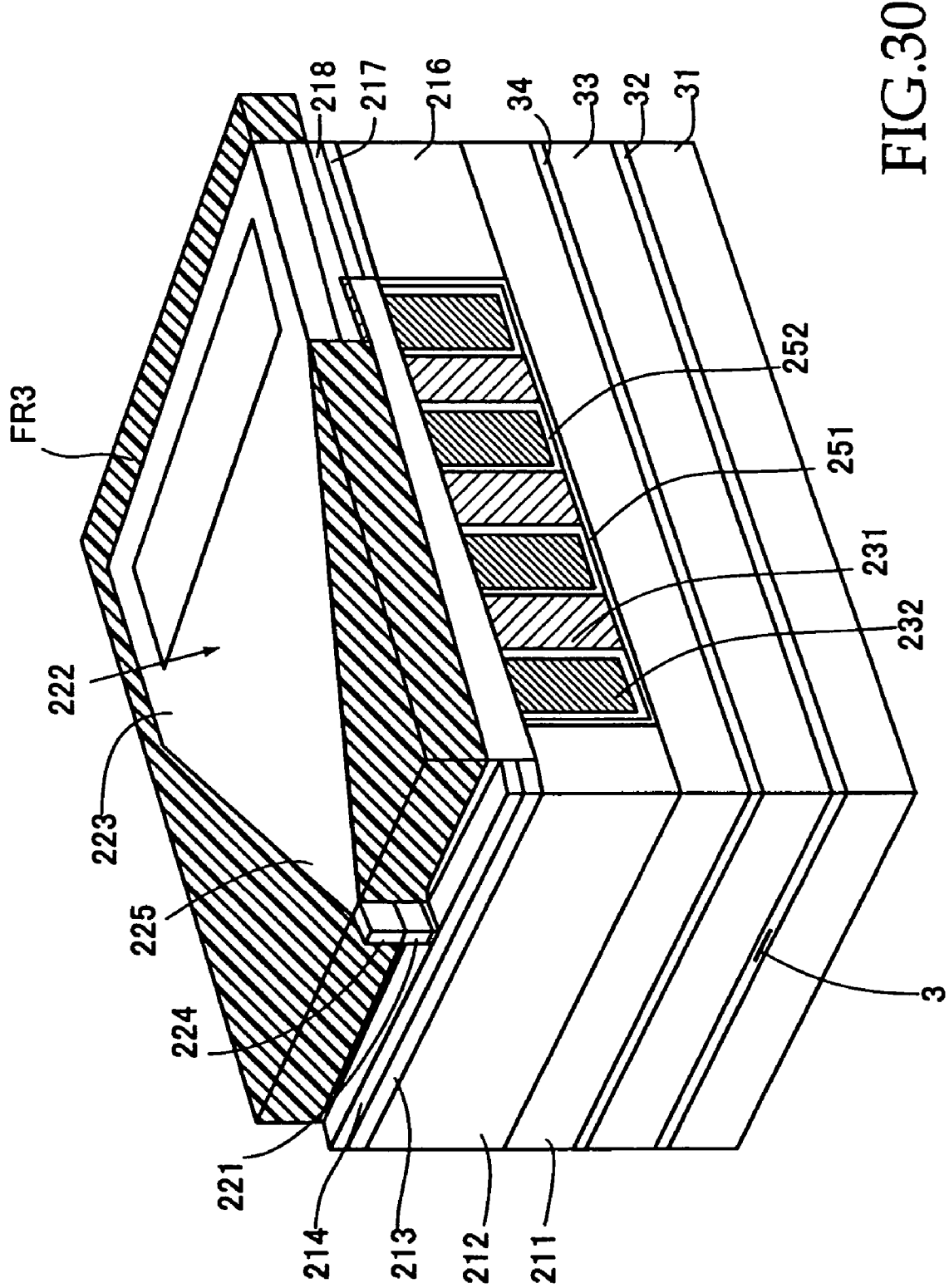
FIG. 30 is a perspective view of the process shown in FIGS. 28 and 29, the perspective view showing a write element part cut out.
Figure 31:
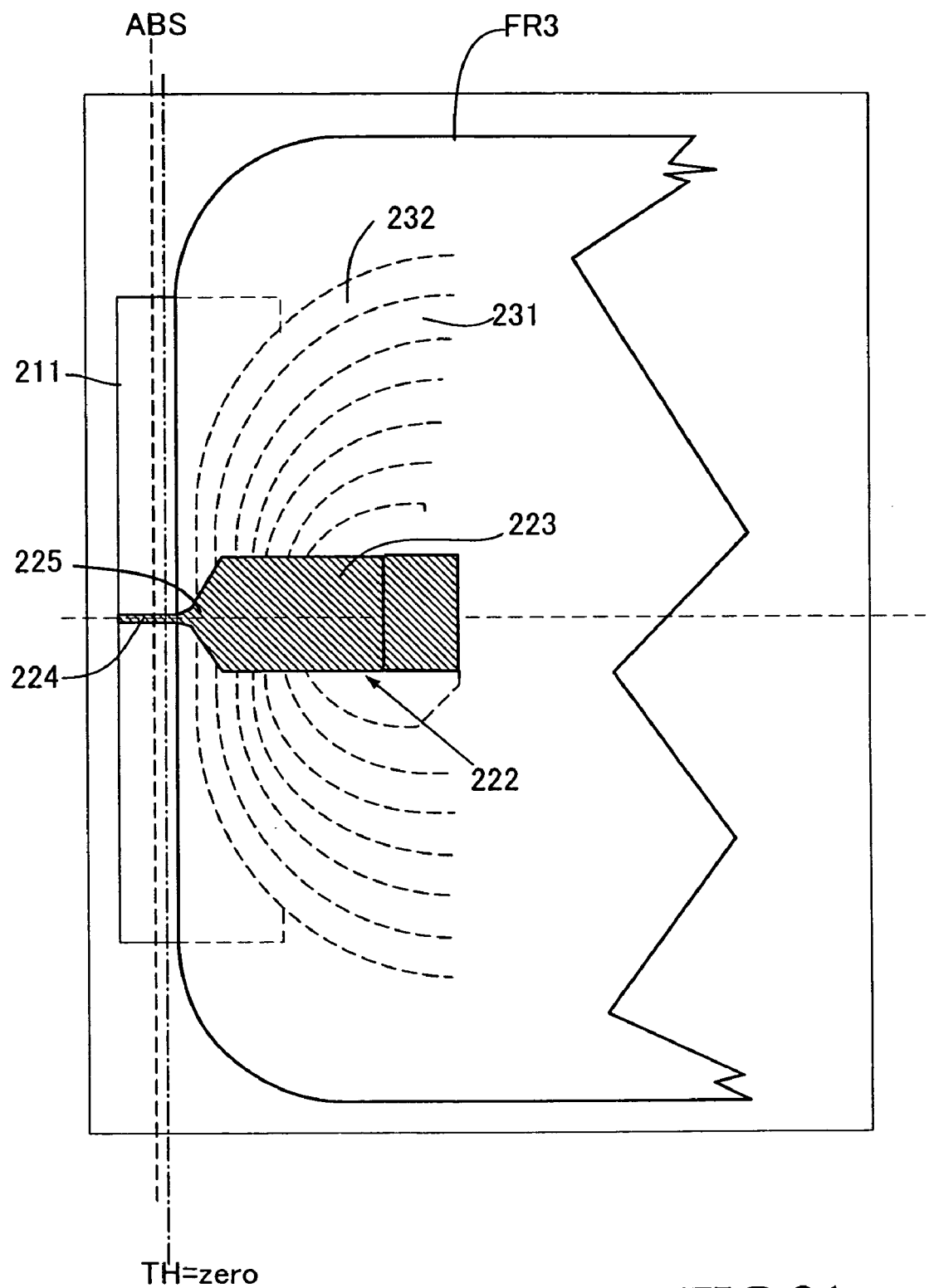
FIG. 31 is a plan view of the process shown in FIGS. 28 to 30.

As shown in FIGS. 30 and 31, the second and third magnetic films 221 and 222 comprise a wide portion 223 and a flare portion 225 gradually decreasing in width toward a narrow portion 224, which forms the second pole portion. In the present invention, the resist mask FR3 is also self-aligned in intimate contact with the flare portion 225 without misalignment of the resist mask FR3 or a gap between the resist mask FR3 and the flare portion 225 and so, in the subsequent etching process, there is no possibility that the outer edge of the flare portion 225 might be attacked by an etching means such as ion beams. Thus, it is possible to prevent variations in a flare point FP1, which is between the flare portion 225 and the narrow portion 224. This assures a constant minimal value of the distance from the ABS to the flare point FP1 in a thin film magnetic head and consequently assures the over-write characteristic.

Figure 32:
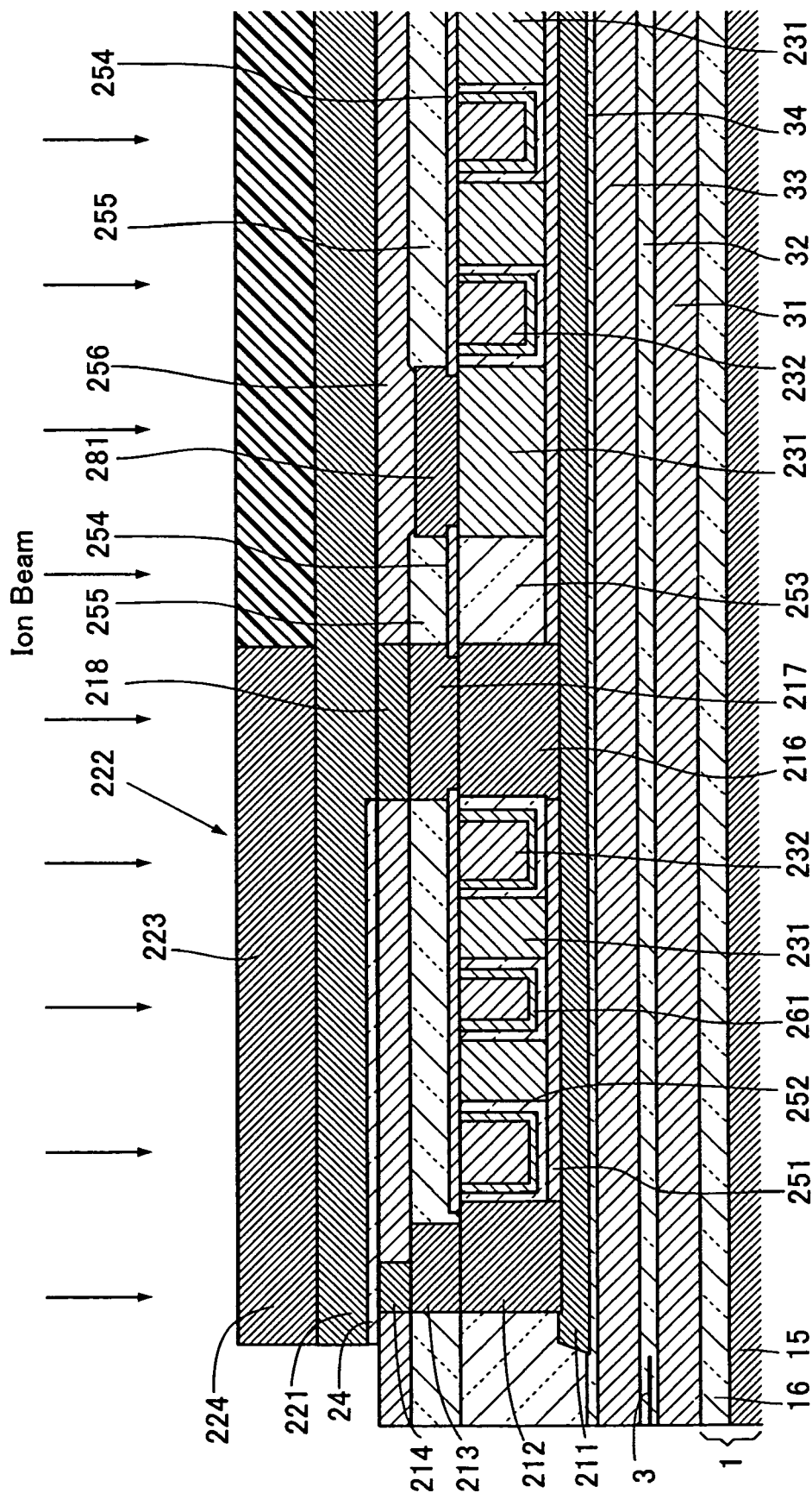
FIG. 32 is a diagram showing a process after the process shown in FIGS. 28 to 31.
Figure 33:
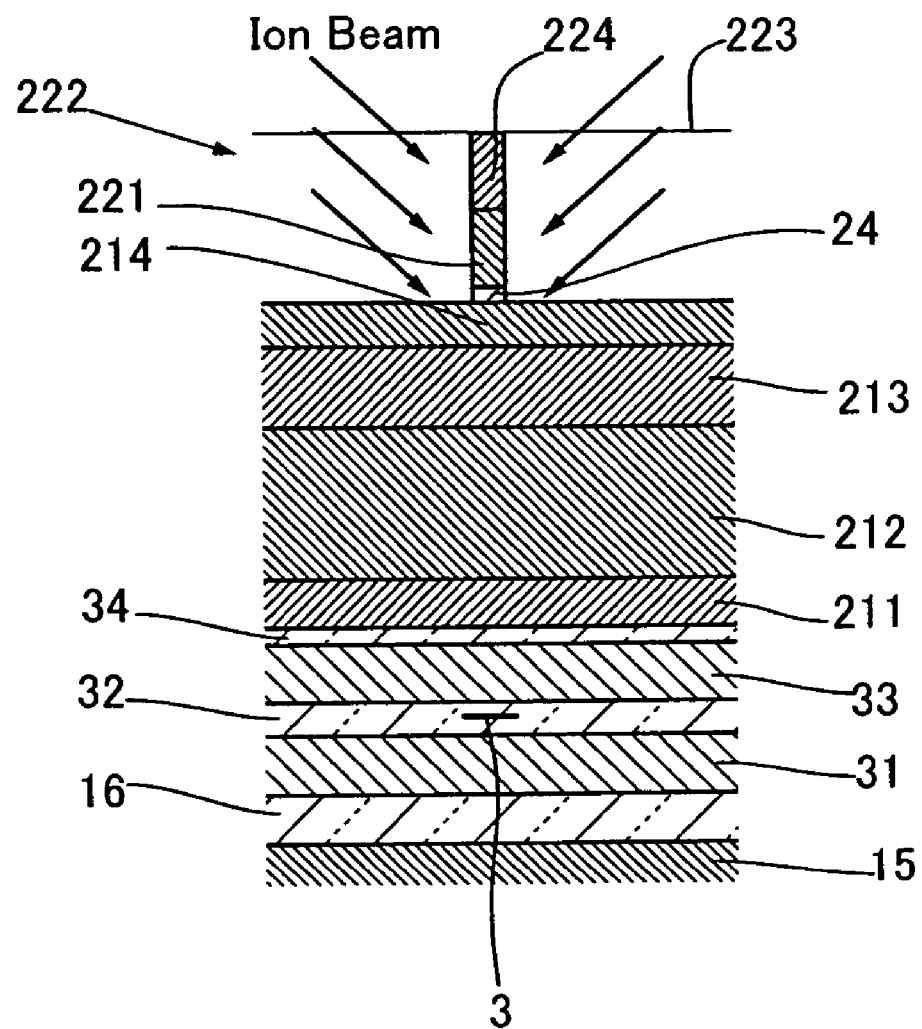
FIG. 33 is a view of the process shown in FIG. 32, seen from the ABS side.

<Process Leading to a State of FIGS. 32 and 33>

Next, as shown in 32 and 33, an etching process is applied through the opening of the resist mask FR3 to parts of the magnetic films 221, 222 and/or a part of the gap film 24 that are in the opening. The opening of the resist mask FR3 has been formed on the narrow portion 224, which forms the second pole portion. The etching process is performed to expose a surface of the fourth pole piece 214, which forms the first pole portion.

Figure 34:
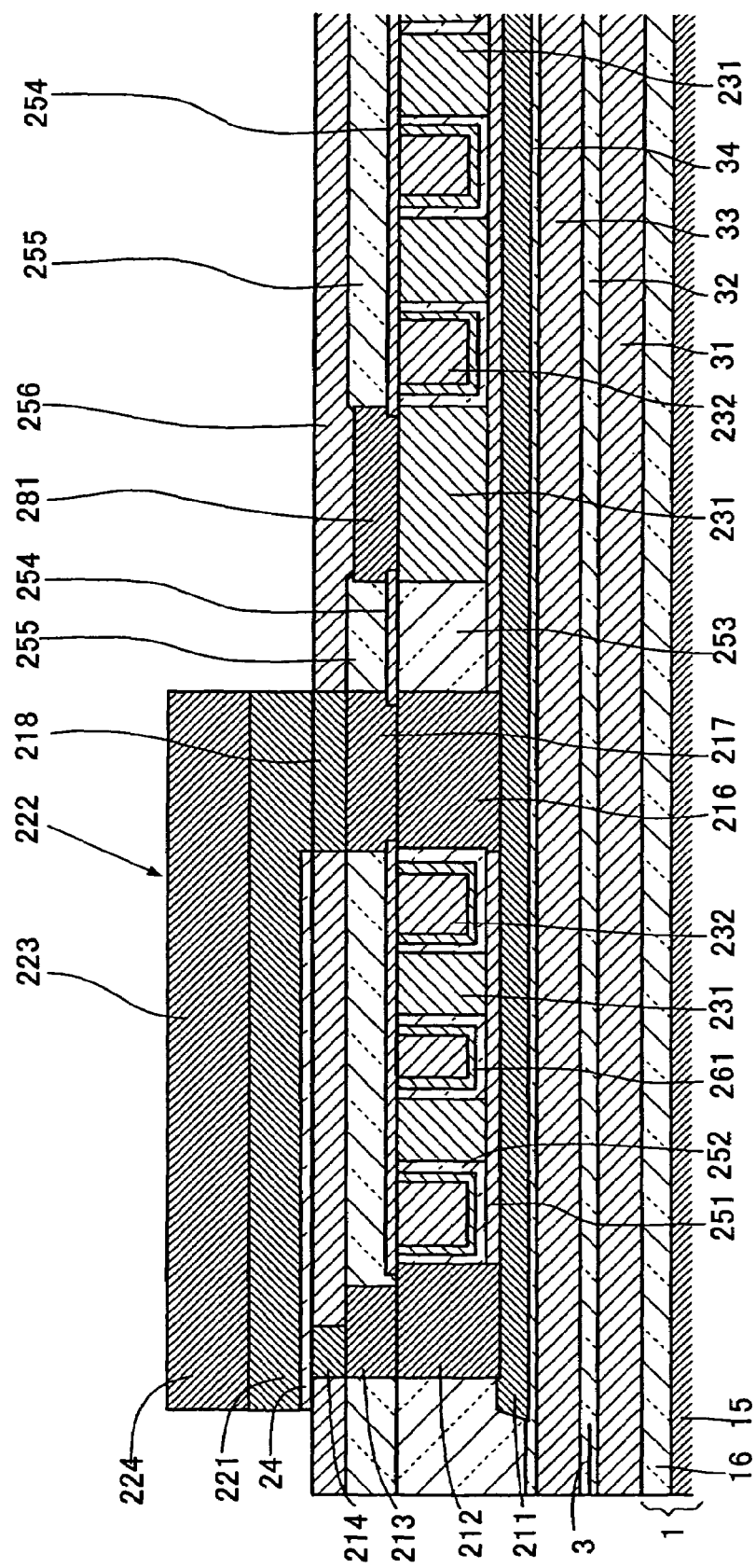
FIG. 34 is a diagram showing a process after the process shown in FIGS. 32 and 33.
Figure 35:
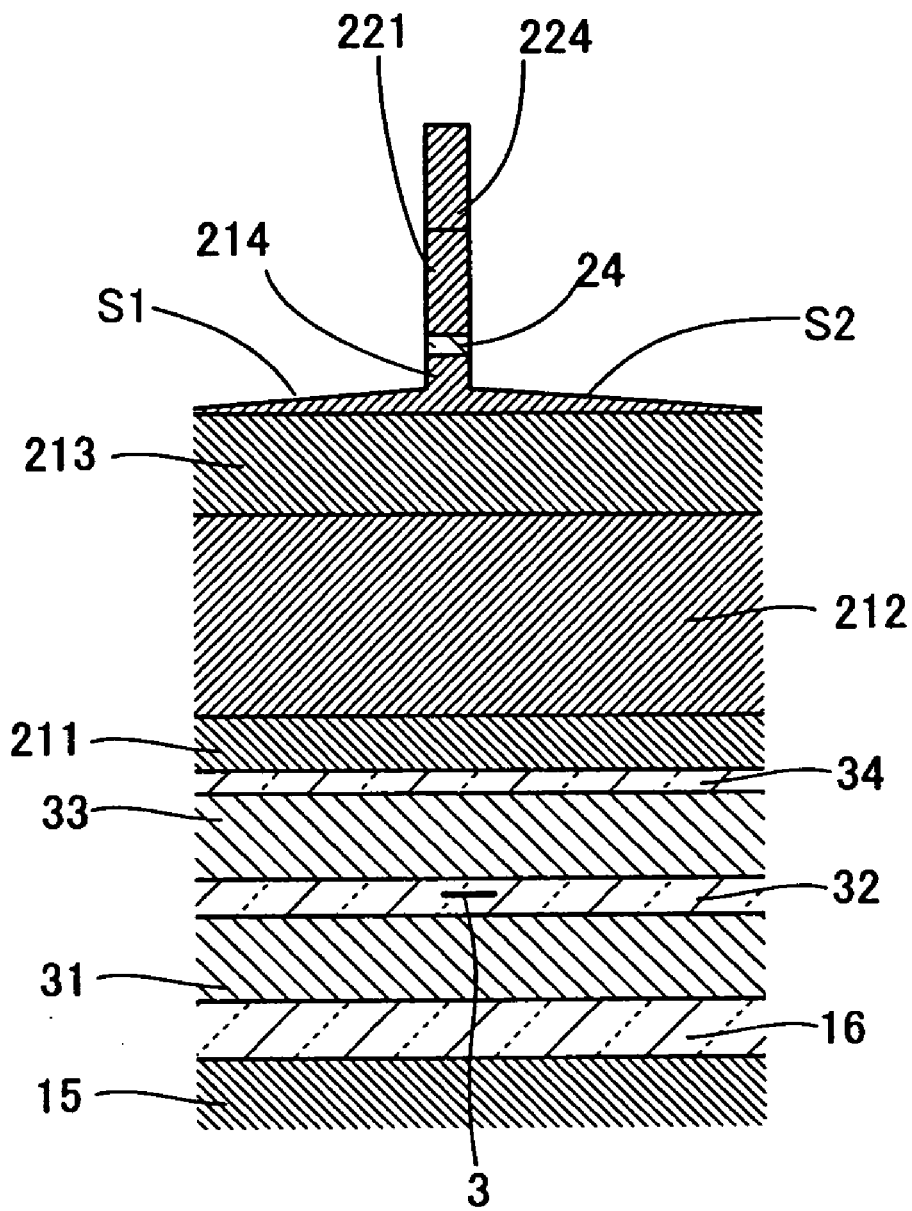
FIG. 35 is a view of the process shown in FIG. 34, seen from the ABS side.

<Process Leading to a State of FIGS. 34 and 35>

After the process shown in FIGS. 32 and 33, the resist mask FR3 is removed and then additional pole etching is performed by IBE. Consequently, the state of FIGS. 34 and 35 is obtained.

Aforesaid additional etching process produces etching indentations on both sides of the narrow portion 224. In this etching process, the magnetic film 214 (fourth pole piece) that is one of magnetic films 211 to 214 forming the first pole portion P1 and is adjacent to the gap film 24, is etched so that not all portions of the magnetic film 214 are etched and on the bottoms of the etching indentations, a base portion (S1, S2) of the magnetic film 214 is left. In case of using IBE as an etching means, by selected irradiation angles of ion beams and the geometric structure of the narrow portion 224, the magnetic film 214 is etched so as to have a narrowed portion and a base portion (S1, S2) left on the bottoms, the base portion (S1, S2) increasing in thickness toward the narrowed portion. This structure make it possible to both keep a narrowed track width and allow a sufficient sectional area of the magnetic film 214 adjacent to the gap film 24. Consequently, magnetic saturation in the magnetic film is prevented and so, over-write characteristic is improved.

After that, a protective film 258 made of alumina or the like (see FIGS. 3 and 4) is deposited 20 to 40 µm thick and the manufacturing process is finished. After that, publicly known post-processes of cutting out a thin film magnetic head from the wafer, polishing for determining a throat height, processing ABS and the like are performed.

Now, advantages of a trimming method according to the present invention are described in comparison with a conventional trimming method.

Figure 36:
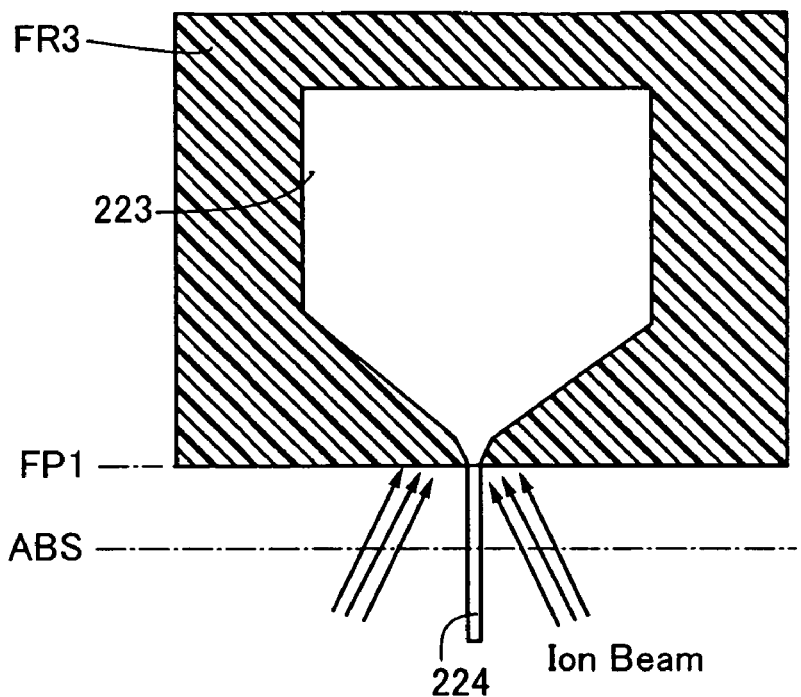
FIG. 36 is a diagram showing details of the process shown in FIGS. 34 and 35.
Figure 38:
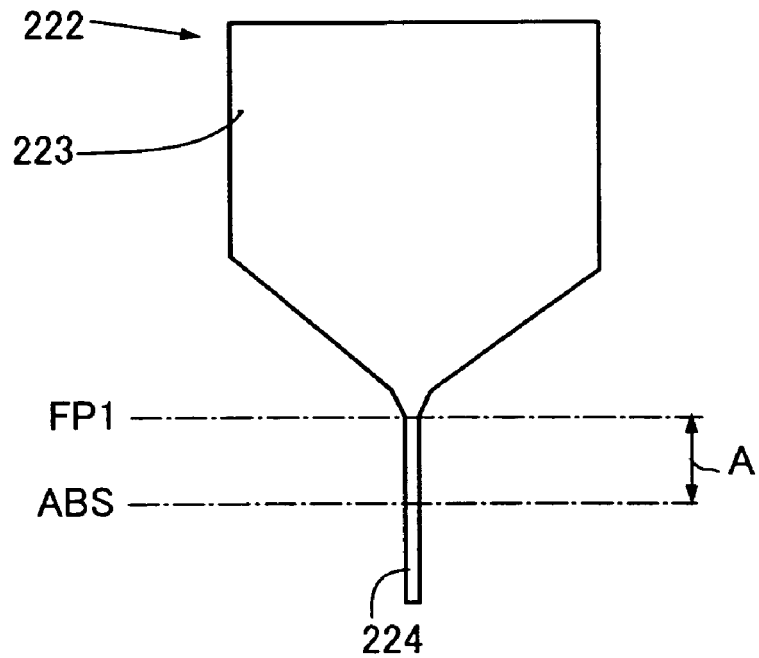
FIG. 38 is a diagram showing a pattern of a second yoke portion obtained through the process shown in FIG. 36.

FIG. 36 is a plan view showing a trimming method according to the present invention, and FIG. 38 is a diagram showing a state in which the trimming shown in FIG. 36 has been performed. Referring to FIG. 36, the etch-backing process described above provides the resist mask FR3 self-aligned in intimate contact with the outer circumferential edge of the third magnetic film 221 forming the second yoke, without misalignment of the resist mask FR3 or a gap between the resist mask FR3 and the outer circumferential edge. In the subsequent etching process, consequently, there is no possibility that the outer circumferential edge of the third magnetic film 222 might be attacked by an etching means such as ion beams and so, a high-accuracy pattern of the third magnetic film 221, is obtained.

The third magnetic film 222 comprises a wide portion 223 and a flare portion 225 gradually decreasing in width toward a narrow portion 224, which forms the second pole portion. In the present invention, the resist mask FR3 is also self-aligned in intimate contact with the flare portion 225 without misalignment of the resist mask FR3 or a gap between the resist mask FR3 and the flare portion 225 and so, in the subsequent etching process, there is no possibility that the outer edge of the flare portion 225 might be attacked by an etching means such as ion beams. Thus, it is possible to prevent variations in the flare point FP1, which is between the flare portion 225 and the narrow portion 224. This assures a constant minimal value of the distance A from the ABS to the flare point FP1 in a thin film magnetic head and consequently assures the over-write characteristic.

Figure 37:
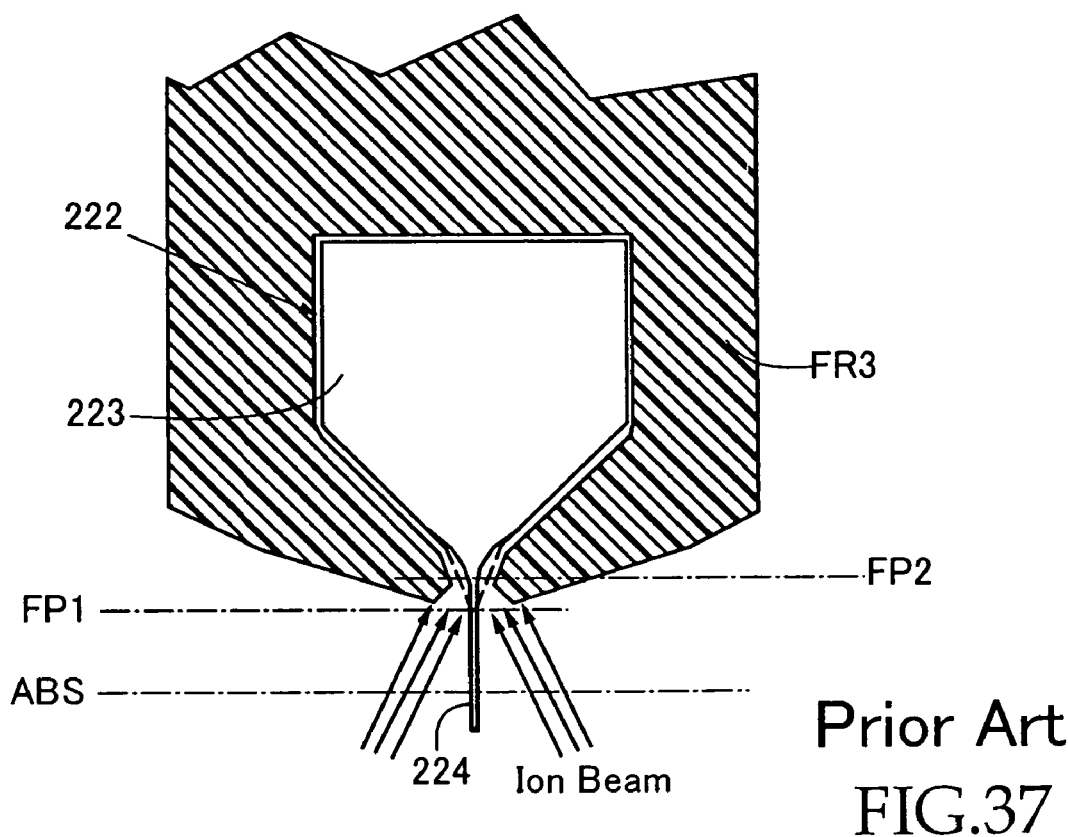
FIG. 37 is a diagram showing a conventional process.
Figure 39:
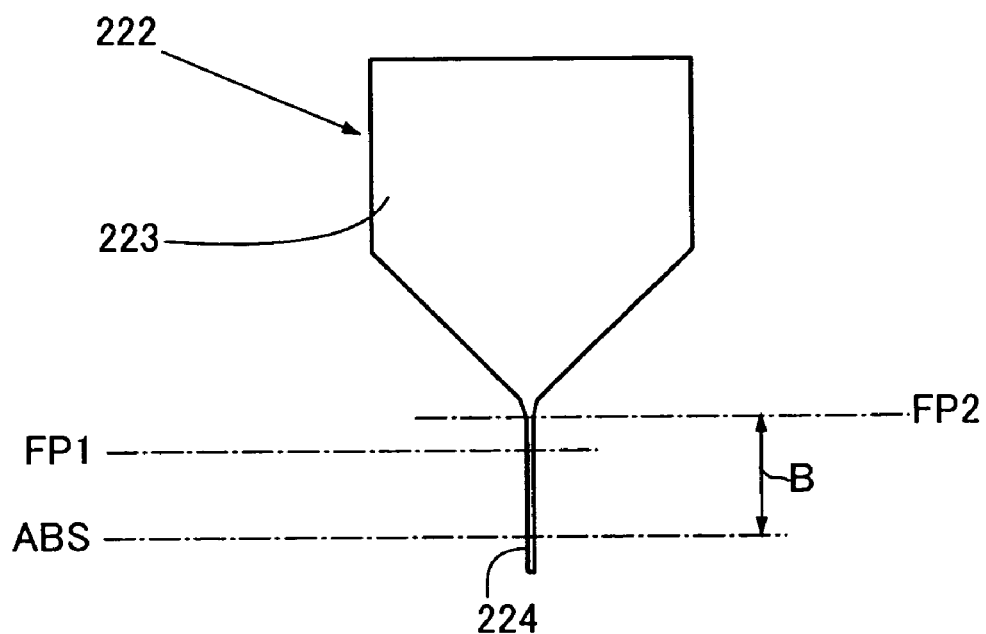
FIG. 39 is a diagram showing a pattern of a second yoke portion obtained through the conventional process shown in FIG. 37.

FIG. 37 is a plan view showing a conventional trimming method and FIG. 39 is a plan view showing a state in which the trimming of FIG. 37 has been performed. In the conventional trimming method shown in FIG. 37, a trimming mask FR3 is formed so as to surround a third magnetic film 222 to be an upper yoke portion and cover a coil portion.

Due to the form of the trimming mask FR3, ion beams trim a flare portion 225, which gradually increases in width from the narrow portion 224 to be the upper pole portion to the wide portion 223 to be the upper yoke, so that the flare point FP1, at which the third magnetic film 222 begins to increase in width, backs to point FP2, with the increased distance B from the ABS to the flare point FP2 as shown in FIG. 39. Distance B is larger than distance A (B>A).

The flare point backing described above reduces the magnetic volume, with degradation in the over-write characteristic. The reason is that the closer the flare point FP1 is to the ABS in the flare portion 225, the more excellent over-write characteristic is obtained. it is necessary to make the flare point close to the ABS, especially in the case of a track width of 0.2 µm or less.

From the above description, it is apparent that the present invention can solve the problems of the conventional trimming method.

(2) EMBODIMENT 2

Embodiment 2 relates to a method for manufacturing a thin film magnetic head shown in FIGS. 7 and 8. FIGS. 40 to 58 show processes of this manufacturing method. It is notified in advance that processes illustrated in FIGS. 40 to 58 are also performed on a wafer.

Figure 40:
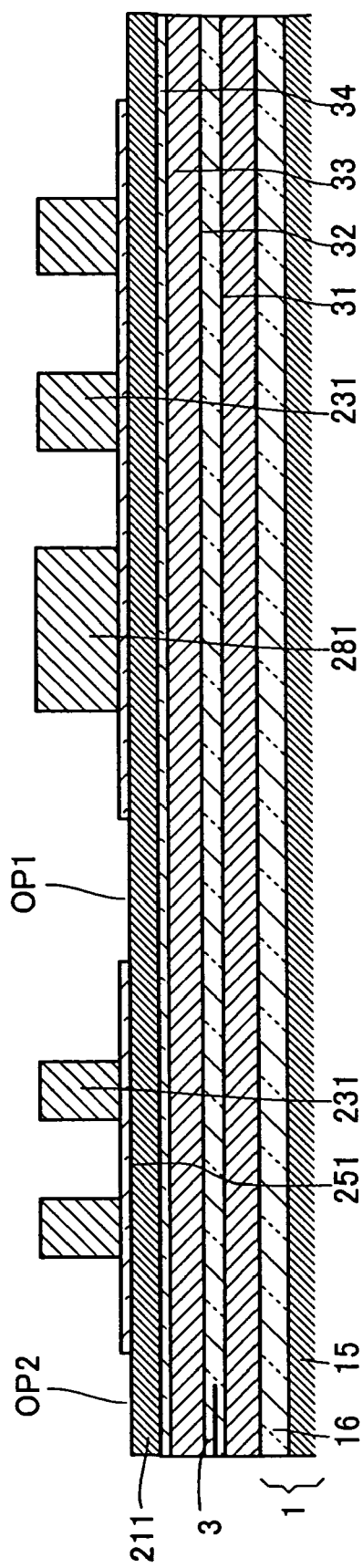
FIG. 40 is a diagram showing a process of manufacturing a thin film magnetic head shown in FIGS. 7 and 8.

<Process Leading to a State of FIG. 40>

Referring to FIG. 40, on an insulating film 16 deposited on a base body 15 there are formed a first shield film 31, a read element 3, an insulating film 32, a second shield film 33, an insulating film 34 and a first magnetic film 211 by means of publicly known processes.

In a specific example, the insulating film 16 is an alumina film, formed in a thickness of 3 µm or the like. The first shield film 31 is made of a magnetic material such as NiFe, formed 2 to 2.5 µm thick by a frame-plating method. The insulating film 32 is, in general, formed by two steps: in the first step, an alumina film of 3 to 4 µm in thickness is formed and after that, the surface of the alumina film is flattened by CMP and then an GMR element 3 to be a read element is formed; and in the second step, an alumina film covering the GMR element 3 is formed. The second shield film 33 is made of a magnetic material such as NiFe, formed 2 to 3 μm thick. The insulating film 34 is formed as an alumina film of 0.2 to 0.3 μm in thickness.

The first magnetic film 211 is formed 3.0 to 4.0 μm thick by a frame-plating method. The first magnetic film 211 can be made of CoNiFe (2.1T) or CoFeN (2.4T). The first magnetic film 211 may be a plating film of NiFe (80%:20%), NiFe (45%:55%) or CoNiFe, or a sputtering film of FeAlN, FeN, FeCo, CoFeN or FeZrN, with a thickness of 0.5 to 0.6 μm.

After that, an insulating film 251 is formed, for example, 0.2 μm thick on the flat surface of the first magnetic film 211, the insulating film 251 having an area slightly larger than an area necessary for forming a coil, and then openings OP1, OP2 are selectively formed, and a first coil 231 is formed on the insulating film 251 by a selective frame-plating method. The first coil 231 is grown, for example, 3 to 3.5 μm thick. FIG. 40 shows a state in which the above-mentioned selective Cu-plating process has been performed.

Figure 41:
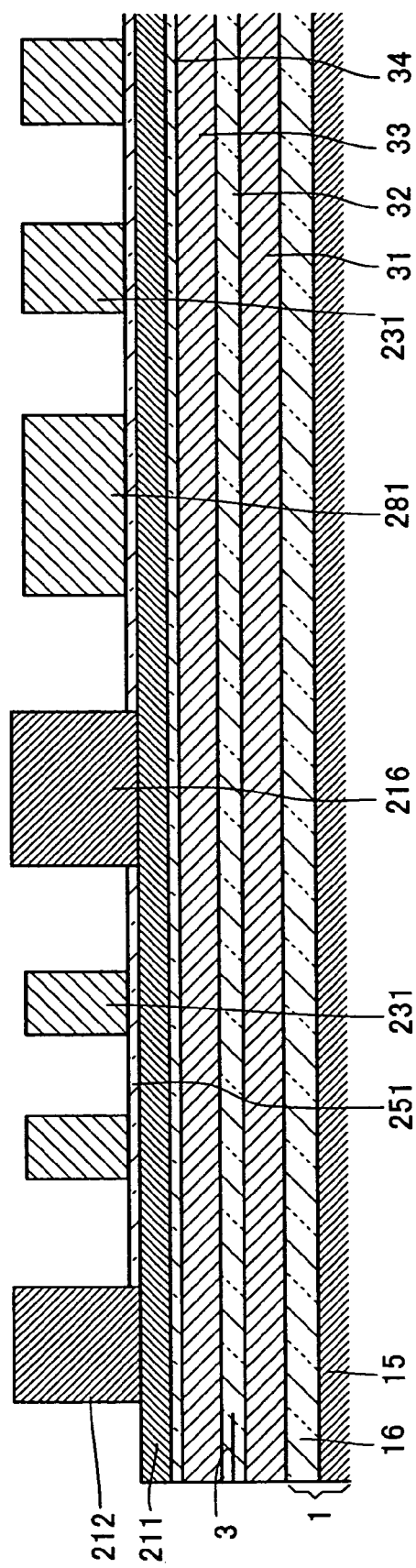
FIG. 41 is a diagram showing a process after the process shown in FIG. 40.

<Process Leading to a State of FIG. 41>

In a process leading from the state of FIG. 40 to the state of FIG. 41, a selective plating process is performed in the openings OP1, OP2 so that a pole piece and a back gap piece are formed 3.5 μm thick on the first magnetic film 211, and then the resist frame is removed by means of chemical etching or the like. Consequently, as shown in FIG. 41, the pole piece 212 and the back gap piece 216 are formed with a space between them on one surface of the first magnetic film 211. The pole piece 212 and the back gap piece 216 can be made of CoNiFe (composition ratio, 67:15:18, 1.8 to 1.9 T) or FeCo (composition ratio, 60:40, 2.4 T).

Figure 42:
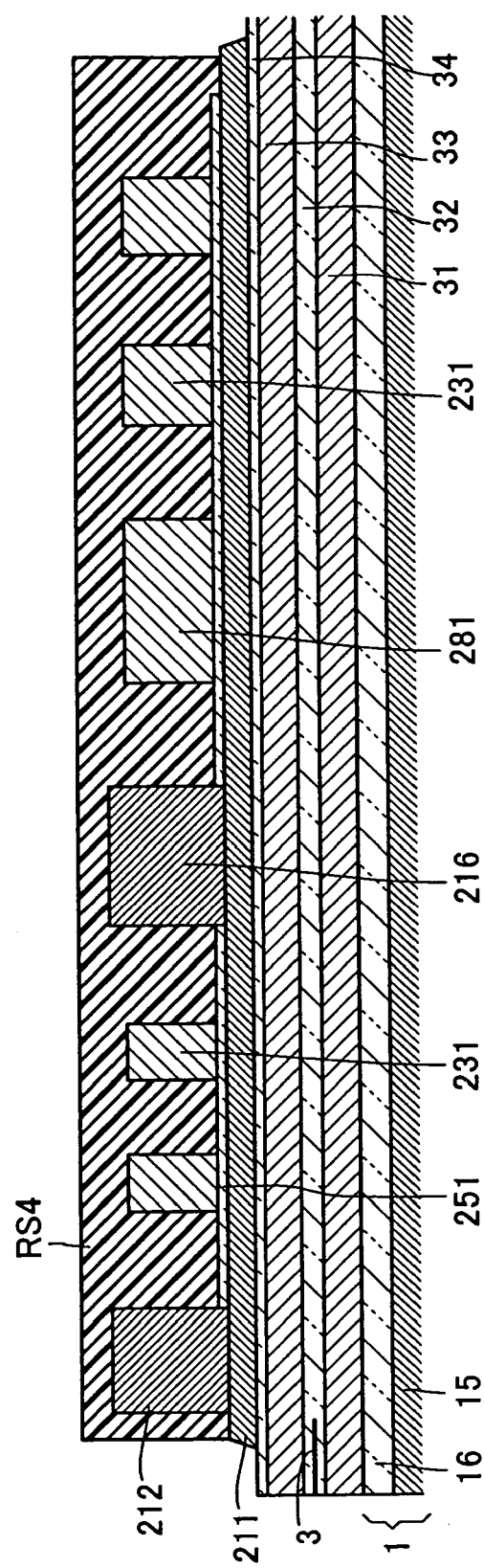
FIG. 42 is a diagram showing a process after the process shown in FIG. 41.

<Process Leading to a State of FIG. 42>

In a process leading from the state of FIG. 41 to the state of FIG. 42, a photoresist film RS4 covering the first coil 231, the pole piece 212 and the back gap piece 216 is formed. After that, the first magnetic film 211 is selectively etched by IBE, using the photoresist film RS4 as a mask, so as to pattern the first magnetic film 211.

Figure 43:
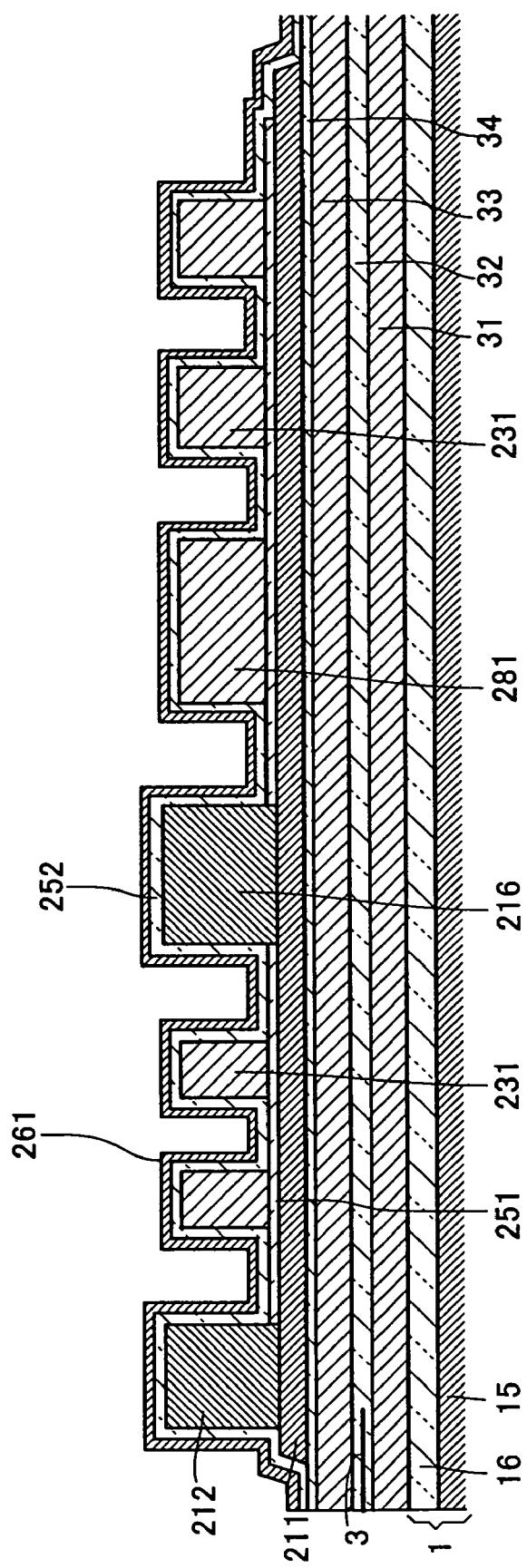
FIG. 43 is a diagram showing a process after the process shown in FIG. 42.

<Process Leading to a State of FIG. 43>

In a process leading from the state of FIG. 42 to the state of FIG. 43, the resist cover RS4 shown in FIG. 42 is removed and then, as shown in FIG. 43, an insulating film 252 is deposited on the surfaces and side faces of the insulating film 251, the first coil 231, the second pole piece 212 and the back gap piece 216. Specifically, the insulating film 252 is formed 0.05 to 0.15 μm thick by an $Al_2O_3$-CVD process. The insulating film 252 is formed under a low-pressure atmosphere at a temperature not less than 100° C. In case of forming the insulating film 252 as an $Al_2O_3$ film, it is possible to adopt an alumina-CVD film forming method in which $Al(CH_3)_3$ and $AlCl_3$ are sprayed in an alternate and intermittent way under a low-pressure atmosphere of $H_2O$, $N_2$, $N_2O$ or $H_2O_2$.

Next, a seed film 261 is deposited on the surface of the insulating film 252. The seed film 261 can be formed as a Cu-sputtering film of 50 nm in thickness, a Cu-CVD film stack of 50 nm in thickness or the like. When the seed film 261 is formed as a Cu-CVD film stack, the seed film 261 is deposited on bottom surfaces, side surfaces and top surfaces of the first coil 231, according to indentions and protrusions in the first coil 231, with excellent step coverage.

Figure 44:
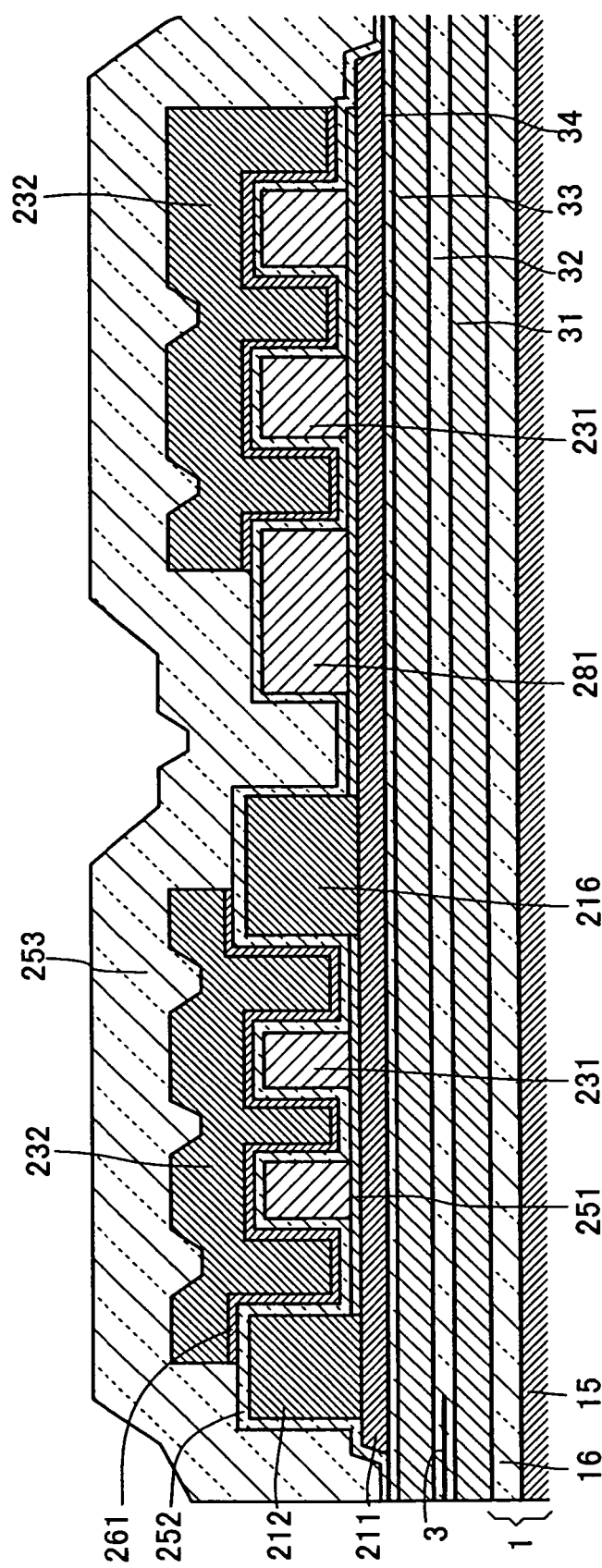
FIG. 44 is a diagram showing a process after the process shown in FIG. 43.

<Process Leading to a State of FIG. 44>

In a process leading from the state of FIG. 43 to the state of FIG. 44, a plating film 232 to be a second coil is formed, for example, 3 to 5 μm thick on the seed film 261 by a frame-plating method.

As the seed film 261 is formed as a Cu-CVD film and is deposited on bottom surfaces, side surfaces and top surfaces of the first coil 231, according to indentions and protrusions in the first coil 231, with excellent step coverage, it is possible to form a plating film 232 in narrow and long space between coil turns of the first coil 231 without making keyholes in the bottom of said space. The plating film 232 comprises Cu as its main constituent and is formed by a selective plating method. A part of the seed film 261 not covered with the plating film 232 is removed by wet etching using dilute hydrochloric acid, dilute sulfuric acid, copper sulfate or the like, or by dry etching such as ion milling.

After that, an insulating film 253 of $Al_2O_3$ is formed so as to cover the plating film 232 and the area not covered with the plating film 232. The insulating film 253 is formed as a sputtering film of 4 to 6 μm in thickness.

Figure 45:
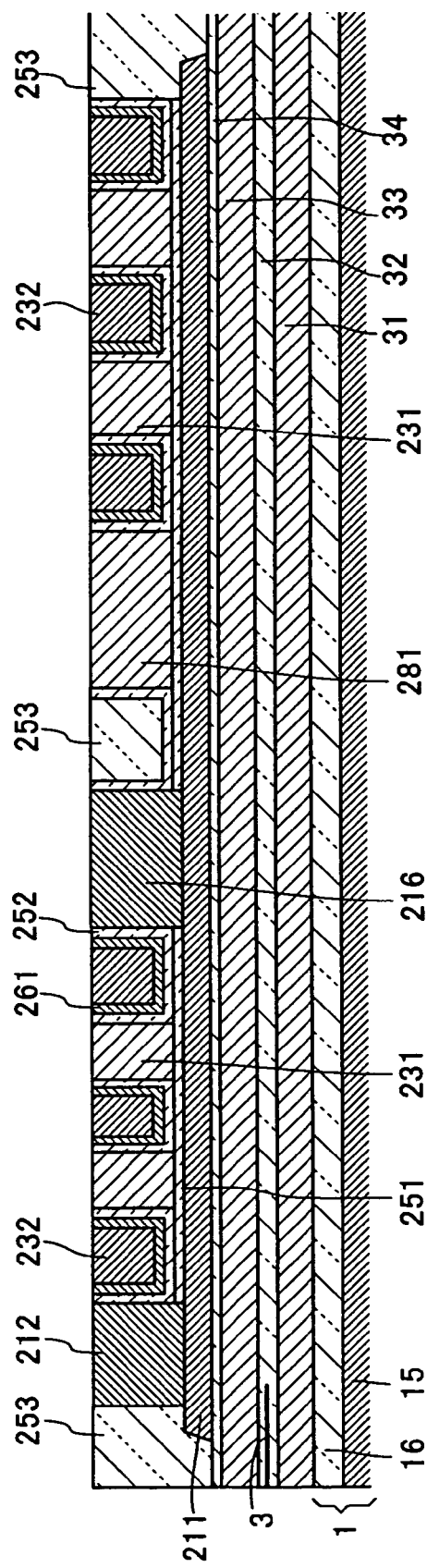
FIG. 45 is a diagram showing a process after the process shown in FIG. 44.

<Process Leading to a State of FIG. 45>

In a process leading from the state of FIG. 44 to the state of FIG. 45, the insulating film 253 and the plating film 232 are polished and flattened by CMP. Consequently, a second coil 232 of a spiral pattern is obtained, insulated from the first coil 231 by the insulating film 252. In the CMP, the surfaces of the second pole piece 212, the back gap piece 216 and the insulating film 253 are also polished so as to form the same plane as the surfaces of the first coil 231 and the second coil 232.

Figure 46:
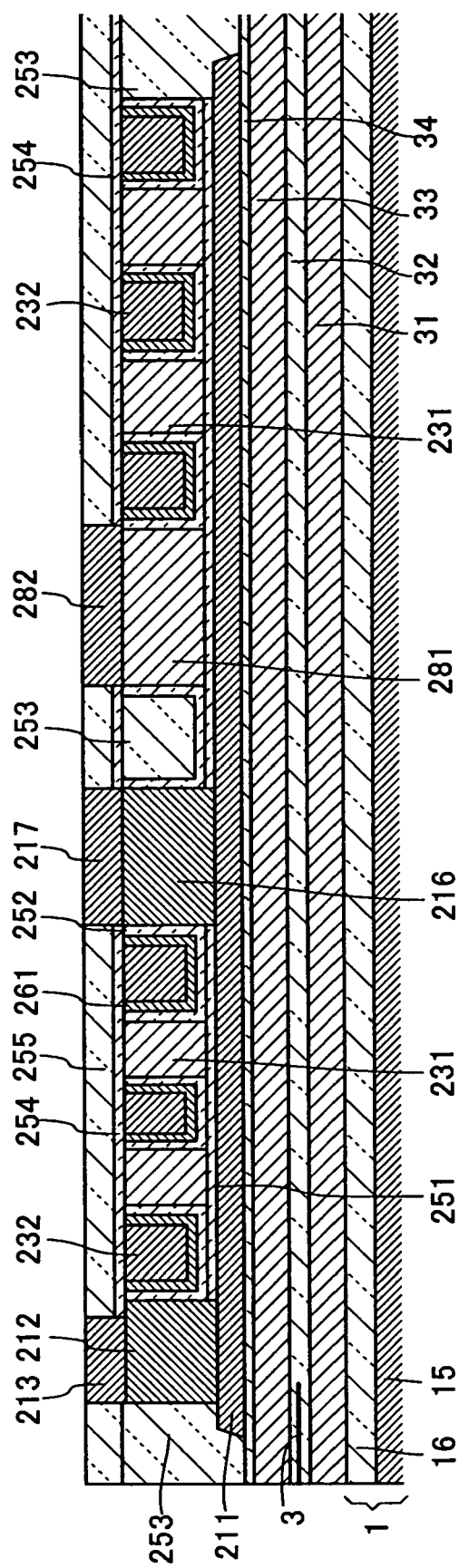
FIG. 46 is a diagram showing a process after the process shown in FIG. 45.

<Process Leading to a State of FIG. 46>

In a process leading from the state of FIG. 45 to the state of FIG. 46, an insulating film 254 covering the surfaces of the first coil 231 and the second coil 232 is formed thereon. The insulating film 254 is made of $Al_2O_3$, formed 0.2 μm to 0.5 μm thick, for example.

Next, a reactive ion etching (RIE) process or an ion milling process is applied onto the insulating film 254 to form openings for a third pole piece 213 and a back gap piece 217 (see FIGS. 7 and 8). After that, plating is performed to form the third pole piece 213 and the back gap piece 217. After the third pole piece 213 and the back gap piece 217 are formed, the resist frame is removed. The third pole piece 213 and the back gap piece 217 each are a plating film of CoFe or CoNiFe (2.1 to 2.3 T) and have a film thickness of 1 to 2 μm.

Next, an insulating film 255 of $Al_2O_3$ is deposited, for example, 1 to 2 μm in thickness on the surface where the third pole piece 213 and the back gap piece 217 have been formed, and then the surfaces of the insulating film 255, the third pole piece 213 and the back gap piece 217 are polished by CMP. By this CMP, the third pole piece 213 and the back gap piece 217 are self-positioned in the insulating film 255.

Figure 47:
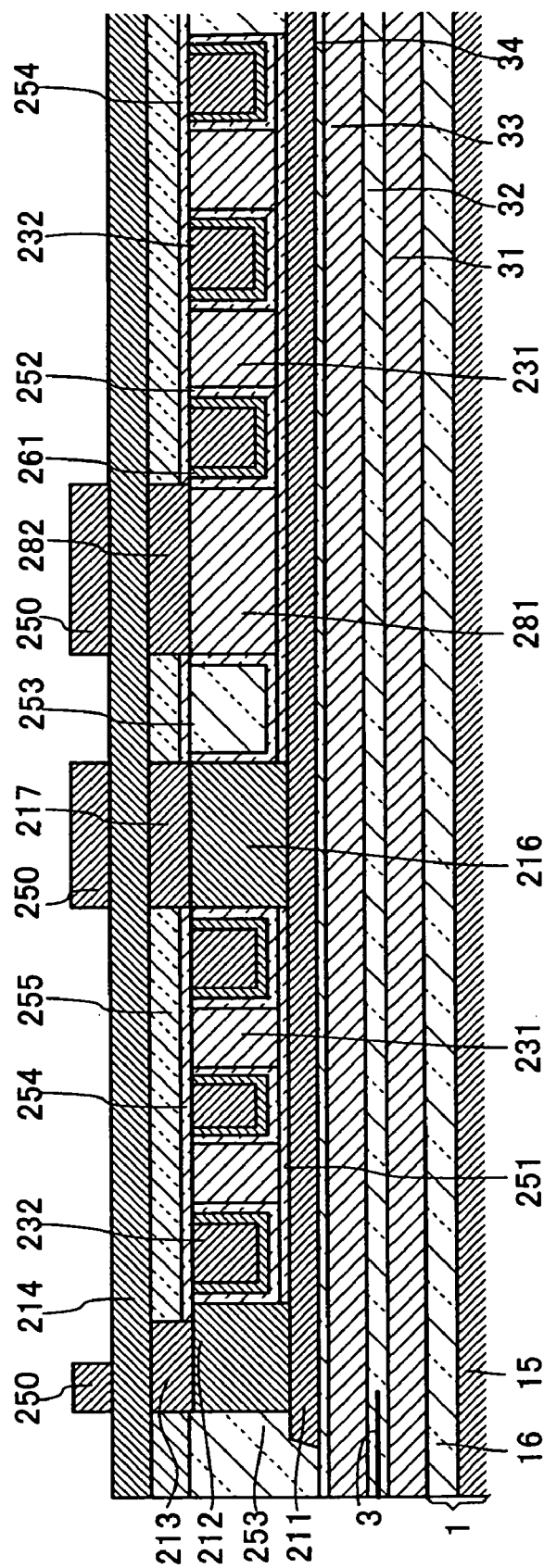
FIG. 47 is a diagram showing a process after the process shown in FIG. 46.
Figure 48:
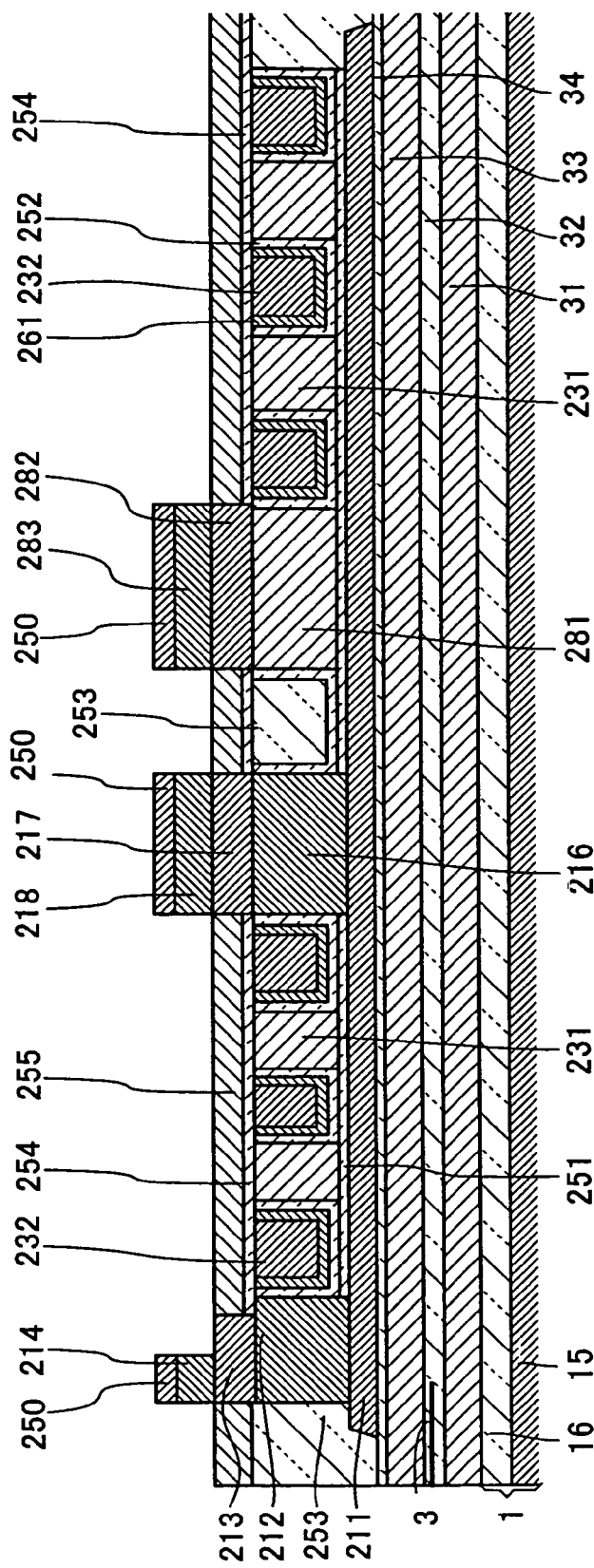
FIG. 48 is a diagram showing a process after the process shown in FIG. 47.

<Process Leading to a State of FIGS. 47 and 48>

In a process leading from the state of FIG. 46 to the state of FIG. 47, a magnetic film 214 is formed 0.5 to 1.0 μm thick on the polished surfaces of the insulating film 255, the third pole piece 213 and the back gap piece 217. The magnetic film 214 can be made of a plating film of CoFeN (2.4 T) or a sputtering film of FeAlN, FeN, FeCo or FeZrN. After that, a mask 250, which is a pattern-plating film of NiFe or CoNiFe, is formed on the third pole piece 213 and the back gap piece 217. And an IBE process with the mask 250 is applied onto the magnetic film 214 so that the magnetic film 214 is patterned.

Consequently, as shown in FIG. 48, a fourth pole piece 214 and a back gap piece 218 are formed.

For patterning the magnetic film 214 with the mask 250 of a pattern-plating film, ion beams are applied at 0 degree and 75 degrees, which provides selective patterning on the magnetic film 214 made of an HiBs material.

The magnetic film 214 can also be patterned by other methods. For example, an RIE process is applied onto the magnetic film 214 at a high temperature of 50 to 300° C. under a halogen-based gas atmosphere such as $Cl_2$ or $BCl_3+Cl_2$, so that the magnetic film 214 is etched to 80% of its film thickness. The temperature in the RIE process is preferably 50° C. or higher, more preferably 200 to 250° C. This temperature range provides a high-accuracy pattern.

Moreover, an etching profile can be accurately controlled by introducing $O_2$ into a $C_{12}$-based gas. Specifically, as mixing $O_2$ with a $BCl_3+Cl_2$ gas makes it possible to remove a deposit of a residual boron gas completely, an extremely accurate control over the etching profile is achieved.

Moreover, the use of an etching gas obtained by mixing a $CO_2$ with a $Cl_2$ gas, a $BCl_3+Cl_2$ gas, an $O_2$-mixed $Cl_2$ gas, or $O_2$-mixed $BCl_3+Cl_2$ gas increases the etching rate of RIE, and consequently improves the selection ratio with a mask material by 30 to 50%.

After a part of the magnetic film 214, for example, 80% part is etched as described above, an additional IBE is applied onto the residual magnetic film 214. This IBE is applied at an angle of 40 to 70 degrees, for example.

As described above, by patterning the magnetic film 214 with the mask 250 made of a pattern-plating film of NiFe or CoNiFe, the fourth pole piece 214 with high accuracy is formed. Consequently, a throat height defined by the fourth pole piece 214 is controlled with high accuracy. For example, the throat height can be controlled to be 0.1 to 0.5 μm or 0.2 to 0.7 μm with grate freedom. Consequently, a thin film magnetic head with a quick rise of a write current and excellent over-write characteristic is obtained.

Moreover, as the throat height is defined by the fourth pole piece 214 of a thick HiBs material, write magnetic flux for giving a magnetic record to a medium can be concentrated at a pole end as reducing halfway leakage magnetic flux. Consequently, problems such as side erase or side write can be solved.

Figure 49:
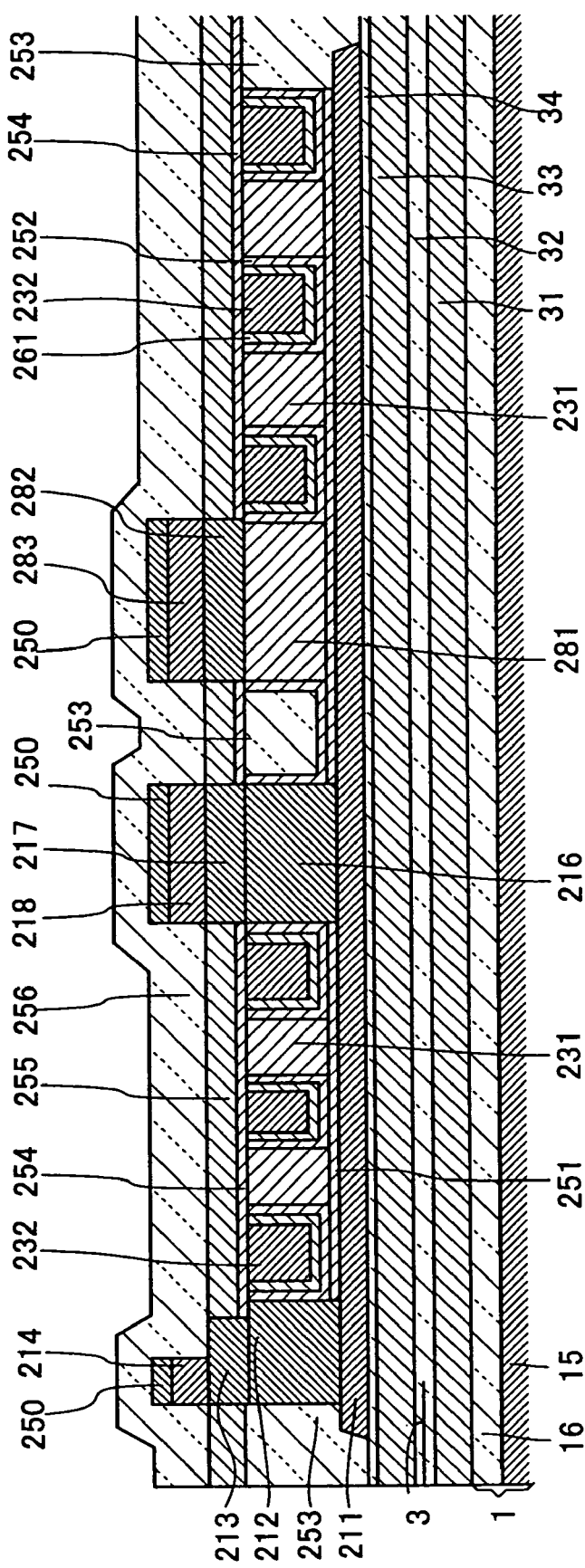
FIG. 49 is a diagram showing a process after the process shown in FIG. 48.
Figure 50:
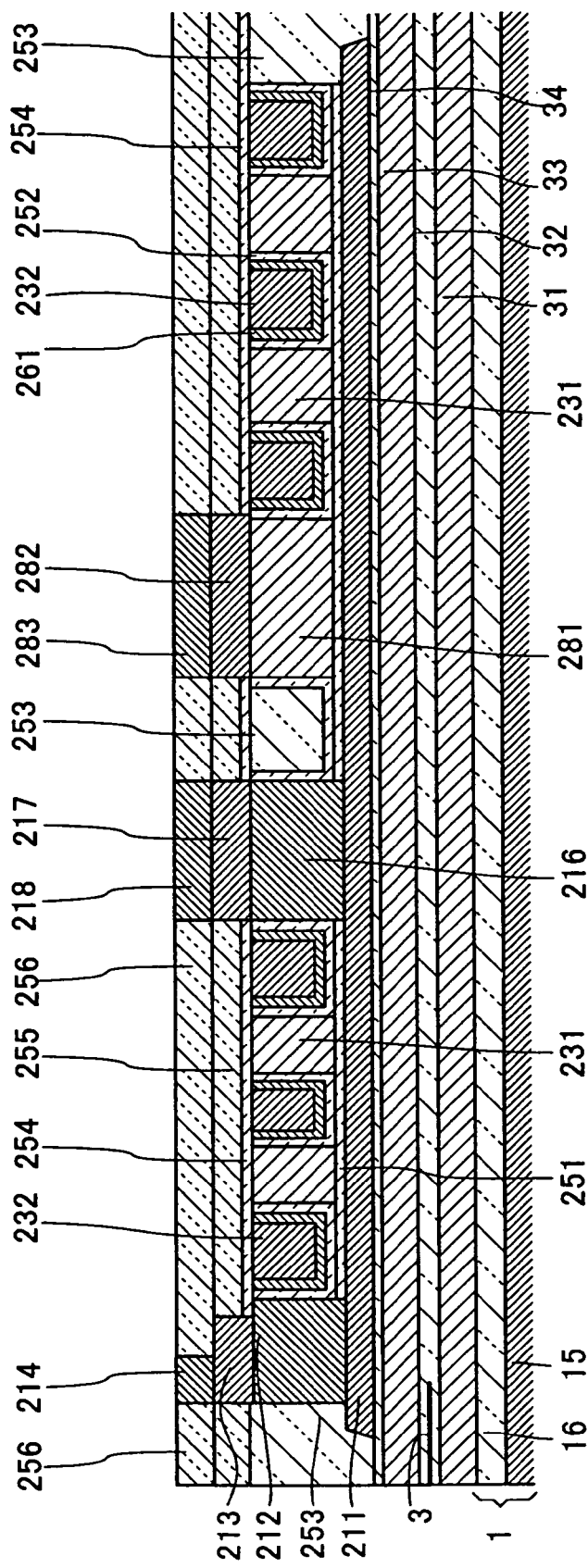
FIG. 50 is a diagram showing a process after the process shown in FIG. 49.

<Process Leading to a State of FIGS. 49 and 50>

In a process leading from the state of FIG. 48 to the state of FIG. 49, an insulating film 256 of $Al_2O_3$ is deposited 3 to 4 μm thick by means of sputtering or the like. After that, as shown in FIG. 50, the surfaces of the insulating film 256, the fourth pole piece 214 and the back gap piece 218 are polished and flattened by CMP. By this CMP, the fourth pole piece 214 and the back gap piece 218 are self-positioned in the insulating film 256.

Figure 51:
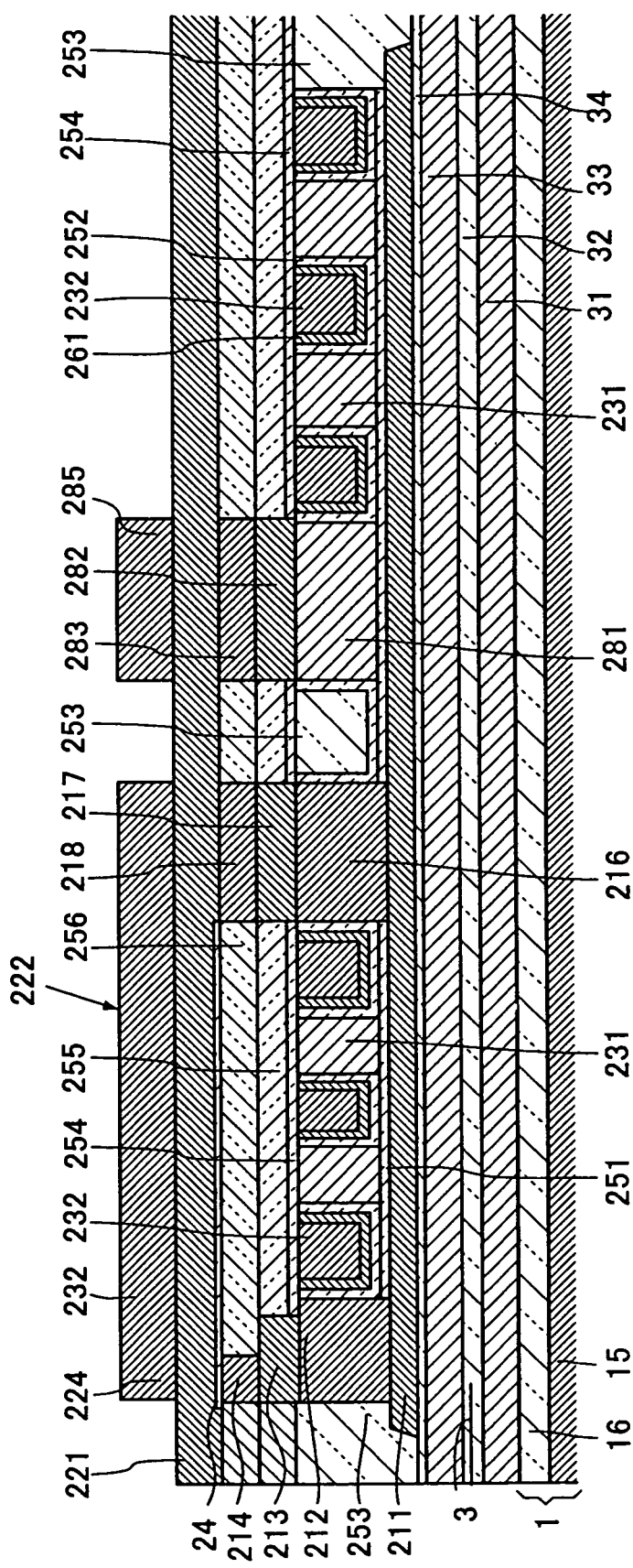
FIG. 51 is a diagram showing a process after the process shown in FIG. 50.
Figure 52:
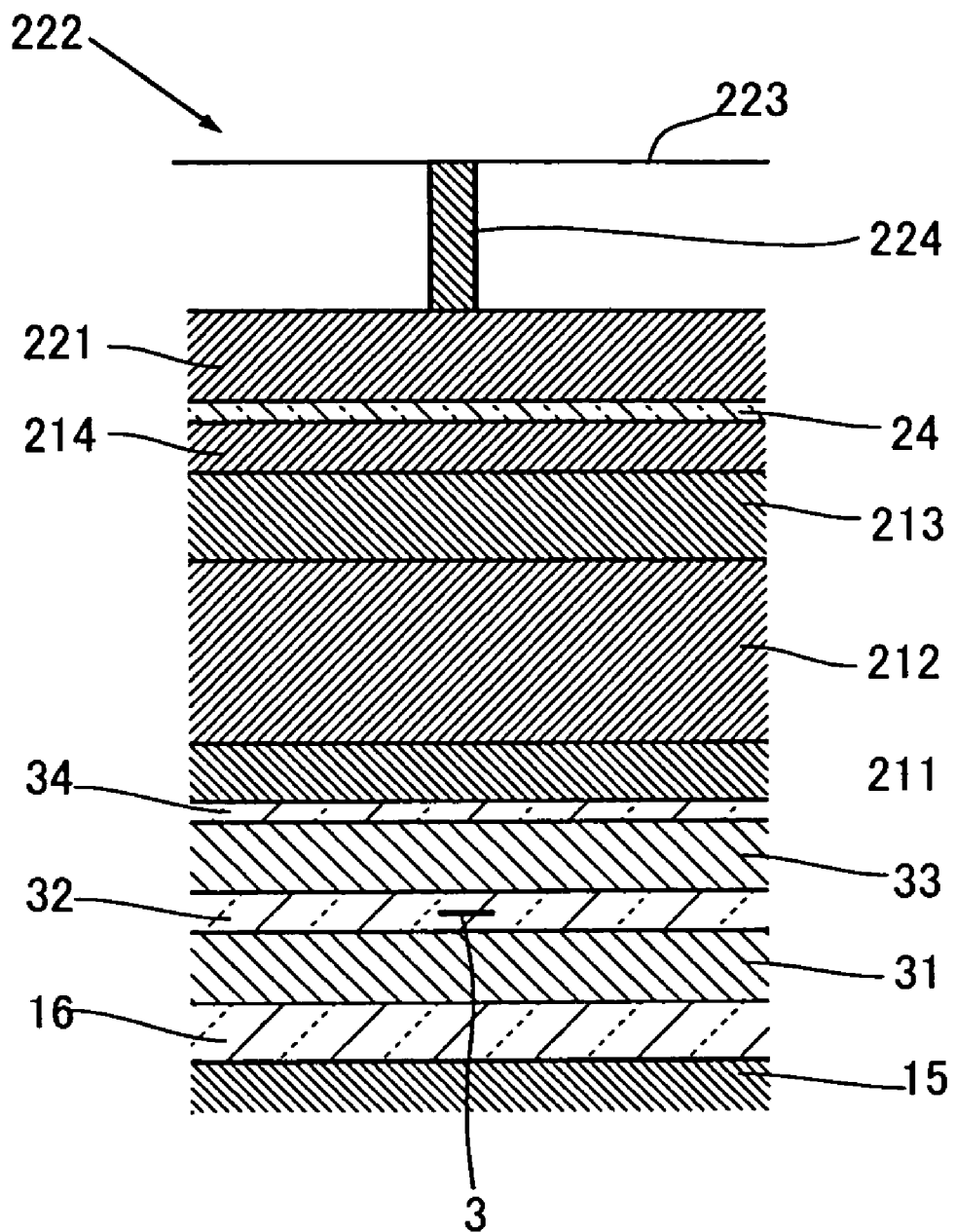
FIG. 52 is a view of the process shown in FIG. 51, seen from the ABS side.

<Process Leading to a State of FIGS. 51 and 52>

In a process leading from the state of FIG. 50 to the state of FIGS. 51 and 52, a resist frame formed by photolithography is applied onto the polished and flattened surface, and a frame-plating method is performed so that a third magnetic film 222 is selectively formed. The third magnetic film 222 can be made of CoNiFe (composition ratio, 67:15:18, 1.8 to 1.9 T) or FeCo (composition ratio, 60:40, 2.4 T). The thickness of the third magnetic film 222 is, for example, 3.5 to 4.0 μm. The third magnetic film 222 has a wide portion 223 forming a main part of the yoke, and a narrow portion 224 forming a pole portion.

Figure 53:
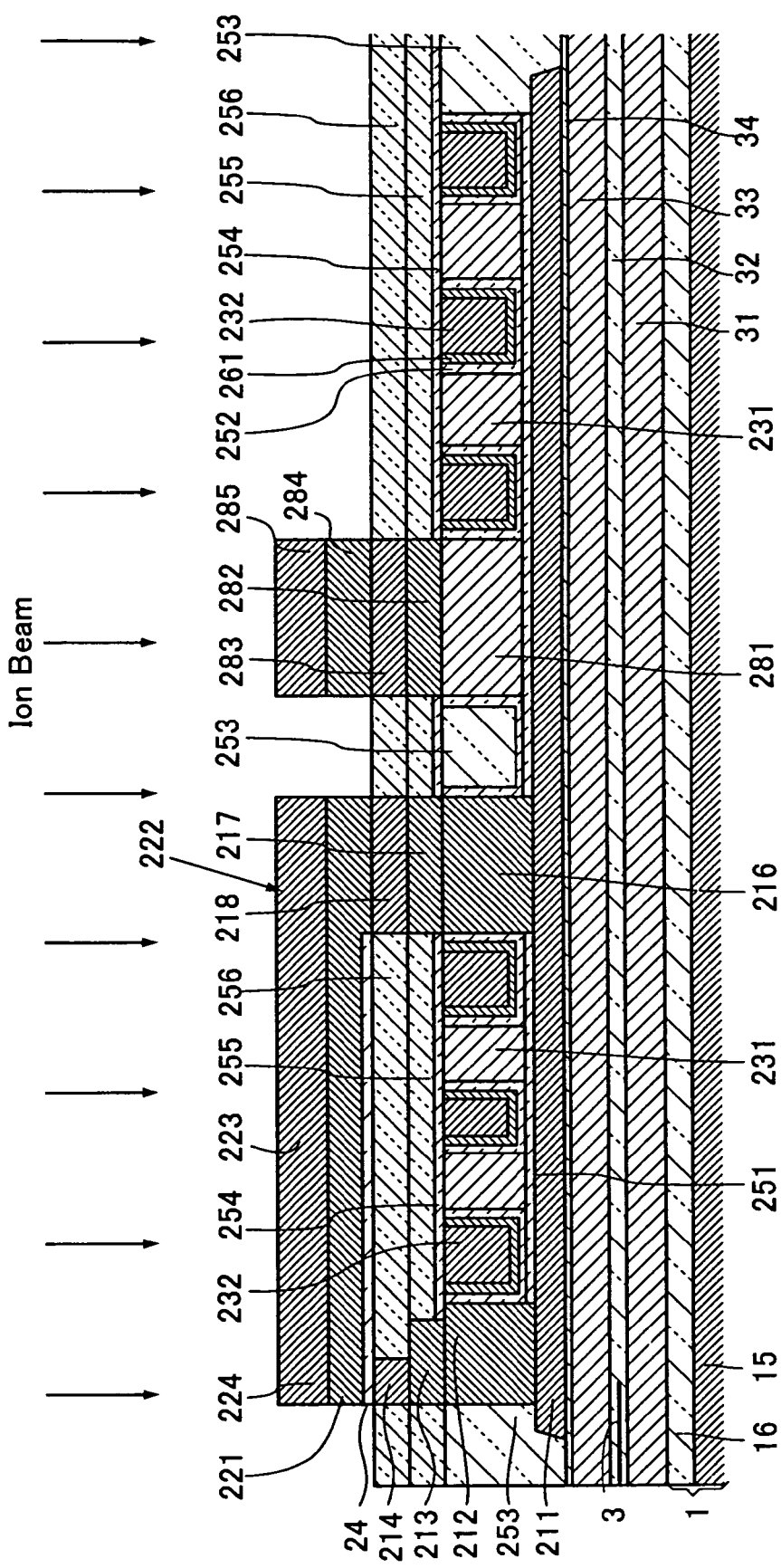
FIG. 53 is a diagram showing a process after the process shown in FIGS. 51 and 52.
Figure 54:
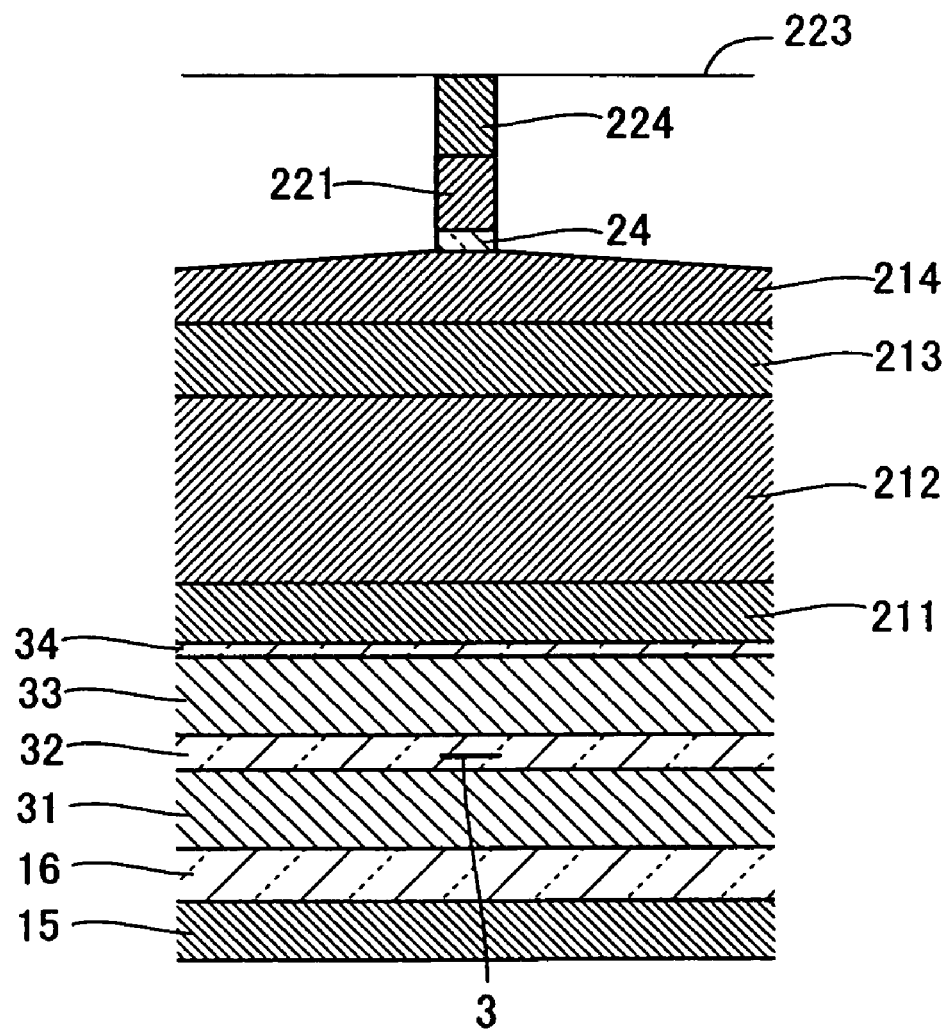
FIG. 54 is a view of the process shown in FIG. 53, seen from the ABS side.

<Process Leading to a State of FIGS. 53 and 54>

In a process leading from the state of FIGS. 51 and 52 to the state of FIGS. 53 and 54, ion beams are applied at 30 to 50 degrees, using the third magnetic film 222 as a mask, so that the second magnetic film 221 is etched and removed.

Figure 55:
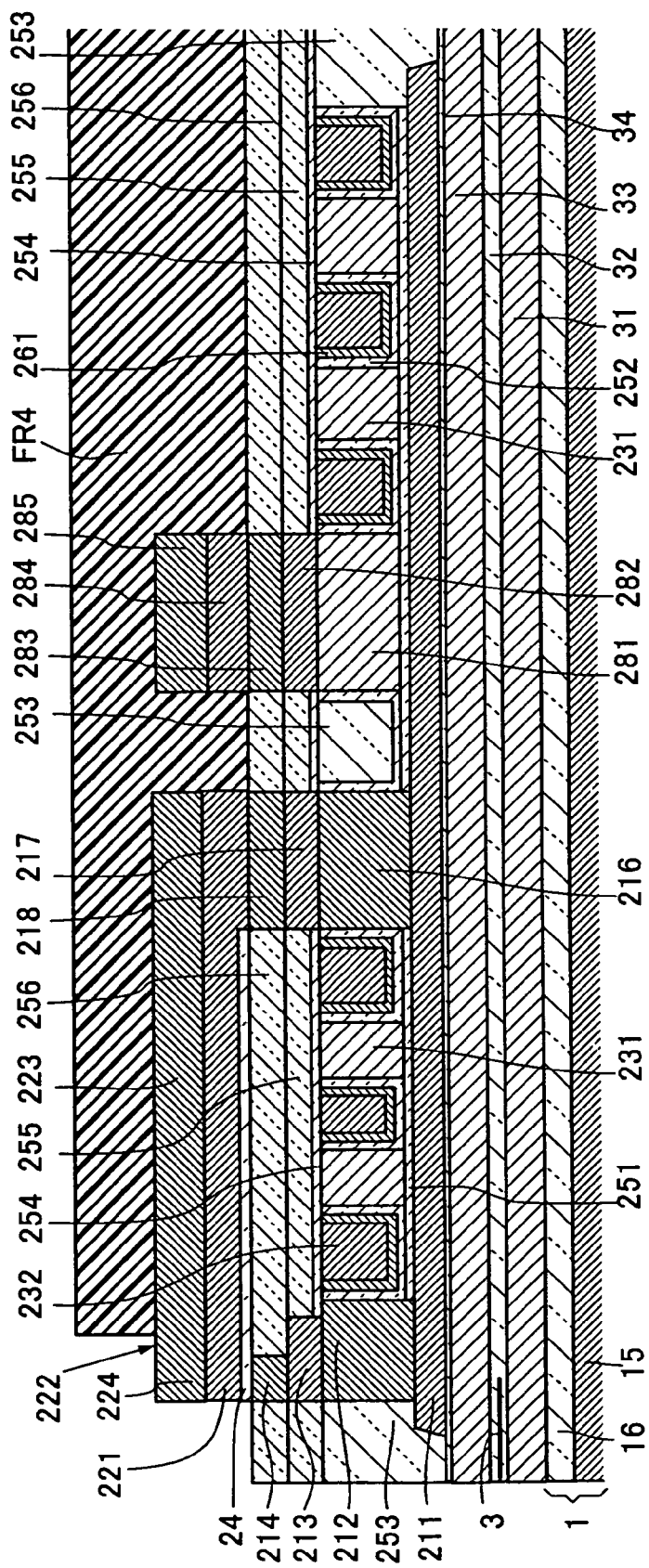
FIG. 55 is a diagram showing a process after the process shown in FIGS. 53 and 54.
Figure 56:
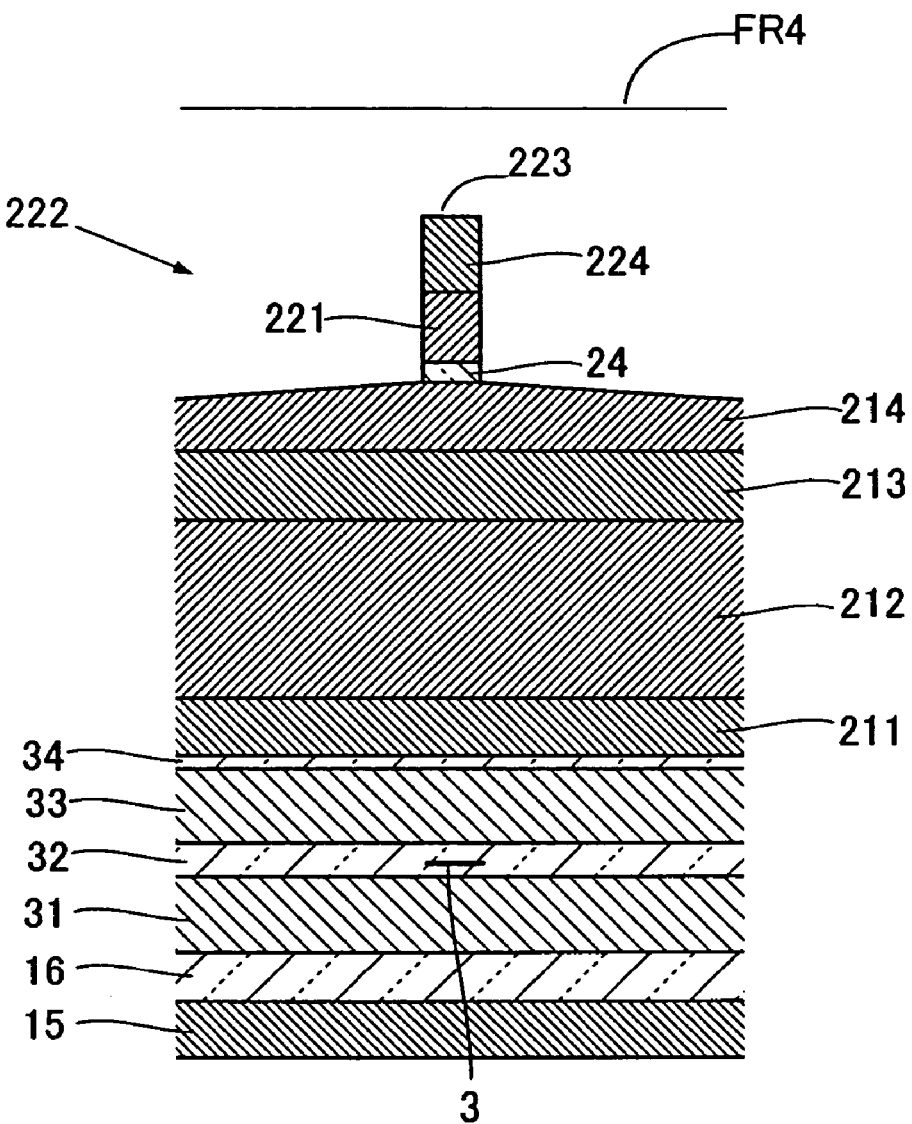
FIG. 56 is a view of the process shown in FIG. 55, seen from the ABS side.

<Process Leading to a State of FIGS. 55 and 56>

Next, as shown in FIGS. 55 and 56, the whole wide portion 223 of the third magnetic film 222 except the narrow portion 224 of the third magnetic film 222 is covered with a resist mask FR4. The resist mask FR4 is deposited 5 to 7 μm thick. The resist mask FR4 is formed to be convex on the third magnetic film 222 and also spread above the first coil 231 and the second coil 232.

Figure 57:
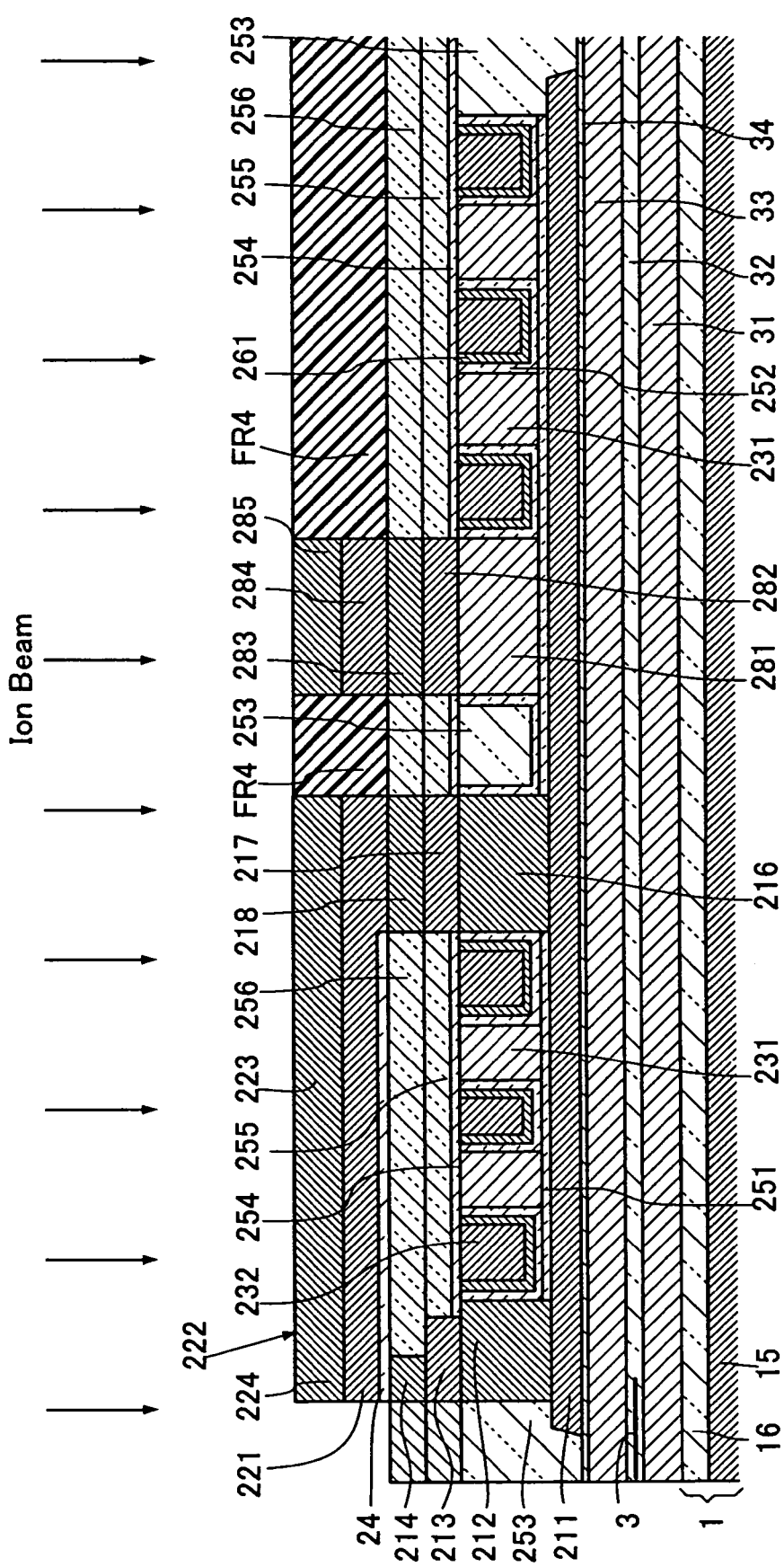
FIG. 57 is a diagram showing a process after the process shown in FIGS. 55 and 56.
Figure 58:
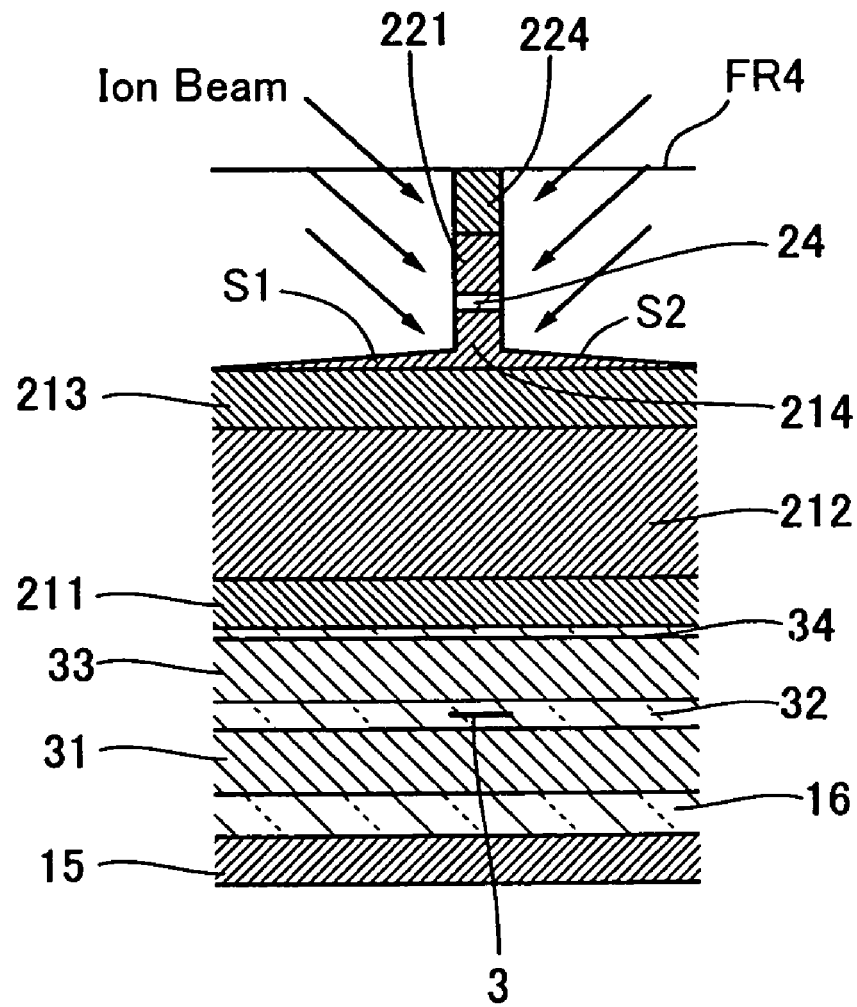
FIG. 58 is a view of the process shown in FIG. 57, seen from the ABS side.

<Process Leading to a State of FIGS. 57 and 58>

Next, as shown in FIGS. 57 and 58, the resist mask FR4 is etch-backed so as to expose the surface of the third magnetic film 222, which forms the second yoke portion. The etch-backing process to etch-back the resist mask FR4 may comprise a dry-etching process with an $O_2$-mixed plasma, or an isotropic or anisotropic dry-etching process with halogen-based or chlorofluorocarbon-based plasma ashing. These etching processes provide dry-etching with excellent flatness. Aforesaid anisotropic dry-etching process is performed by using $O_2$ gas, or halogen-based gas such as chlorofluorocarbon-based gas, e.g. $SF_4$ or $SF_6$.

By the etch-backing process, the resist mask FR4 is self-aligned in intimate contact with outer circumferential edges of the second and third magnetic films 221 and 222 without misalignment of the resist mask FR4 or a gap between the resist mask FR4 and the outer circumferential edges. In the subsequent etching process, consequently, there is no possibility that the outer circumferential edges of the second and third magnetic films 221 and 222 might be attacked by an etching means such as ion beams and so, a high-accuracy pattern of the second yoke portion, which is formed of the second and third magnetic films 221 and 222, is obtained.

The resist mask FR4 is also self-aligned in intimate contact with the flare portion 225 without misalignment of the resist mask FR4 or a gap between the resist mask FR4 and the flare portion 225 and so, in the subsequent etching process, there is no possibility that the outer edge of the flare portion 225 might be attacked by an etching means such as ion beams. Thus, it is possible to prevent variations in a flare point, which is between the flare portion 225 and the narrow portion 224. This assures a constant minimal value of the distance from the ABS to the flare point in a thin film magnetic head and consequently assures the over-write characteristic.

Next, an etching process is applied through the opening of the resist mask FR4 to parts of the magnetic films 221, 222 and/or a part of the gap film 24 that are in the opening. The opening of the resist mask FR4 has been formed on the narrow portion 224, which forms the second pole portion. The aforesaid etching process on the narrow portion 224 provides a thin film magnetic head of a high areal recording density type having a narrow track width of 0.1 to 0.2 μm.

Aforesaid etching process produces etching indentations on both sides of the narrow portion 224. In this etching process, the magnetic film 214 (fourth pole piece) that is one of magnetic films 211 to 214 forming the first pole portion P1 and is adjacent to the gap film 24, is etched so that not all portions of the magnetic film 214 are etched and on the bottoms of the etching indentations, a base portion (S1, S2) of the magnetic film 214 is left. In case of using IBE as an etching means, by selected irradiation angles of ion beams and the geometric structure of the narrow portion 224, the magnetic film 214 is etched so as to have a narrowed portion and a base portion (S1, S2) left on the bottoms, the base portion (S1, S2) increasing in thickness toward the narrowed portion. This structure make it possible to both keep a narrowed track width and allow a sufficient sectional area of the magnetic film 214 adjacent to the gap film 24. Consequently, magnetic saturation in the magnetic film is prevented and so, over-write characteristic is improved.

After the process shown in FIGS. 57 and 58, the resist mask FR4 is removed. After that, a protective film 258 made of alumina or the like (see FIGS. 3 and 4) is deposited 20 to 40 μm thick and the manufacturing process is finished. After that, publicly known post-processes of cutting out a thin film magnetic head from the wafer, polishing for determining a throat height, processing ABS and the like are performed.

(3) EMBODIMENT 3

Embodiment 3 is a process of manufacturing a thin film magnetic head shown in FIGS. 9 and 10, and is illustrated in FIGS. 59 to 65. rocesses, which have been illustrated and described in embodiment 1 or 2 and are also applied to embodiment 3, are referred to the description of embodiment 1 or 2 and the illustrations of the processes may be omitted.

Figure 59:
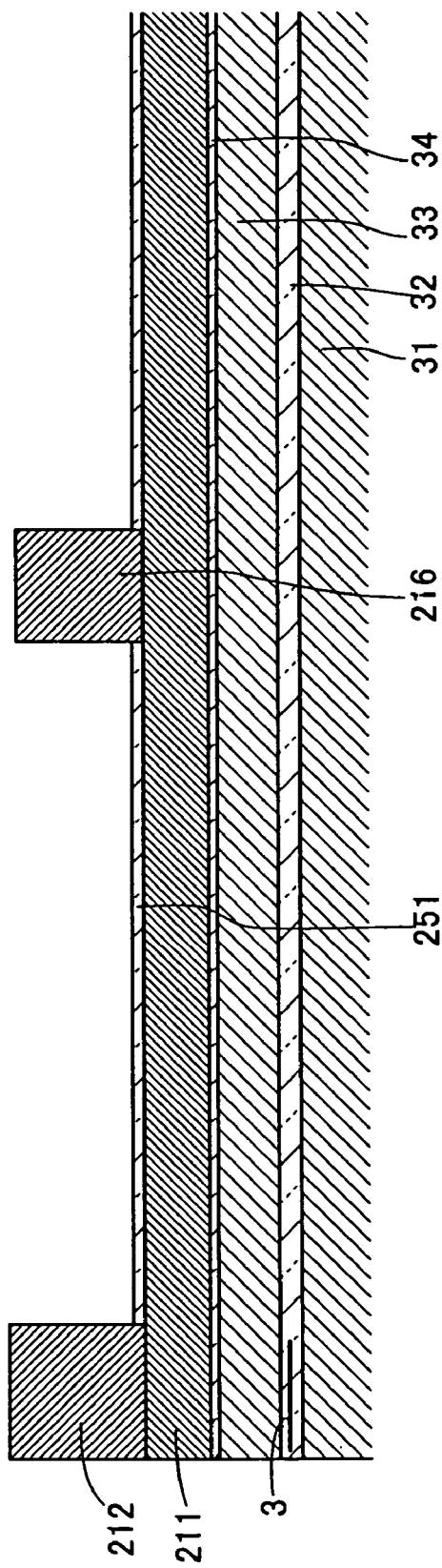
FIG. 59 is a diagram showing a process of manufacturing a thin film magnetic head shown in FIGS. 9 and 10.

<Process Leading to a State of FIG. 59>

On an insulating film 16 deposited on a base body 15 there are formed a first shield film 31, a read element 3, an insulating film 32, a second shield film 33, an insulating film 34 and a first magnetic film 211 by means of publicly known processes.

In a specific example, the insulating film 16 is an alumina film, formed in a thickness of 3 μm or the like. The first shield film 31 is made of a magnetic material such as NiFe, formed 2 to 3 μm thick by a frame-plating method. The insulating film 32 is, in general, formed by two steps: in the first step, an alumina film of 3 to 4 μm in thickness is formed and after that, the surface of the alumina film is flattened by CMP and then an GMR element 3 to be a read element is formed; and in the second step, an alumina film covering the GMR element 3 is formed. The second shield film 33 is made of a magnetic material such as NiFe, formed 2 to 3 μm thick. The insulating film 34 is formed as an alumina film of 0.2 to 0.3 μm in thickness.

The first magnetic film 211 is made of CoNiFe (2.1T) or CoFeN (2.4T), formed 1.5 to 2.0 μm thick. On an end to be the first pole piece, of the first magnetic film 211, there may be formed a plating film of NiFe (80%:20%) or NiFe (45%:55%), or a sputtering film of FeAlN, FeN, FeCo, CoFeN or FeZrN, with a thickness of 0.5 to 0.6 μm and then patterned by ion milling.

After that, an insulating film 251 is formed, for example, 0.2 to 0.3 μm thick on the flat surface of the first magnetic film 211, the insulating film 251 having an area slightly larger than an area necessary for forming a coil. The insulating film 251 are formed so as to have openings where a back gap portion and a pole portion are to be formed. And, a frame-plating method is applied onto the openings so that a second pole piece 212 and a first back gap piece 216 are formed. FIG. 59 shows a state in which the second pole piece 212 and the first back gap piece 216 have been formed.

Figure 60:
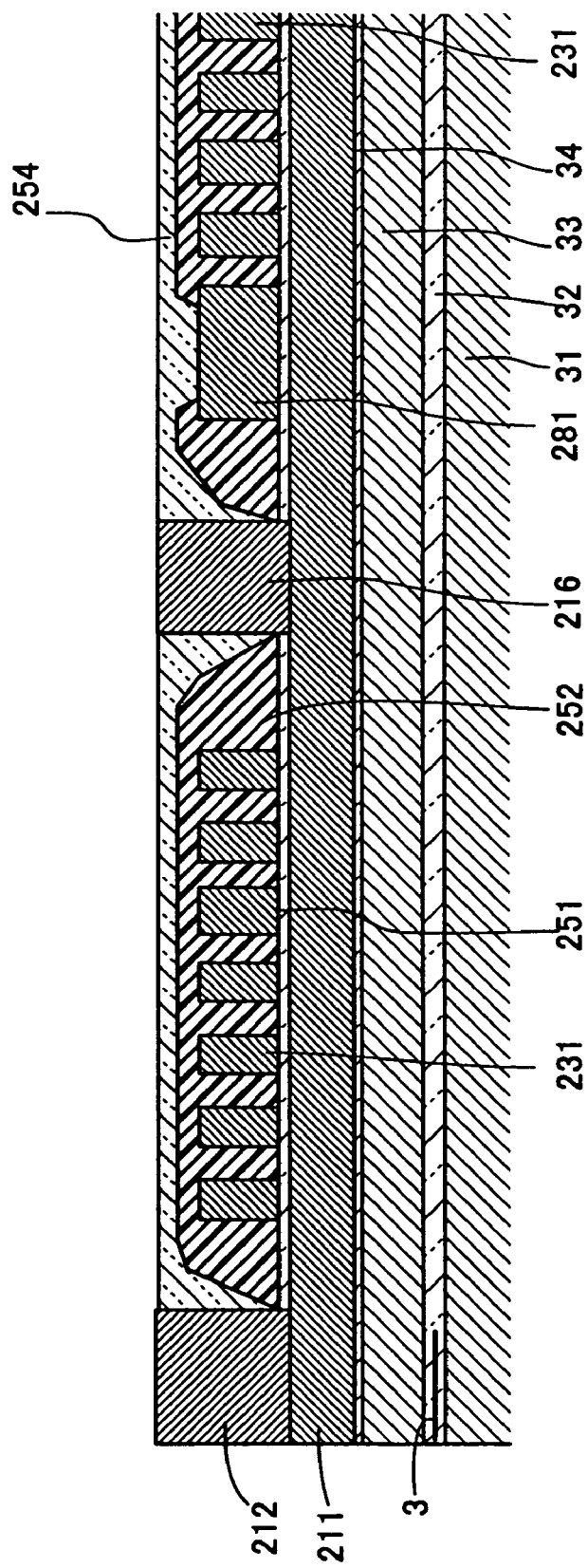
FIG. 60 is a diagram showing a process after the process shown in FIG. 59.

<Process Leading to a State of FIG. 60>

After the process of FIG. 59, a photolithography process is performed on one surface where the insulating film 251 has been formed, and a resist frame plating method is performed so that a first coil 231 is formed 2.5 to 3.5 μm in thickness. Next, an insulating film 252 of photoresist is formed in the space between coil turns of the first coil 231.

Next, an insulating film 254 of $Al_2O_3$ is deposited, for example, 3 to 4 μm thick on the surface where the pole piece 212 and the back gap piece 216 have been formed, and then the surfaces of the insulating film 254, the pole piece 212 and the back gap piece 216 are polished by CMP. FIG. 60 shows a state in which the CMP has been performed.

Figure 61:
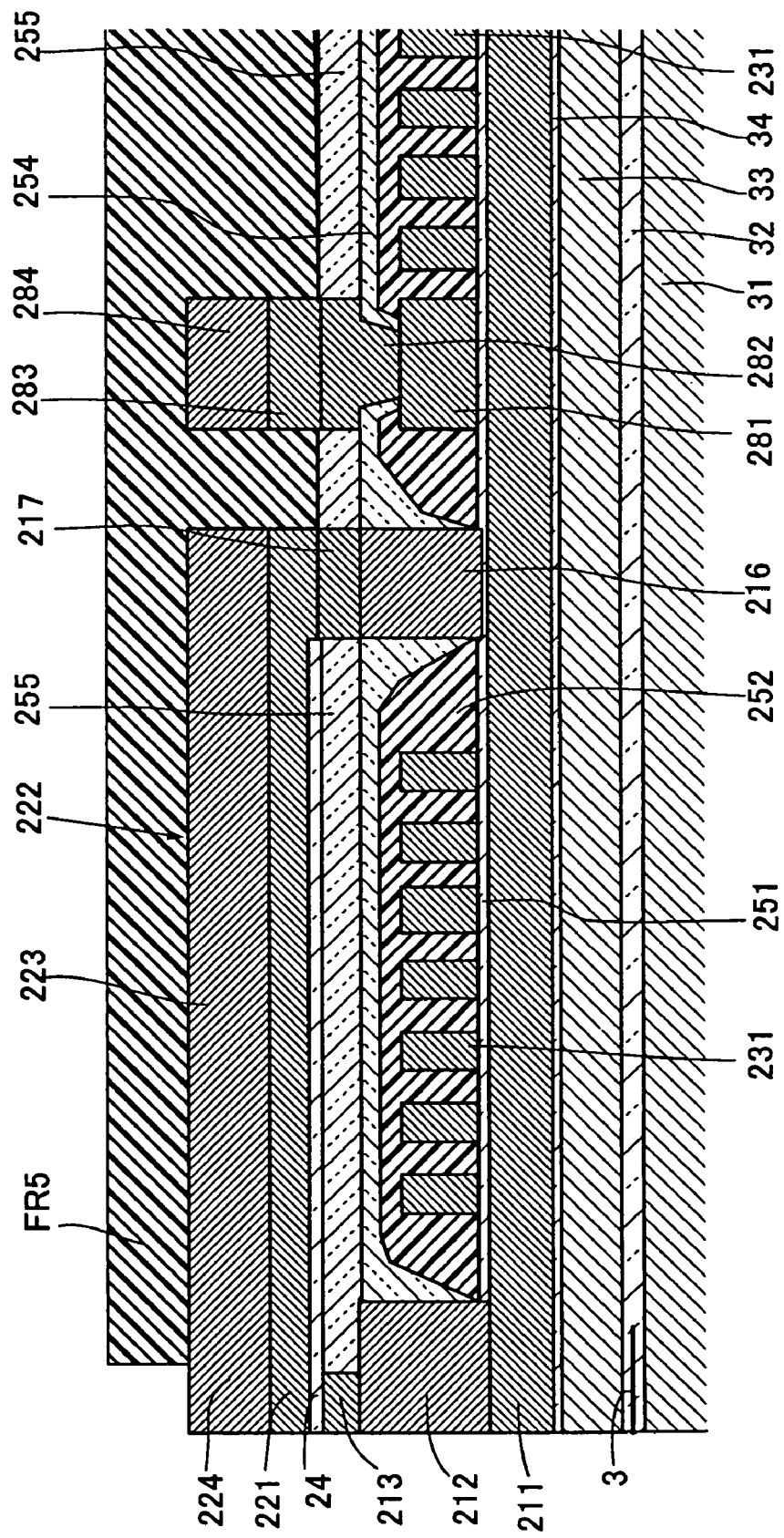
FIG. 61 is a diagram showing a process after the process shown in FIG. 60.
Figure 62:
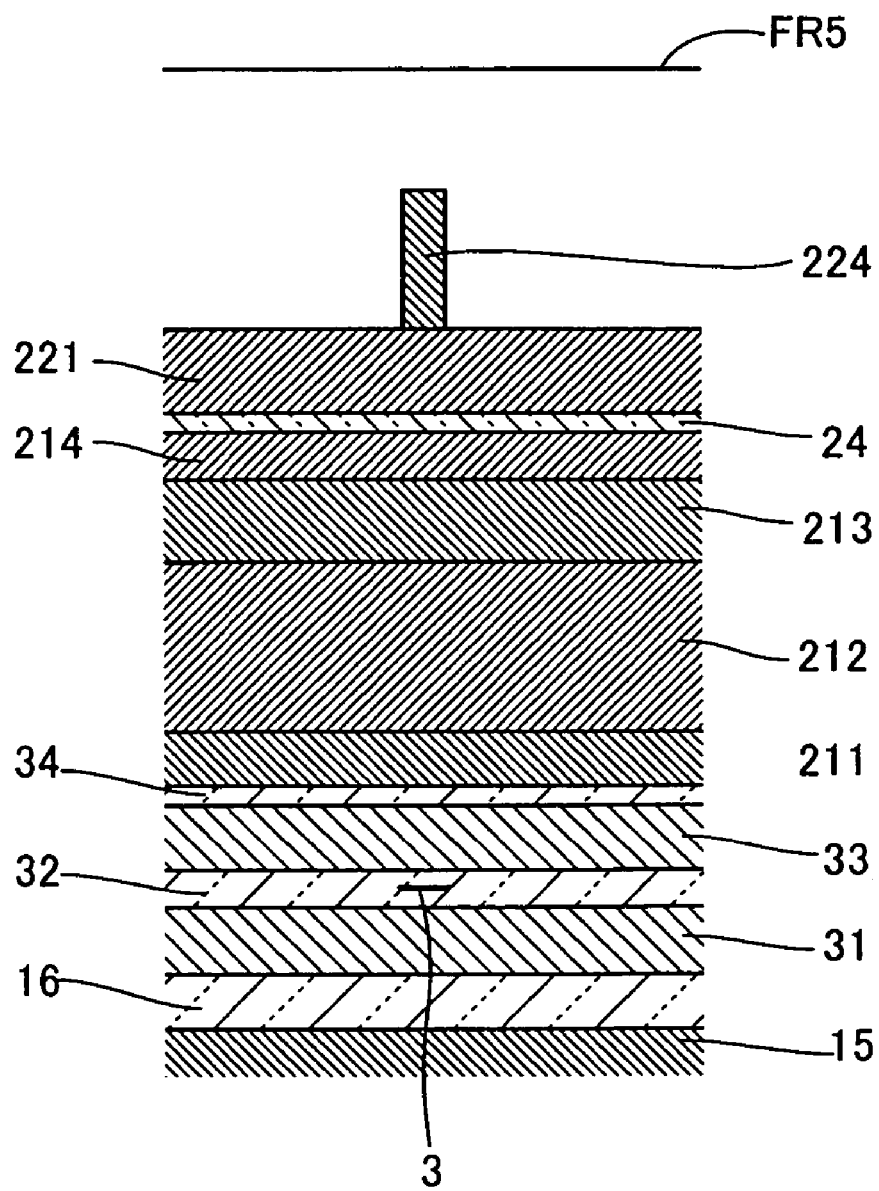
FIG. 62 is a view of the process shown in FIG. 61, seen from the ABS side.

<Process Leading to a State of FIGS. 61 and 62>

In a process leading from the state of FIG. 60 to the state of FIGS. 61 and 62, a magnetic film made of CoFe, which is a HiB material, is formed 0.5 to 0.6 μm thick on one surface where the insulating film 254 has been formed. After that, on the surface of the magnetic film of CoFe there are formed plating patterns corresponding to the connecting conductor 281, the second pole piece 212 and the back gap piece 216, and then the magnetic film is etched by ion milling, using plating patterns as masks. Consequently, a connecting conductor 282, a third pole piece 213 and a back gap piece 217 are obtained.

Next, an insulating film 255 of $Al_2O_3$ is deposited on the surface where the connecting conductor 282, the third pole piece 213 and the back gap piece 217 have been formed, and then the surfaces of the insulating film 255, the third pole piece 213, the back gap piece 217 and the connecting conductor 282 are polished by CMP.

Next, a gap film 24 is formed 0.06 to 0.1 μm thick on the surface flattened by CMP. The gap film 24 is made of a non-magnetic metal material such as Ru and formed by sputtering or the like.

Next, a second magnetic film 221 is formed on the surface of the gap film 24 and the flattened surface. The second magnetic film 221 is made of an HiBs material. Specifically, CoFe and CoFeN are particularly suitable among HiBs materials such as FeAlN, FeN, CoFe, CoFeN and FeZrN. The second magnetic film 221 is formed, for example, 0.3 to 0.6 μm thick and is to be used as a seed film in the subsequent plating process for forming a third magnetic film.

After that, the third magnetic film 222 is formed by a frame-plating method using the second magnetic film 221 as a seed film. The third magnetic film 222 is made of NiFe (composition ratio, 55:45), CoNiFe (composition ratio, nearly 67:15:18, 1.9 T to 2.1 T), CoFe (composition ratio, 40:60, 2.3 T) or the like. The thickness of the third magnetic film 222 is 3.5 to 4.0 μm. The third magnetic film 222 is formed so as to have a wide portion 223 and a narrow portion 224 (see FIG. 26). The wide portion 223 forms a second yoke portion and the narrow portion 224 forms a second pole portion.

Next, the whole wide portion 223 of the third magnetic film 222 except the narrow portion 224 of the third magnetic film 222 is covered with a resist mask FR5. The resist mask FR5 is formed to spread above the first coil 231. Also, the resist mask FR5 is formed to have an end face perpendicular to the surface of the narrow portion 224. FIGS. 61 and 62 show a state in which the resist mask FR5 has been formed.

Figure 63:
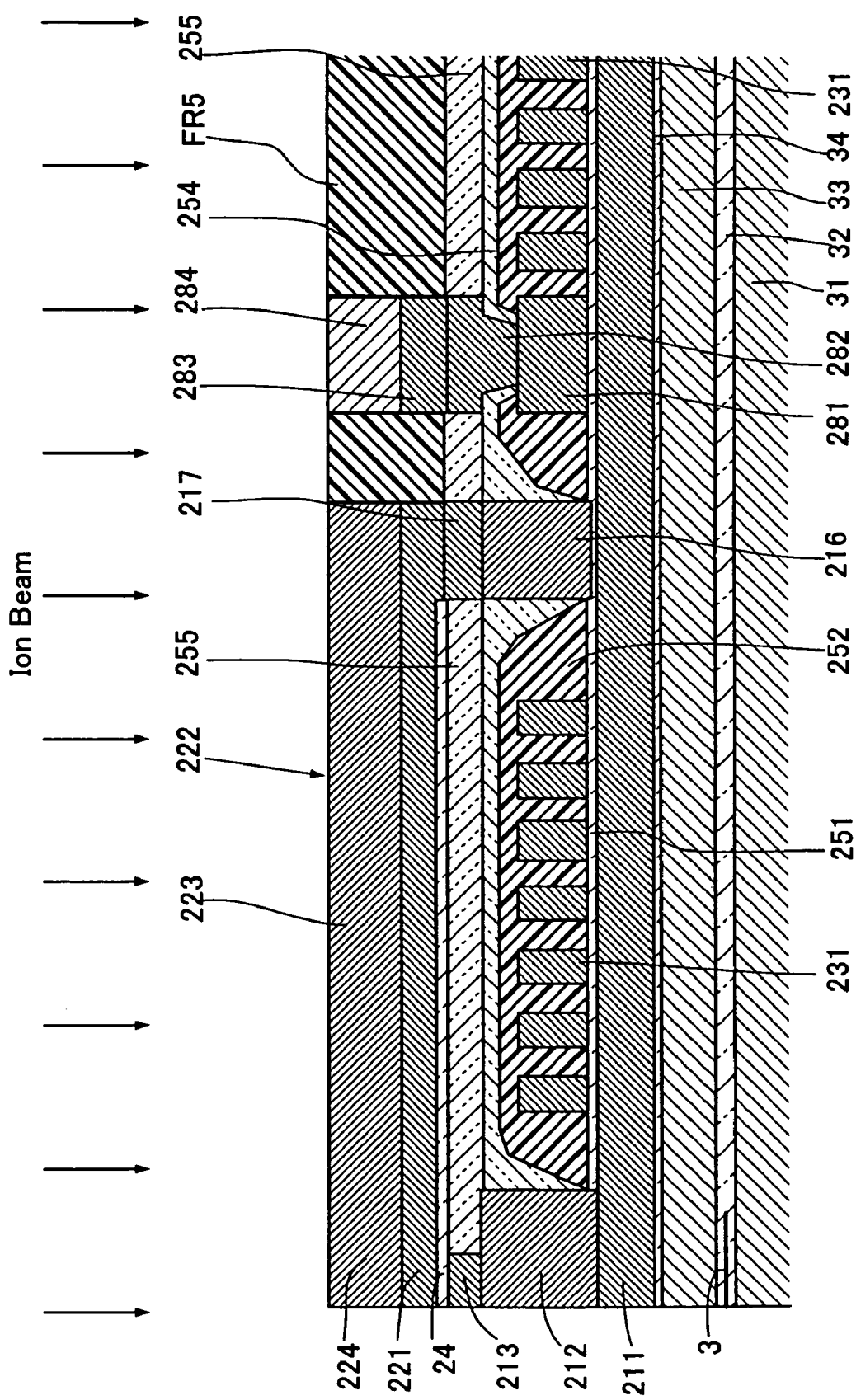
FIG. 63 is a diagram showing a process after the process shown in FIGS. 61 and 62.
Figure 64:
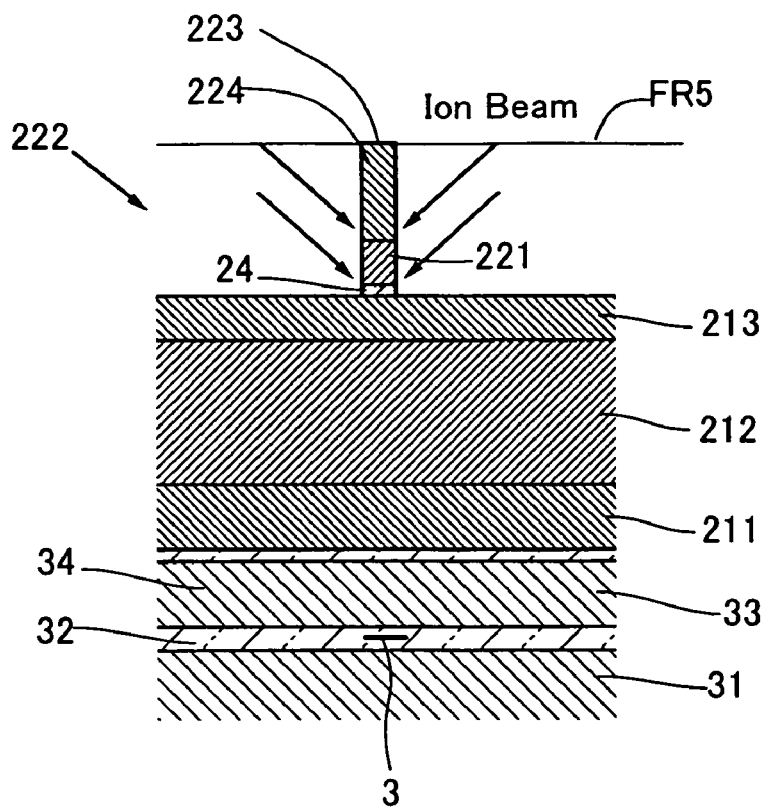
FIG. 64 is a view of the process shown in FIG. 63, seen from the ABS side.

<Process Leading to a State of FIGS. 63 and 64>

Next, as shown in FIGS. 63 and 64, the resist mask FR5 is etch-backed so as to expose the surface of the third magnetic film 222, which forms the second yoke portion. The etch-backing process to etch-back the resist mask FR5 may comprise a dry-etching process with an $O_2$-mixed plasma, or an isotropic or anisotropic dry-etching process with halogen-based or chlorofluorocarbon-based plasma ashing. As described above, these etching processes provide dry-etching with excellent flatness, and the anisotropic dry-etching process is performed by using $O_2$ gas, or halogen-based gas such as chlorofluorocarbon-based gas, e.g. $SF_4$ or $SF_6$.

Next, an etching process with the etch-backed resist mask FR5 is performed in the opening of the resist mask FR5. The opening of the resist mask FR5 has been formed on the narrow portion 224, which forms the second pole portion. This etching process is continued to expose the surface of the third pole piece 213, which forms the first pole portion.

By the etch-backing process, the resist mask FR5 is self-aligned in intimate contact with outer circumferential edges of the second and third magnetic films 221 and 222 without misalignment of the resist mask FR5 or a gap between the resist mask FR5 and the outer circumferential edges. In the subsequent etching process, consequently, there is no possibility that the outer circumferential edges of the second and third magnetic films 221 and 222 might be attacked by an etching means such as ion beams and so, a high-accuracy pattern of the second yoke portion, which is formed of the second and third magnetic films 221 and 222, is obtained.

The second and third magnetic films 221 and 222 comprise a wide portion 223 and a flare portion 225 gradually decreasing in width toward a narrow portion 224, which forms the second pole portion. In the present invention, the resist mask FR5 is also self-aligned in intimate contact with the flare portion 225 without misalignment of the resist mask FR5 or a gap between the resist mask FR5 and the flare portion 225 and so, in the subsequent etching process, there is no possibility that the outer edge of the flare portion 225 might be attacked by an etching means such as ion beams. Thus, it is possible to prevent variations in a flare point FP1, which is between the flare portion 225 and the narrow portion 224. This assures a constant minimal value of the distance from the ABS to the flare point FP1 in a thin film magnetic head and consequently assures the over-write characteristic.

Figure 65:
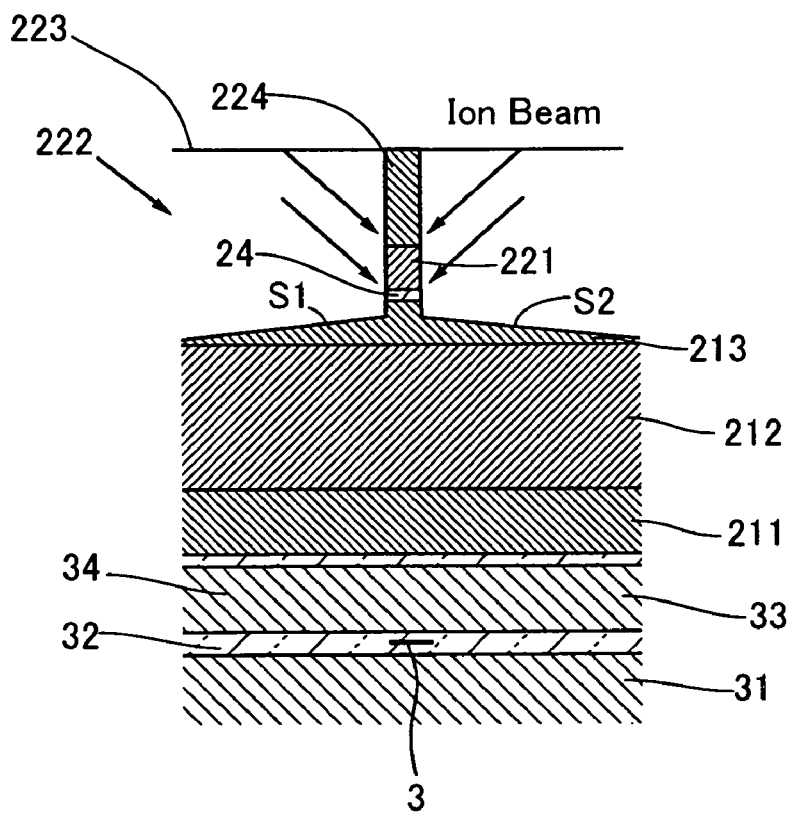
FIG. 65 is a diagram showing a process after the process shown in FIG. 64.

<Process Leading to a State of FIG. 65>

After the process shown in FIGS. 63 and 64, the resist mask FR5 is removed and then additional etching is performed by IBE, applied onto the third pole piece 213 of the first pole portion.

The additional etching process produces etching indentations on both sides of the narrow portion 224. In this etching process, the magnetic film 213 (third pole piece) adjacent to the gap film 24 is etched so that not all portions of the magnetic film 213 are etched and on the bottoms of the etching indentations, a base portion (S1, S2) of the magnetic film 213 is left. In case of using IBE as an etching means, by selected irradiation angles of ion beams and the geometric structure of the narrow portion 224, the magnetic film 213 is etched so as to have a narrowed portion and a base portion (S1, S2) left on the bottoms, the base portion (S1, S2) increasing in thickness toward the narrowed portion. This structure make it possible to both keep a narrowed track width and allow a sufficient sectional area of the magnetic film 213 adjacent to the gap film 24. Consequently, magnetic saturation in the magnetic film is prevented and so, over-write characteristic is improved.

After that, a protective film 258 made of alumina or the like (see FIGS. 3 and 4) is deposited 20 to 40 µm thick and the process on the wafer is almost finished. After that, publicly known post-processes of cutting out a thin film magnetic head from the wafer, polishing for determining a throat height, processing ABS and the like are performed.

3. Magnetic Head Device and a Magnetic Recording/Reproducing Apparatus

Figure 66:
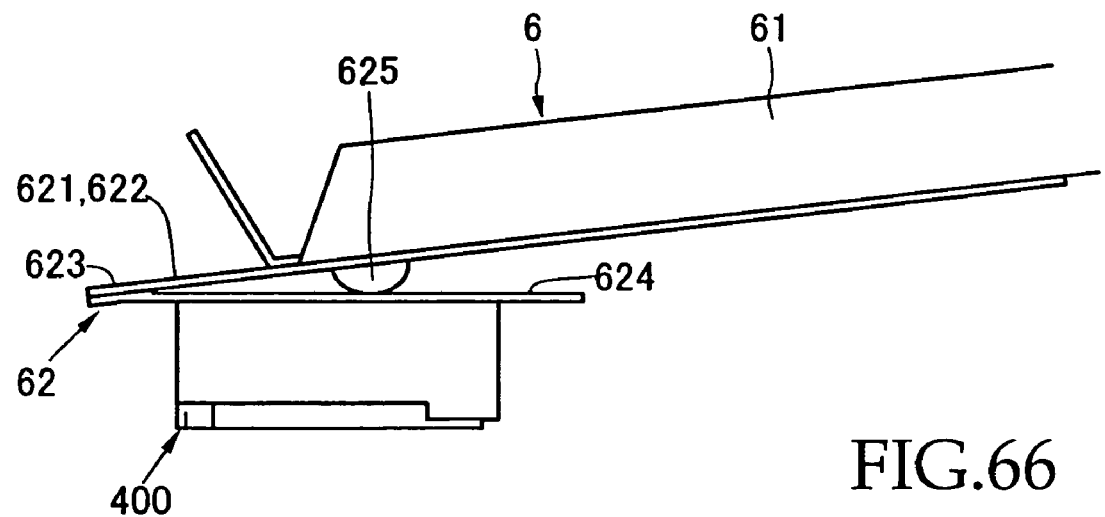
FIG. 66 is a front view of a magnetic head device using a thin film magnetic head according to the present invention.
Figure 67:
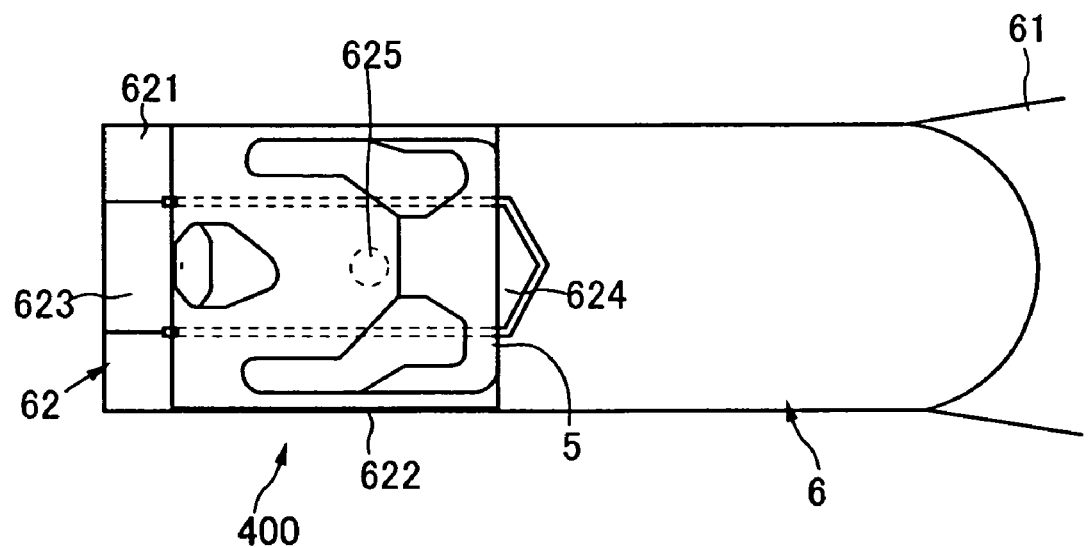
FIG. 67 is a view of the magnetic head device shown in FIG. 66, seen from the bottom side (ABS side)

The present invention also discloses a magnetic head device and a magnetic recording/reproducing apparatus. Referring to FIGS. 66 and 67, a magnetic head device according to the present invention comprises a thin film magnetic head 400 shown in FIGS. 1 to 10 and a head supporting device 6. The structure of the head supporting device 6 is as follows: a flexible member 62 made of a metal sheet is attached to a free end of a supporting member 61 made of a metal sheet, the free end being at one end in the longitudinal direction; and the thin film magnetic head 400 is attached to the lower surface of the flexible member 62.

Specifically, the flexible member 62 comprises: two outer frame portions 621 and 622 extending nearly in parallel with the longitudinal axial line of the supporting member 61; a lateral frame 623 for connecting the outer frame portions 621 and 622 at the end which is distant from the supporting member 61; and a tongue-shaped piece 624 extending nearly from the middle part of the lateral frame 623 nearly in parallel with the outer frame portions 621 and 622 and having a free end at the tip. One end of the flexible member 62 opposite to the lateral frame 623 is joined to the vicinity of the free end of the supporting member 61 by means of welding or the like.

The lower face of the supporting member 61 is provided with a loading projection 625 in the shape of a hemisphere, for example. This loading projection 625 transmits load from the free end of the supporting member 61 to the tongue-shaped piece 624.

The thin film magnetic head 400 is joined to the lower surface of the tongue-shaped piece 624 by means of adhesion or the like. The thin film magnetic head 400 is supported so as to allow pitching and rolling actions.

A head supporting device to which the present invention is applied is not limited to the above-described embodiment. The present invention can also be applied to head supporting devices which have been proposed up to now or will be proposed in the future. For example, the present invention can be applied to a head supporting device obtained by integrating the supporting member 61 and the tongue-shaped piece 624 by a flexible high-molecular wiring sheet such as a TAB tape (TAB: tape automated bonding), and a head supporting device having a publicly known conventional gimbals structure.

Figure 68:
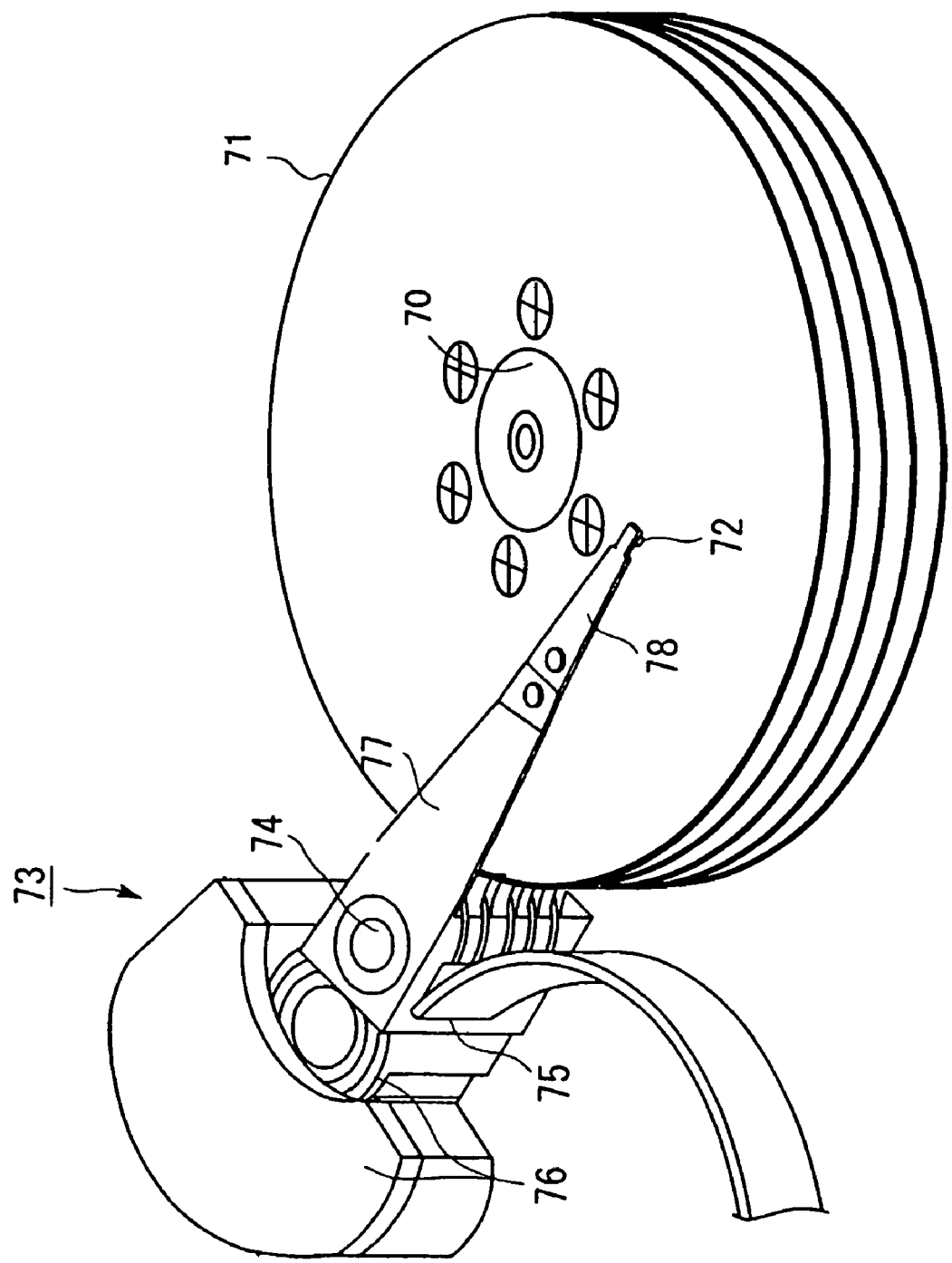
FIG. 68 is a perspective view roughly showing a magnetic recording/reproducing apparatus having a magnetic head device comprising a thin film magnetic head according to the present invention and a magnetic recording medium combined with one another.

Next, referring to FIG. 68, a magnetic recording/reproducing apparatus according to the present invention comprises a magnetic disk 71 provided so as to be capable of turning around an axis 70, a thin film magnetic head 72 for recording and reproducing information on the magnetic disk 71 and an assembly carriage device 73 for positioning the thin film magnetic head 72 on a track of the magnetic disk 71.

The assembly carriage device 73 comprises a carriage 75 capable of turning around an axis 74 and an actuator 76 composed of, for example, a voice coil motor (VCM) for turning this carriage 75, as main components.

The base portion of a plurality of driving arms 77 stacked in the axial direction of the axis 74 is attached to the carriage 75, and a head suspension assembly 78 with a thin film magnetic head 72 is fixedly joined to the tip of each driving arm 77. Each head suspension assembly 78 is joined to the tip of a driving arm 77 so that a thin film magnetic head 72 on the tip of the head suspension assembly 78 faces the surface of each magnetic disk 71.

The driving arm 77, head suspension assembly 78 and thin film magnetic head 72 form the magnetic head device described with reference to FIGS. 66 and 67. The thin film magnetic head 72 has the structure shown in FIGS. 1 to 10. Thus, the magnetic recording/reproducing apparatus shown in FIG. 68 exhibits the action and effect described with reference to FIGS. 1 to 10.

Although the contents of the present invention have been concretely described above with reference to the preferred embodiments, it is obvious that people in this field can take various variations on the basis of the basic technical idea and teachings of the present invention.

What is claimed is:

1. A thin film magnetic head, comprising:
a write element, the write element including,
a first yoke portion;
a first pole portion projecting from a flat surface of the first yoke portion at a medium-facing surface side and having a reduced width at its upper end;
a gap film;
a second pole portion facing the upper end of the first pole portion, having the same width as the upper end of the first pole portion, with the gap film interposed between the second pole portion and the upper end of the first pole portion;
a second yoke portion continuous with the second pole portion at the medium-facing surface side and connected to the first yoke portion by a back gap portion that is recessed in the thin film magnetic head from the medium-facing surface; and
a coil surrounding in a spiral form the back gap portion on the flat surface of the first yoke portion; wherein:
the first pole portion includes a magnetic film adjacent to the gap film, and the magnetic film is etched at both sides in a width direction so as to have a narrowed portion having substantially the same width as the second pole portion, and a base portion connected to the narrowed portion and increasing in thickness toward the narrowed portion;
the coil has a space between coil turns which is filled up with an organic insulating resin;
the coil and the organic insulating resin are covered with a third insulating film of an inorganic insulating material;
the third insulating film has a flattened surface;
the first pole portion comprises a first pole piece, a second pole piece and a third pole piece;
the first pole piece is formed of an end of the first yoke portion;
the second pole piece has one surface adjacent to the first pole piece;
the third pole piece has one surface adjacent to the other surface of the second pole piece;
the other surface of the second pole piece is flattened to the same level as the flattened surface of the third insulating film;
the other surface of the third pole piece is flattened to the same level as a surface of a fourth insulating film deposited on the flattened surface of the third insulating film; and
the gap film is on the flattened surfaces of the third pole piece and the fourth insulating film.

2. The thin film magnetic head of claim 1, further comprising a read element, wherein:
the read element comprises a giant magnetoresistance effect element.

3. The thin film magnetic head of claim 2, wherein:
the giant magnetoresistance effect element comprises one of a spin valve film and a ferromagnetic tunnel junction.

4. A magnetic recording/reproducing apparatus, comprising:
the thin film magnetic head of claim 1, and a magnetic recording medium, wherein
the magnetic recording medium performs magnetic recording/reproducing operations in cooperation with the thin film magnetic head.

5. The magnetic recording/reproducing apparatus of claim 4, wherein:
the coil comprises a first coil and a second coil;
the first and second coils surround in a spiral form the back gap portion on a first insulating film formed on the flat surface of the first yoke portion, and one of the first and second coils is fitted into the space between coil turns of the other, insulated from the coil turns of the other by a second insulating film, and the first and second coils are connected to each other so as to generate magnetic flux in the same direction.

6. A magnetic recording/reproducing apparatus, comprising:
a thin film magnetic head and a magnetic recording medium, wherein the thin film magnetic head comprises a write element, the write element including,
a first yoke portion;
a first pole portion projecting from a flat surface of the first yoke portion at a medium-facing surface side and having a reduced width at its upper end;
a gap film;
a second pole portion facing the upper end of the first pole portion, having the same width as the upper end of the first pole portion, with the gap film interposed between the second pole portion and the upper end of the first pole portion;
a second yoke portion continuous with the second pole portion at the medium-facing surface side and connected to the first yoke portion by a back gap portion that is recessed in the thin film magnetic head from the medium-facing surface; and
a coil surrounding in a spiral form the back gap portion on the flat surface of the first yoke portion;
the first pole portion includes a magnetic film adjacent to the gap film, and the magnetic film is etched at both sides in a width direction so as to have a narrowed portion having substantially the same width as the second pole portion, and a base portion connected to the narrowed portion and increasing in thickness toward the narrowed portion; and
the magnetic recording medium performs magnetic recording/reproducing operations in cooperation with the thin film magnetic head;
the first pole portion comprises a first pole piece, a second pole piece, a third pole piece and a fourth pole piece;
the first pole piece is formed of an end of the first yoke portion;
the second pole piece has one surface adjacent to the first pole piece;
the third pole piece has one surface adjacent to the other surface of the second pole piece; and the fourth pole piece has one surface adjacent to the other surface of the third pole piece and the other surface adjacent to the gap film.

7. The magnetic recording/reproducing apparatus of claim 6, further comprising:
a read element, wherein the read element comprise a giant magnetoresistance effect element.

8. The magnetic recording/reproducing apparatus of claim 7, wherein:
the giant magnetoresistance effect element comprises one of a spin valve film and a ferromagnetic tunnel junction.

9. A magnetic recording/reproducing apparatus, comprising:
a thin film magnetic head and a magnetic recording medium, wherein the thin film magnetic head comprises a write element, the write element including,
a first yoke portion;
a first pole portion projecting from a flat surface of the first yoke portion at a medium-facing surface side and having a reduced width at its upper end;
a gap film;
a second pole portion facing the upper end of the first pole portion, having the same width as the upper end of the first pole portion, with the gap film interposed between the second pole portion and the upper end of the first pole portion;
a second yoke portion continuous with the second pole portion at the medium-facing surface side and connected to the first yoke portion by a back gap portion that is recessed in the thin film magnetic head from the medium-facing surface; and
a coil surrounding in a spiral form the back gap portion on the flat surface of the first yoke portion; wherein:
the first pole portion includes a magnetic film adjacent to the gap film, and the magnetic film is etched at both sides in a width direction so as to have a narrowed portion having substantially the same width as the second pole portion, and a base portion connected to the narrowed portion and increasing in thickness toward the narrowed portion; and
the magnetic recording medium performs magnetic recording/reproducing operations in cooperation with the thin film magnetic head;

the coil has a space between coil turns which is filled up with an organic insulating resin;

the coil and the organic insulating resin are covered with a third insulating film of an inorganic insulating material;

the third insulating film has a flattened surface;

the first pole portion comprises a first pole piece, a second pole piece and a third pole piece;

the first pole piece is formed of an end of the first yoke portion;

the second pole piece has one surface adjacent to the first pole piece;

the third pole piece has one surface adjacent to the other surface of the second pole piece;

the other surface of the second pole piece is flattened to the same level as the flattened surface of the third insulating film;

the other surface of the third pole piece is flattened to the same level as a surface of a fourth insulating film deposited on the flattened surface of the third insulating film; and the gap film is on the flattened surfaces of the third pole piece and the fourth insulating film.

* * * * *